(12) United States Patent
Fujita et al.

(10) Patent No.: US 9,632,247 B2
(45) Date of Patent: Apr. 25, 2017

(54) TERAHERTZ-WAVE DEVICE AND TERAHETZ-WAVE INTEGRATED CIRCUITS

(71) Applicants: ROHM CO., LTD., Kyoto (JP); OSAKA UNIVERSITY, Osaka (JP)

(72) Inventors: Masayuki Fujita, Osaka (JP); Tadao Nagatsuma, Osaka (JP); Kazuisao Tsuruda, Kyoto (JP); Dai Onishi, Kyoto (JP)

(73) Assignees: ROHM CO., LTD., Kyoto (JP); OSAKA UNIVERSITY, Osaka (JP)

( * ) Notice: Subject to any disclaimer, the term of this patent is extended or adjusted under 35 U.S.C. 154(b) by 0 days.

(21) Appl. No.: 14/644,175

(22) Filed: Mar. 10, 2015

(65) Prior Publication Data

US 2016/0178843 A1    Jun. 23, 2016

(30) Foreign Application Priority Data

Mar. 12, 2014  (JP) ................................. 2014-048402
Mar. 5, 2015   (JP) ................................. 2015-043442

(51) Int. Cl.
| G02B 6/122 | (2006.01) |
| G02B 6/124 | (2006.01) |
| H01Q 1/00  | (2006.01) |
| G02B 6/12  | (2006.01) |
| G02B 6/34  | (2006.01) |

(52) U.S. Cl.
CPC .......... *G02B 6/1225* (2013.01); *G02B 6/124* (2013.01); *H01Q 1/00* (2013.01); *G02B 6/34* (2013.01); *G02B 2006/12121* (2013.01); *G02B 2006/12123* (2013.01); *G02B 2006/12126* (2013.01); *H01S 2302/02* (2013.01)

(58) Field of Classification Search
CPC .................................................... G02B 6/1225
See application file for complete search history.

(56) References Cited

U.S. PATENT DOCUMENTS

2014/0355630 A1*  12/2014  Takahashi ............... G02F 1/365
                                                   372/3

FOREIGN PATENT DOCUMENTS

| JP | 2012-216714 A | 11/2012 |
| JP | 2012-217107 A | 11/2012 |
| JP | 5366663 B2    | 12/2013 |

OTHER PUBLICATIONS

Tsukasa Ishigaki, Masayuki Fujita and Tadao Nagatsuma, "Investigation of a Photonic-Crystal Slab for Terahertz-Wave Integrated Circuits", Institute of Electronics, Information and Commmtication Engineers General Conference 2012 (Mar. 21, 2012).
Tsukasa Ishigaki, Masayuki Fujita, Masaya Nagai, Masaaki Ashida and Tadao Nagatsuma, "Photonic-Crystal Slab for Terahertz-Wave Integrated Circuits", IEEE Photonics Conference 2012 (IPC2012), Burlingame, No. THJ3, Sep. 27, pp. 774-775, 2012.
(Continued)

*Primary Examiner* — Omar R Rojas
(74) *Attorney, Agent, or Firm* — Rabin & Berdo, P.C.

(57) ABSTRACT

The THz-wave device comprises: a 2D-PC slab; lattice points periodically arranged in the 2D-PC slab, the lattice points for diffracting the THz waves in PBG frequencies of photonic band structure of the 2D-PC slab in order to prohibit existence in a plane of the 2D-PC; a 2D-PC waveguide disposed in the 2D-PC slab and formed with a line defect of the lattice points; and an RTD device disposed on the 2D-PC waveguide.

7 Claims, 45 Drawing Sheets

(56) References Cited

OTHER PUBLICATIONS

Tadao Nagatsuma, Masayuki Fujita, Toshikazu Mukai, Kazuisao Tsuruda and Ddai Onishi, "Recent Progress and Future Prospects of Terahertz Communications Using Resonant Tunneling Diodes" (Jan. 16, 2013).

M. Schuster, O. Antoniuk, P. Lahl, and N. Klein, "Resonant and Waveguiding Defect Modes in a Two-Dimensional Electromagnetic Band-Gap Slab Structure for Millimeter Wave Frequencies", J. Appl. Phys. 97, 044912 (2005).

Al Kaku, Takeshi Shiode, Tsukasa Ishigaki, Toshikazu Mukai, Kazuisao Tsuruda, Masayuki Fujita, and Tadao Nagatsuma, "3-Gbite/S Error-Free Terahertz Communication Using Resonant Tunneling Diode Detectors Integrated With MGO Hyper-Hemispherical Lens", Asia-Pacific Microwave Photonics Conference (APMP2013), No. MD-1, 2013.

\* cited by examiner

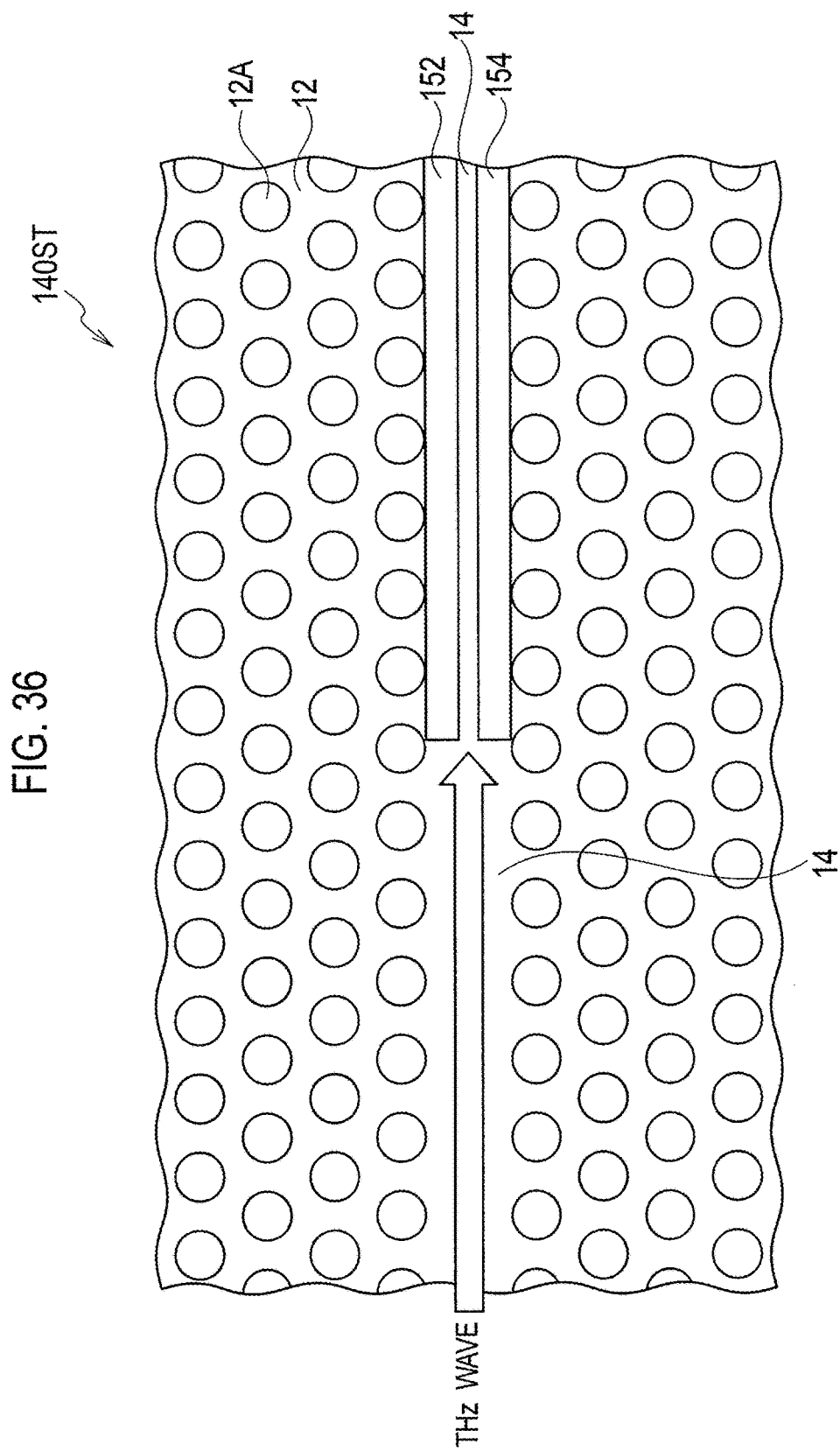

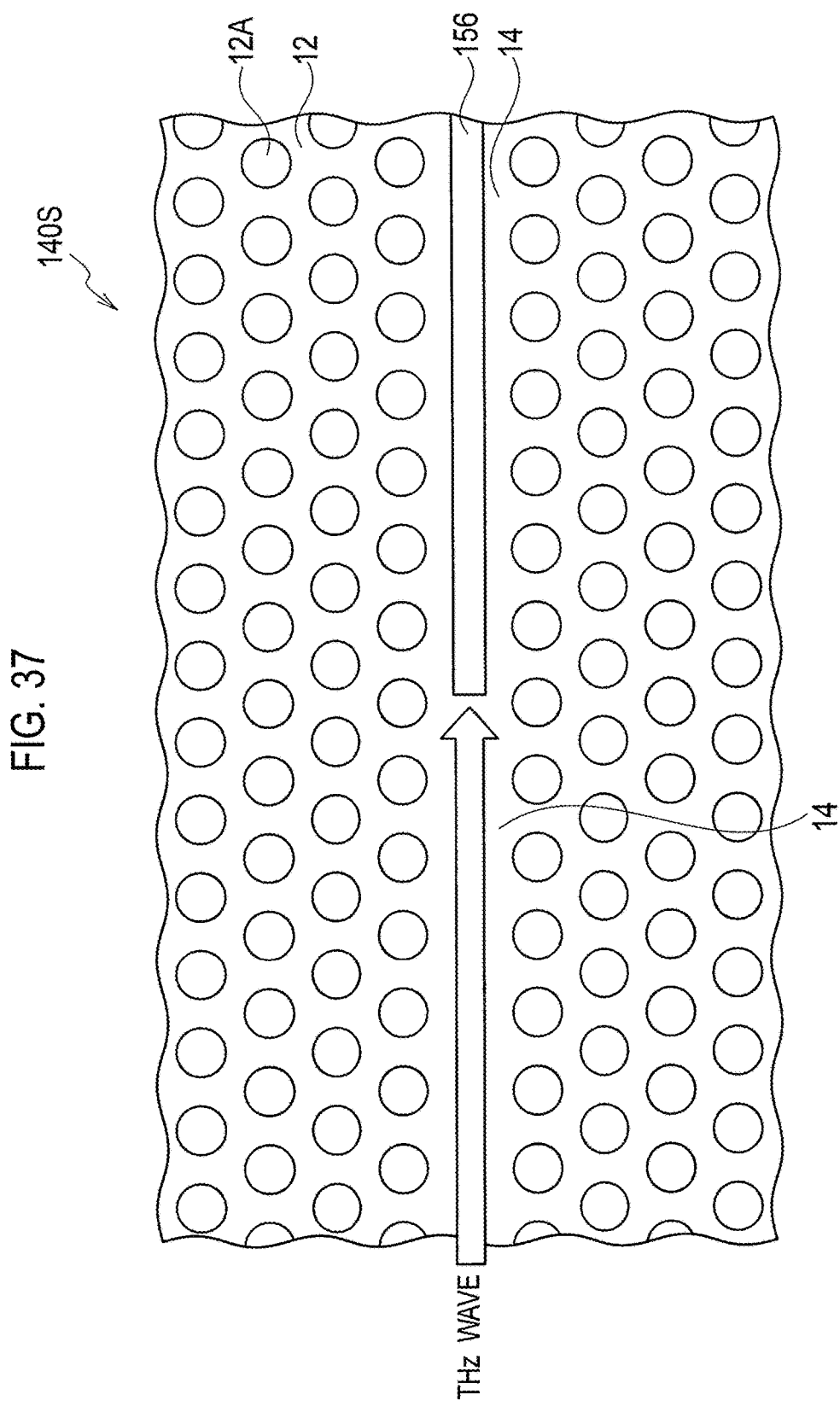

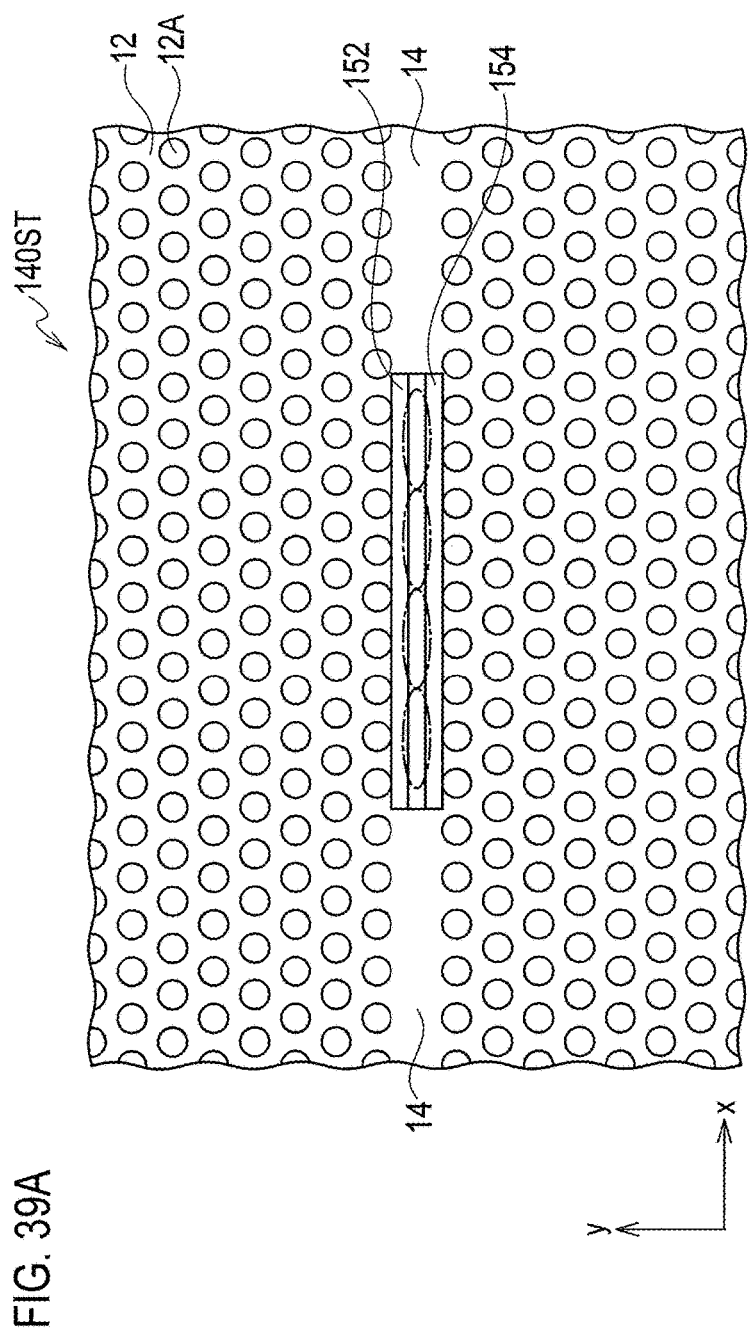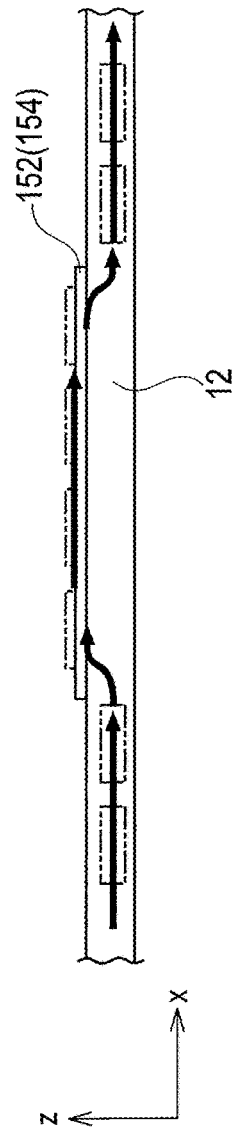

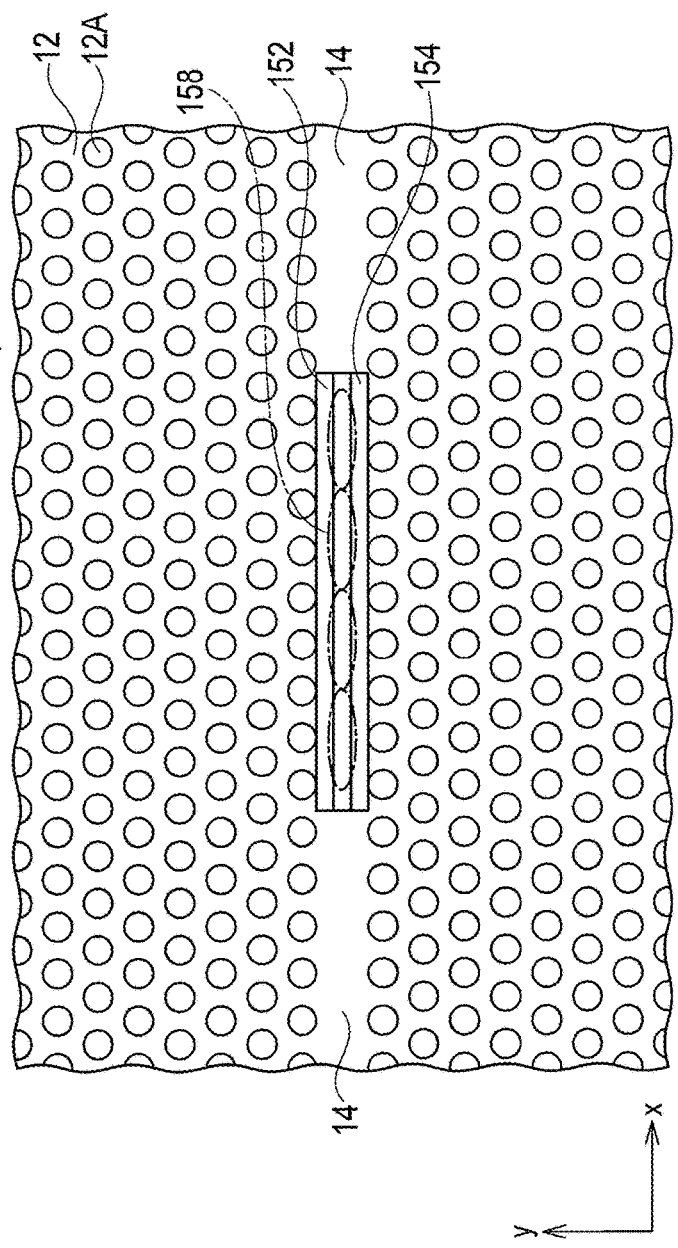
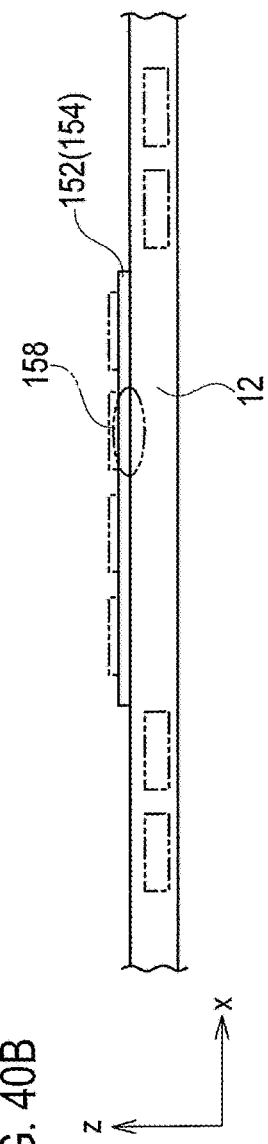
FIG. 40A
FIG. 40B

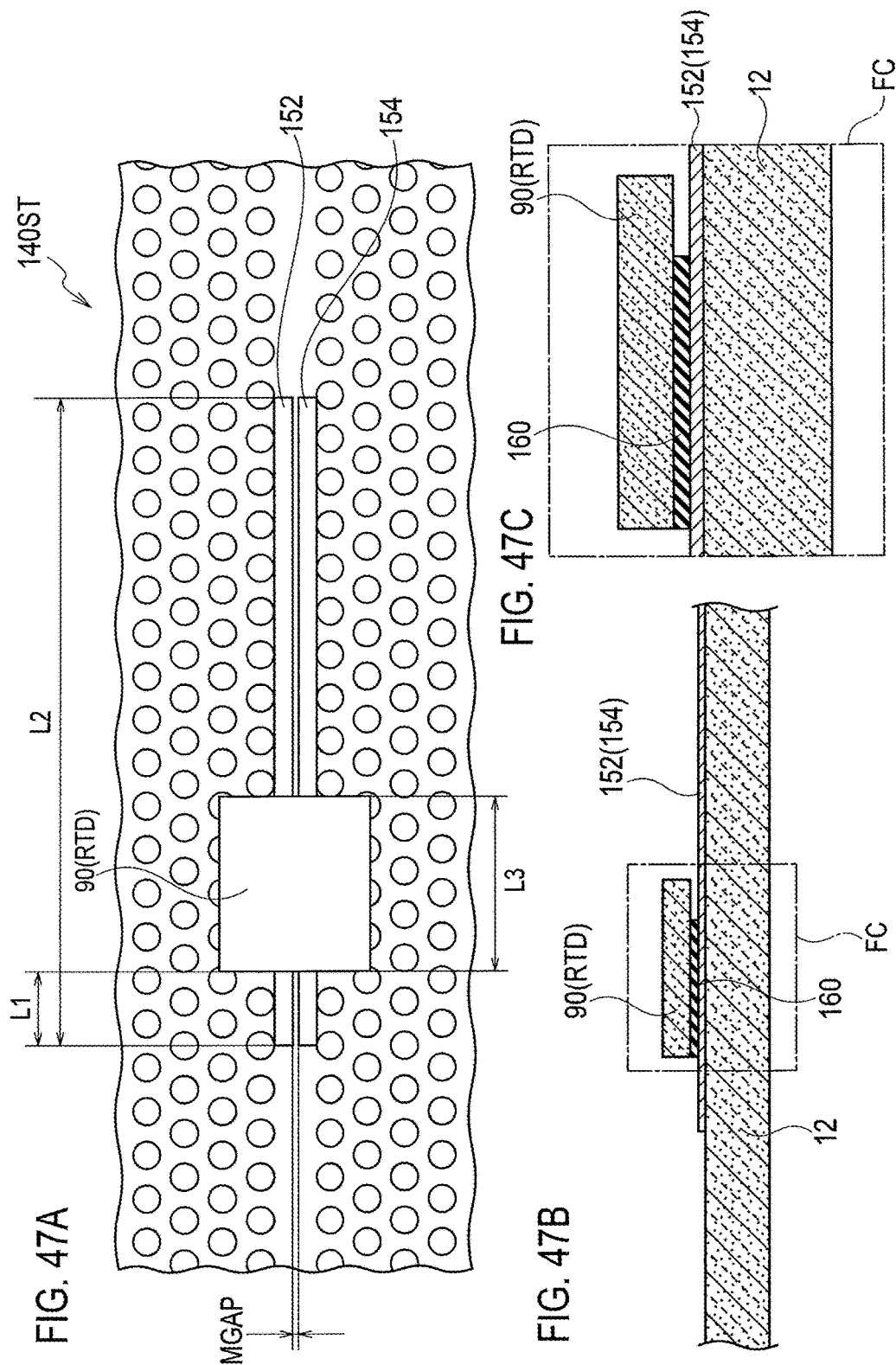

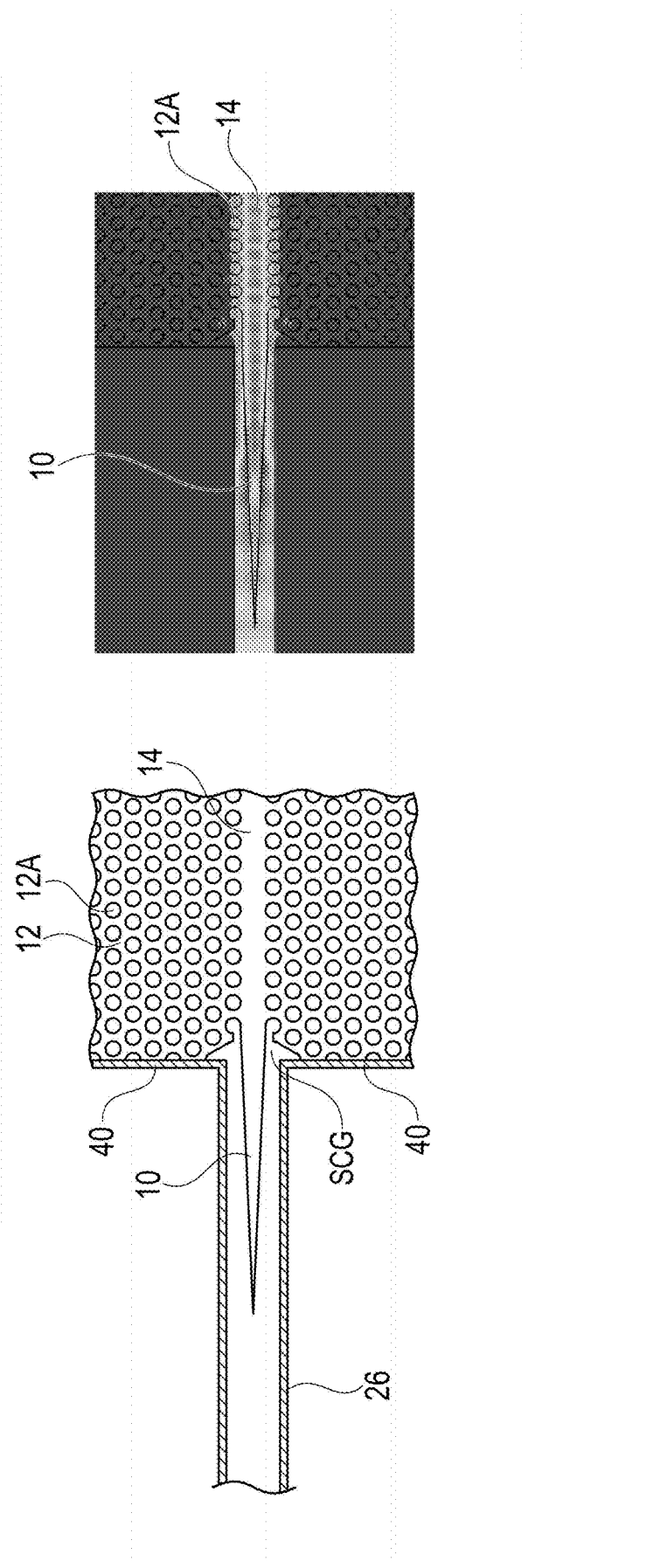

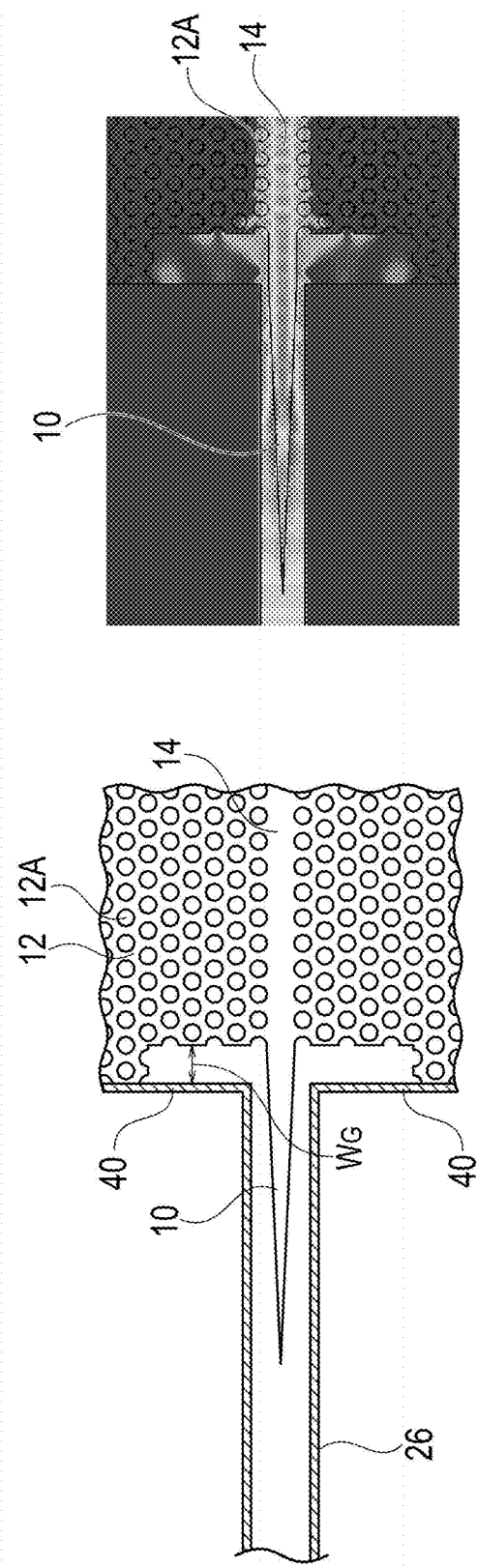

TERAHERTZ-WAVE DEVICE AND TERAHETZ-WAVE INTEGRATED CIRCUITS

CROSS REFERENCE TO RELATED APPLICATIONS AND INCORPORATION BY REFERENCE

This application is based upon and claims the benefit of priority from prior Japanese Patent Application Nos. P2014-48402 filed on Mar. 12, 2014, and P2015-43442 filed on Mar. 5, 2015, the entire contents of which are incorporated herein by reference.

FIELD

Embodiments described herein relate to a terahertz-wave (THz-wave) device and a THz-wave integrated circuit (THz-wave IC). In particular, the embodiments described herein relate to a THz-wave device which improves coupling efficiency with a dielectric waveguide and realizes a broader bandwidth, and a THz-wave IC capable of mounting such a THz-wave device.

BACKGROUND

In recent years, for THz wave band (0.1 THz to 10 THz) positioned in intermediate frequencies between electromagnetic waves and light waves, studies of applicabilities of ultra high-speed wireless communications, sensing, imaging, etc. have become active, and there has been expected its practical application. However, since THz-wave systems are composed of large-sized and three-dimensional structured components under the current circumstances, large-sized and expensive configurations are required for such THz-wave systems. In order to miniaturize the whole of such systems, implementation of THz-wave ICs integrating devices is indispensable.

Utilization of technologies of both of a light wave region and an electric wave region can be considered as fundamental technologies of the THz-wave ICs. However, optical components, e.g. lenses, mirrors, are composed of large-sized and three-dimensional structured components, and therefore are not suitable for the integration. Moreover, it is becoming difficult to produce hollow metal waveguides used in the electric wave region due to its fine three-dimensional structure. A waveguide loss in planar metallic-transmission lines is increased as effect of metallic absorption is increased.

As a fundamental technology of THz-wave ICs, there has been studied applicability of a two dimensional photonic crystal (2D-PC) slab where outstanding progress is seen in the optical wave region.

Moreover, there has also been disclosed a THz oscillation device which is fabricated by combining a Resonant Tunneling Diode (RTD) and a slot antenna and which can extract horizontally electromagnetic waves to a substrate.

Moreover, there has also been disclosed a detection device having a configuration similar to that of the aforementioned THz oscillation device.

Moreover, there has also been disclosed an oscillation detection device having a configuration similar to that of the aforementioned THz oscillation device.

Moreover, there has also been studied resonant and waveguiding line defect modes in an electromagnetic 2D bandgap (BG) slab structure for millimeter wave frequency bands.

Moreover, there has also been a demonstration of a 3-Gbps error THz communications using an RTD detector integrated with an ultra-hemispherical MgO lens.

SUMMARY

Research of THz wave transmission and reception devices (including RTD, and also Schottky barrier diodes only at the time of receiving) have proceeded, but there are a problem to be addressed to realize functional integration since extracting and inputting efficiencies of THz waves from these diodes are still very inefficient.

Moreover, in THz communications, although radiation patterns were modified, the efficiency has been limited. Furthermore, since the configuration thereof is three-dimensional structure, it is difficult to realize a planar integration.

If assuming in particular an integrated circuit (signal processing circuit) of THz band, coupling methods between passive devices, e.g. a waveguide, and THz oscillator or THz detector become a fundamental developing theme. In the THz band, there is still no example of previous works for coupling between dielectric waveguides and electronic devices.

The embodiments provide a THz-wave device which improves coupling efficiency with a dielectric waveguide and realizes a broader bandwidth, and a THz-wave IC capable of mounting such a THz-wave device.

According to one aspect of the embodiments, there is provided a terahertz-wave device comprising: a two dimensional photonic crystal slab; lattice points periodically arranged in the two dimensional photonic crystal slab, the lattice points configured to diffract terahertz waves in photonic bandgap frequencies in photonic band structure of the two dimensional photonic crystal slab in order to prohibit existence in a plane of the two dimensional photonic crystal slab; a two dimensional photonic crystal waveguide disposed in the two dimensional photonic crystal slab, the two dimensional photonic crystal waveguide formed of a line defect of the lattice points; and a diode device disposed on the two dimensional photonic crystal waveguide.

According to another aspect of the embodiments, there is provided a terahertz-wave device comprising: a two dimensional photonic crystal slab; lattice points periodically arranged in the two dimensional photonic crystal slab, the lattice points configured to diffract terahertz waves in photonic bandgap frequencies in photonic band structure of the two dimensional photonic crystal slab in order to prohibit existence in a plane of the two dimensional photonic crystal slab; a two dimensional photonic crystal waveguide disposed in the two dimensional photonic crystal slab, the two dimensional photonic crystal waveguide formed of a line defect of the lattice points; and a diode device disposed at an edge face of the two dimensional photonic crystal slab to which the two dimensional photonic crystal waveguide is extended.

According to still another aspect of the embodiments, there is provided a terahertz-wave device comprising: a two dimensional photonic crystal slab; lattice points periodically arranged in the two dimensional photonic crystal slab, the lattice points configured to diffract terahertz waves in photonic bandgap frequencies in photonic band structure of the two dimensional photonic crystal slab in order to prohibit existence in a plane of the two dimensional photonic crystal slab; a two dimensional photonic crystal waveguide disposed in the two dimensional photonic crystal slab, the two dimensional photonic crystal waveguide formed of a line defect of the lattice points; and a diode device disposed in a trench formed in the two dimensional photonic crystal waveguide so that a top surface of the diode device is flush with a surface of the two dimensional photonic crystal waveguide.

According to still another aspect of the embodiments, there is provided a terahertz-wave device comprising: a two dimensional photonic crystal slab; lattice points periodically arranged in the two dimensional photonic crystal slab, the lattice points configured to diffract terahertz waves in photonic bandgap frequencies in photonic band structure of the two dimensional photonic crystal slab in order to prohibit existence in a plane of the two dimensional photonic crystal slab; a two dimensional photonic crystal waveguide disposed in the two dimensional photonic crystal slab, the two dimensional photonic crystal waveguide formed of a line defect of the lattice points; and a diode device disposed in a trench formed in the two dimensional photonic crystal waveguide so that a surface of the diode device is matched with a cross-sectional center portion vertical to a surface of the two dimensional photonic crystal slab of the two dimensional photonic crystal waveguide.

According to still another aspect of the embodiments, there is provided a terahertz-wave device comprising: a two dimensional photonic crystal slab; lattice points periodically arranged in the two dimensional photonic crystal slab, the lattice points configured to diffract terahertz waves in photonic bandgap frequencies in photonic band structure of the two dimensional photonic crystal slab in order to prohibit existence in a plane of the two dimensional photonic crystal slab; a two dimensional photonic crystal waveguide disposed in the two dimensional photonic crystal slab, the two dimensional photonic crystal waveguide formed of a line defect of the lattice points; and a metallic pattern disposed on the two dimensional photonic crystal waveguide.

According to still another aspect of the embodiments, there is provided a terahertz-wave integrated circuits comprising the above-mentioned terahertz-wave device.

According to the embodiments, there can be provided a THz-wave device which improves coupling efficiency with a dielectric waveguide and realizes a broader bandwidth, and a THz-wave IC capable of mounting such a THz-wave device.

BRIEF DESCRIPTION OF DRAWINGS

FIG. 36 is a schematic planar pattern configuration diagram showing a THz-wave device according to a seventh embodiment.

FIG. 37 is a schematic planar pattern configuration diagram showing a THz-wave device according to a modified example of the seventh embodiment.

FIG. 39A is a schematic planar pattern configuration diagram for explanting an extracting operation of THz wave on a device surface of a THz-wave device according to the eighth embodiment.

FIG. 39B is a schematic cross-sectional diagram along a direction to which the 2D-PC waveguide is extended, in FIG. 39A.

FIG. 40A is a schematic planar pattern configuration diagram showing a diode, a free carrier, a sensing sample (sensing analyte), etc. respectively disposed between metallic slot transmission lines, for explanation of extracting applicability (interaction) of the THz wave applied on the device surface of the THz-wave device according to the eighth embodiment.

FIG. 40B is a schematic cross-sectional diagram along a direction to which the 2D-PC waveguide is extended, in FIG. 40A.

FIG. 47A is a schematic planar pattern configuration diagram in a state where a diode chip is coupled on the metallic slot transmission line as a flip chip, in the THz-wave device according to the eighth embodiment.

FIG. 47B is a schematic cross-sectional diagram along a direction to which the 2D-PC waveguide is extended, in FIG. 47A.

FIG. 47C is an enlarged view of a portion FC in FIG. 47B.

FIG. 48A is a schematic planar pattern configuration diagram showing a structure coupled to a waveguide having a broader band, in a THz-wave device according to a ninth embodiment.

FIG. 48B shows an electromagnetic field simulation result in the coupling part shown in FIG. 48A.

FIG. 49A is a schematic planar pattern configuration diagram showing a structure coupled to a waveguide having a broader bandwidth, in a THz-wave device according to a comparative example.

FIG. 49B shows an electromagnetic field simulation result in the coupling part shown in FIG. 49A.

DESCRIPTION OF EMBODIMENTS

Figure 1:
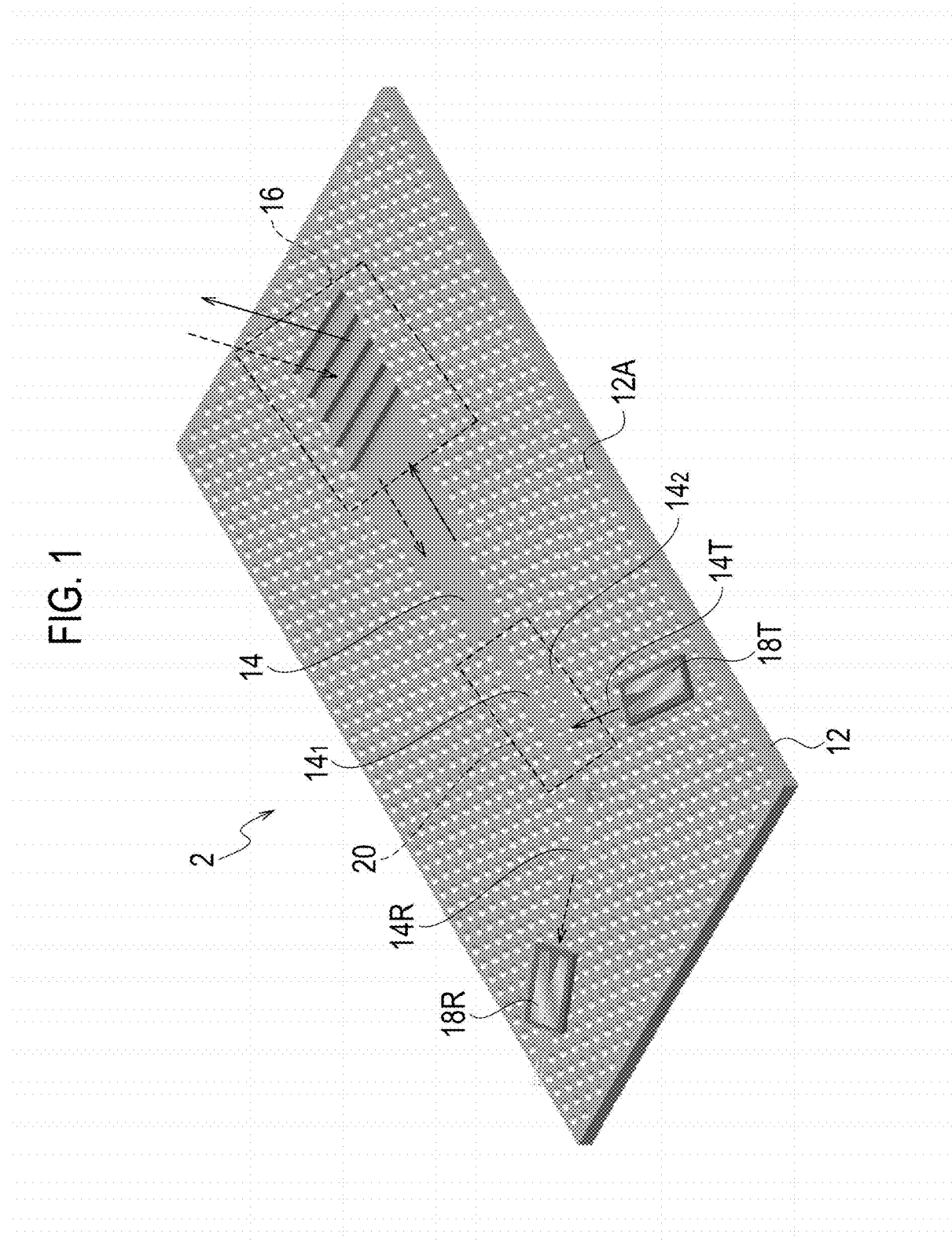
FIG. 1 is a schematic bird's-eye view of a THz-wave IC according to first embodiment on which a THz wave transmitter and a THz wave receiver are mounted as THz-wave devices.

Next, certain embodiments will now be described with reference to drawings. In the description of the following drawings, the identical or similar reference numeral is attached to the identical or similar part. However, it should be noted that the drawings are schematic and therefore the relation between thickness and the plane size and the ratio of the thickness differs from an actual thing.

Therefore, detailed thickness and size should be determined in consideration of the following explanation. Of course, the part from which the relation and ratio of a mutual size differ also in mutually drawings is included.

Moreover, the embodiments shown hereinafter exemplify the apparatus and method for materializing the technical idea; and the embodiments do not specify the material, shape, structure, placement, etc. of each component part as the following. The embodiments may be changed without departing from the spirit or scope of claims.

In the following explanations, THz-wave devices according to embodiments described herein include THz wave transmitters, THz wave receivers, and THz wave transceivers each capable of transmission and reception on a stand-alone basis. These THz-wave devices can be mounted on THz-wave ICs according to the embodiment.

[First Embodiment]
(THz-Wave IC)

FIG. 1 is a schematic bird's-eye view of a THz-wave IC 2 according to first embodiment on which a THz wave transmitter 18T and a THz wave receiver 18R are mounted as THz-wave devices. As shown in FIG. 1, the THz-wave IC 2 according to the first embodiment uses a low-loss dielectric waveguide (line defect waveguide using a 2D-PC) for the purpose of a waveguide and introduction of the THz wave.

As shown in FIG. 1, the THz-wave IC 2 according to the first embodiment includes: a 2D-PC slab 12; and lattice points 12A periodically arranged in the 2D-PC slab 12, the lattice points 12A for diffracting the light waves or the THz waves in photonic bandgap (PBG) frequencies of photonic band structure of the 2D-PC slab 12 in order to prohibit existence in a plane of the 2D-PC slab 12.

Moreover, as shown in FIG. 1, the THz-wave IC 2 according to the first embodiment includes: a directional coupler 20; an input/output interface 16 coupled to the directional coupler 20 via a 2D-PC waveguide 14; a THz wave receiver (Detector) 18R coupled to the directional coupler 20 via a 2D-PC waveguide 14R; and a THz wave transmitter (light source) 18T coupled to the directional coupler 20 via a 2D-PC waveguide 14T.

The directional coupler 20 includes 2D-PC waveguides $14_1$, $14_2$ separated for a distance amount of two rows of lattice points, for example.

The 2D-PC waveguides 14, $14_1$, $14_2$, 14R, 14T are disposed on the 2D-PC slab 12, and are formed with a line defect of the lattice points 12A.

The input/output interface 16 is a coupler from free space, and is composed of a grating coupler composed of a one-dimensional PC, for example. In addition, the input/output interface 16 can also be composed using the 2D-PC.

The THz wave receiver (detector) 18R can be composed of a THz wave receiver on which RTD etc. is mounted, or a Schottky barrier diode (SBD), for example.

The THz wave transmitter (light source) 18T can be composed of a THz wave transmitter etc. on which the RTD etc. is mounted, a quantum cascade laser or CMOS oscillator, or a photo mixer composed of a high-speed photo diode (PD) and two semiconductor lasers of which the frequency difference is equivalent to the THz wave. In this case, GaInAs/AlInAs, GaAs/AlGaAs, InAs/AlGaSb, GaN/AlInGaN, Si/SiGe, etc. are applicable to materials of the quantum cascade laser. The following are applicable to materials of the semiconductor laser, for example. That is, for example, GaInAsP/InP based materials are applicable in the case of wavelengths of 1.3 μm to 1.5 μm; GaInAs/GaAs based materials are applicable in the case of an infrared light with a wavelength of 900 nm; GaAlAs/GaAs based or GaInNAs/GaAs based materials are applicable in the case of an infrared light/near-infrared light with wavelengths of 800 to 900 nm; GaAlInAs/InP based materials are applicable in the case of wavelengths of 1.3 μm to 1.67 μm; GaAlInP/GaAs based materials are applicable in the case of a wavelength of 0.65 μm; and GaInN/GaN based materials are applicable in the case of a blue light.

THz-wave IC 2 according to the first embodiment can propagate the THz wave.

If an RTD device is uses for the THz wave receiver, a configuration formed by integrating a tapered slot antenna may be used. Furthermore, a configuration formed by integrating other types of antenna structure, e.g. a dipole antenna or a slot antenna can also be used therefor, instead of the tapered slot antenna.

(THz-Wave Device)

Figure 2:
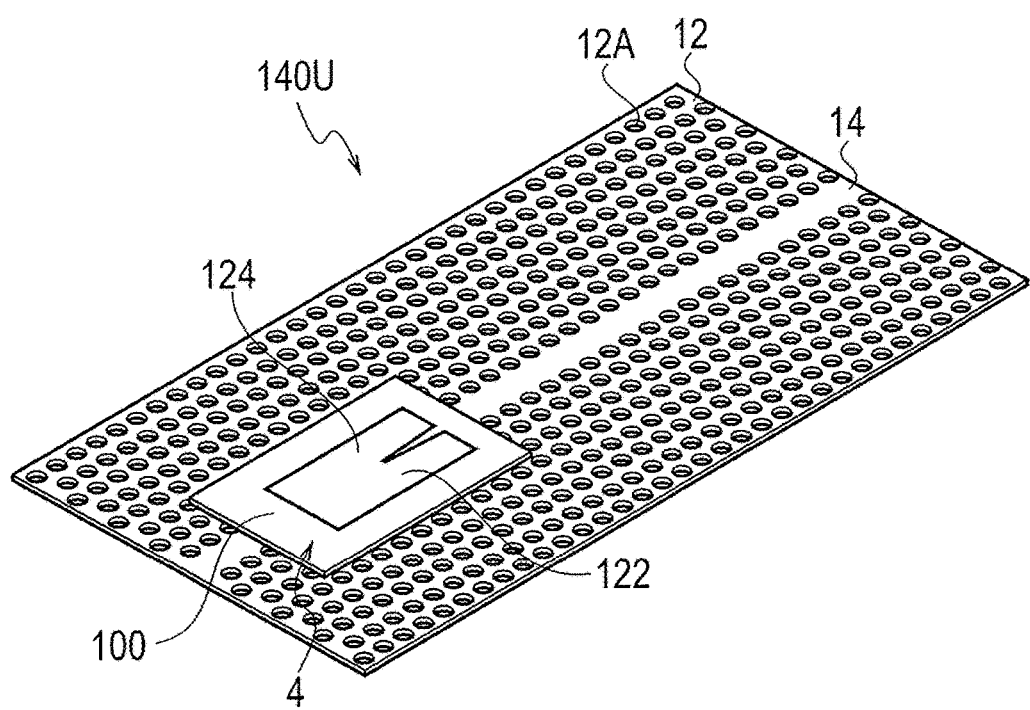
FIG. 2 is a schematic bird's-eye view configuration diagram showing a THz-wave device according to a first embodiment.

FIG. 2 shows a schematic bird's-eye view configuration of the THz-wave device 140U according to the first embodiment.

As shown in FIG. 2, the THz-wave device 140U according to the first embodiment includes: a 2D-PC slab 12; lattice points 12A periodically arranged in the 2D-PC slab 12, the lattice points 12A for diffracting the THz waves in PBG frequencies of photonic band structure of the 2D-PC slab 12 in order to prohibit existence in a plane of the 2D-PC slab 12; a 2D-PC waveguide 14 disposed in the 2D-PC slab 12 and formed with a line defect of the lattice points 12A; and a diode device disposed on the 2D-PC waveguide 14.

As shown in FIG. 2, the THz-wave device 140U according to the first embodiment uses a low-loss dielectric waveguide (line defect waveguide using a 2D-PC) for the purpose of a waveguide and introduction of the THz wave.

In this case, an RTD device 4 or SBD disposed on the 2D-PC waveguide 14 is applicable to such a diode device.

The RTD device 4 is applicable to the THz wave transmitter 18T, the THz wave receiver 18R, or the THz wave transceiver each capable of transmission and reception and received on a stand-alone basis. Moreover, the SBD is applicable to the THz wave receiver 18R.

The RTD of RTD device 4 is preferable to be disposed at a center of the 2D-PC waveguide 14. This is because coupling efficiency between the RTD device 4 and the 2D-PC waveguide 14 is improved.

If the RTD device 4 is disposed on the 2D-PC waveguide 14, it is effective to thinly polish the substrate of the RTD device 4 so that the epitaxial growth layer of RTD device 4 may be as close to the surface of the 2D-PC waveguide 14, and further to dispose the RTD portion at the center of the 2D-PC waveguide 14. This is because the coupling efficiency between the RTD device 4 and the 2D-PC waveguide 14 is further improved.

(RTD Device in which Tapered Slot Antenna is Integrated)

Figure 3:
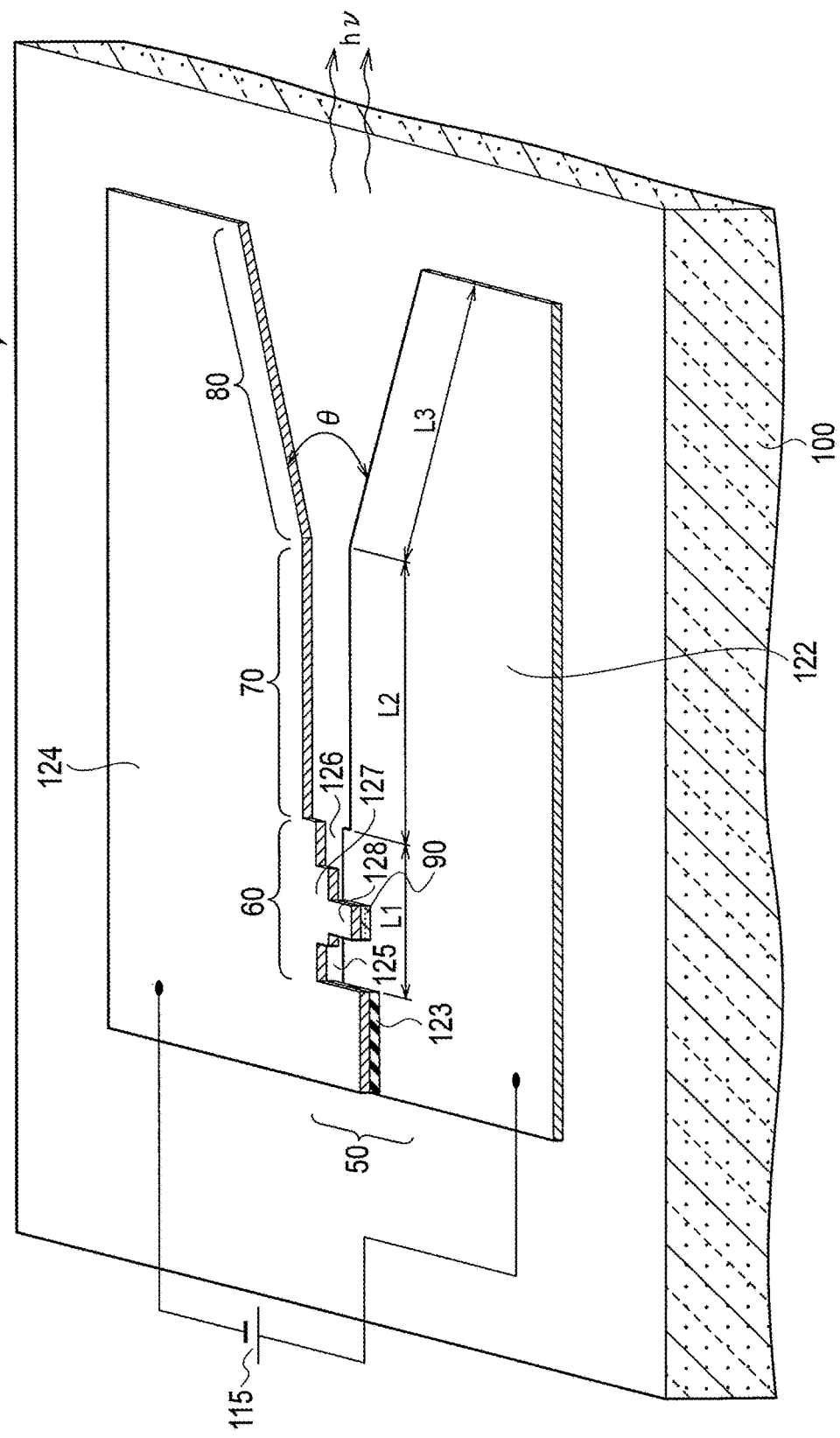
FIG. 3 is a schematic bird's-eye view configuration diagram showing an RTD into which a tapered slot antenna integrated applicable to the THz-wave device according to the first embodiment.

FIG. 3 shows a schematic bird's-eye view configuration of the RTD device 4 in which the tapered slot antenna applicable to the THz-wave device according to the first embodiment is integrated.

As shown in FIG. 3, the RTD device, in which the tapered slot antenna applicable to the THz-wave device according to the first embodiment integrated, includes: a semiconductor substrate 100; a first electrode 122 disposed on a semiconductor substrate 100; an insulating layer 123 disposed on the first electrode 122; a second electrode which is disposed via the insulating layer 123 with respect to the first electrode, and is opposed to the first electrode 122 to be disposed on the semiconductor substrate 100; an MIM reflector 50 formed between the first electrode 122 and the second electrode 124 on both sides of the insulating layer 123; a resonator 60 disposed between the first electrode 122 and the second electrode 124 opposite to each other on the semiconductor substrate 100, the resonator 60 adjacent to the MIM reflector 50; an active element 90 disposed at a substantially central part of the resonator 60; a waveguide 70 disposed between the first electrode 122 and the second electrode 124 opposite to each other on the semiconductor substrate 100, the waveguide 70 adjacent to the resonator 60; and a horn apertural area 80 disposed between the first electrode 122 and the second electrode 124 opposite to each other on the semiconductor substrate 100, the horn apertural area 80 adjacent to the waveguide 70.

RTD is typical as the active element 90. However, the active element 90 can be composed also from diodes or transistors except for the RTD. As other active elements, for example, a Tunnel Transit Time (TUNNETT) diode, an Impact Ionization Avalanche Transit Time (IMPATT) diode, a GaAs based Field Effect Transistor (FET), a GaN based FET, High Electron Mobility Transistor (HEMT), a Heterojunction Bipolar Transistor (HBT), etc. are also applicable thereto.

The horn apertural area 80 is composed of a tapered slot antenna. The angular aperture θ of the horn apertural area 80 is preferable to set as equal to or less than about 10 degrees, for example, from the viewpoint of giving the directional characteristics in the radiation direction of the electromagnetic wave (hv). The length L3 of the horn apertural area 80 is equal to or less than approximately 700 μm, for example. The aperture width in the tip region of the horn apertural area 80 is approximately 160 μm, for example.

The waveguide 70 is disposed at the apertural area of the resonator 60. The length L2 of the waveguide 70 is equal to or less than approximately 700 μm, for example. Moreover, a distance between the first electrode 122 and the second electrode 124 in the waveguide 70 is approximately 24 μm, for example.

The horn shape of the horn apertural area 80 is a structure needed in order to extract the electromagnetic waves in the air. The electromagnetic waves can be efficiently extracted with sufficient impedance matching in the air by the horn shape. In addition, the shape of the horn may be not only a linearity shape, but also a nonlinear shape, a curve profile, a secondary curve profile, a parabola shape, a stair-like shape, etc.

Two recessed regions 125, 126 are formed at the resonator 60, and a protruded region 127 is formed to be inserted between the two recessed regions 125, 126. Furthermore, a salient region 128 is formed in a substantially central part of the protruded region 127 of the second electrode 124, and an active element 90 is disposed at a lower part of this salient region 128 as inserted into the salient region 128 and the first electrode 122.

The length L1 of the resonator 60 is equal to or less than approximately 30 μm, for example. The length of the salient region 128 is equal to or less than approximately 6 μm, for example. Moreover, the width of the recessed regions 125, 126 (distance between the first electrode 122 and the second electrode 124) is approximately 4 μm, for example. The size of the active element 90 is approximately 1.4 μm$^2$, for example. However, the size of the active element 90 is not be limited to such a value, and may be equal to or less than approximately 5.3 μm$^2$, for example. The detailed structure of the active element 90 will be described later. The size of each part of the resonator 60 is not limited to the above-mentioned size, and is suitably set up on a design according to the frequency of the electromagnetic waves to oscillate.

Moreover, as shown in FIG. 3, the interval between the first electrode 122 and the second electrode 124 of the part in which the resonator 60 is formed is narrow compared with the interval between the first electrode 122 and the second electrode 124 in the waveguide 70.

The MIM reflector 50 is disposed at the closed area in the opposite side of the apertural area of the resonator 60. Due to the layered structure of the MIM reflector 50 composed of metal/insulator/metal, the second electrode 124 and the first electrode 122 are short-circuited in high frequency.

In this case, the MIM reflector 50 has the effect that it is possible to reflect high frequency as it is opening in direct current.

The semiconductor substrate 100 is formed of a semi insulating InP substrate, for example, and the thickness thereof is approximately 600 μm, for example. However, the thickness thereof is appropriately selectable, and therefore it is preferable to be thin-layered as mentioned below.

Each of the first electrode 122 and the second electrode 124 is composed of metal layered structure of Au/Pd/Ti, for example, and the Ti layer is a buffer layer for making satisfactory a contact state with the semi insulating InP substrate. The thickness of the first electrode 122 and the second electrode 124 is about several 100 nm, for example. Each of the first electrode 124 and the second electrode 122 can be formed with a vacuum deposition method or a sputtering technique.

The insulating layer 123 can be formed of SiO$_2$ film, for example. Other films, e.g. an Si$_3$N$_4$ film, a SiON film, an HfO$_2$ film, an Al$_2$O$_3$ film, etc. are also applicable to the interlayer insulating film 9. In addition, the thickness of the insulating layer 3 can be determined in consideration of a geometric plane size of the MIM reflector 50 and a required capacitor value on circuit characteristics, for example, and may be set to several 10 nm to several 100 nm. The insulating layer 3 can be formed by a CVD (Chemical Vapor Deposition) method or a spattering technique.

The MIM reflector 50 is formed with a structure where the insulating layer 123 is inserted between the first electrode 122 and the second electrode 124. The active element 90 composed of RTD is disposed on the semi-insulating semiconductor substrate (InP substrate) 100. The first electrode 122 is disposed so as to be contacted on the surface on which a part of n⁺ GaInAs layer 91*a* of the RTD is etched. The second electrode 124 is disposed so as to be contacted on the n⁺ GaInAs layer 91*b* of the RTD. Furthermore, the second electrode 124 is disposed so as to be extended on the semi insulating semiconductor substrate 100.

Thus, since the second electrode 124 is disposed so as to be extended on the semi insulating semiconductor substrate 100, there is provided a configuration capable of applying predetermined DC bias voltage between the n⁺ GaInAs layer 91*a* and the n⁺ GaInAs layer 91*b* of RTD, without short-circuit therebetween.

In addition, the DC power supply 115 is connected to the first electrode 122 and the second electrode 124, and a resistance (not shown) for preventing a parasitic oscillation is connected to the first electrode 2 and the second electrode 4.

(Resonant Tunneling Diode)

Figure 4:
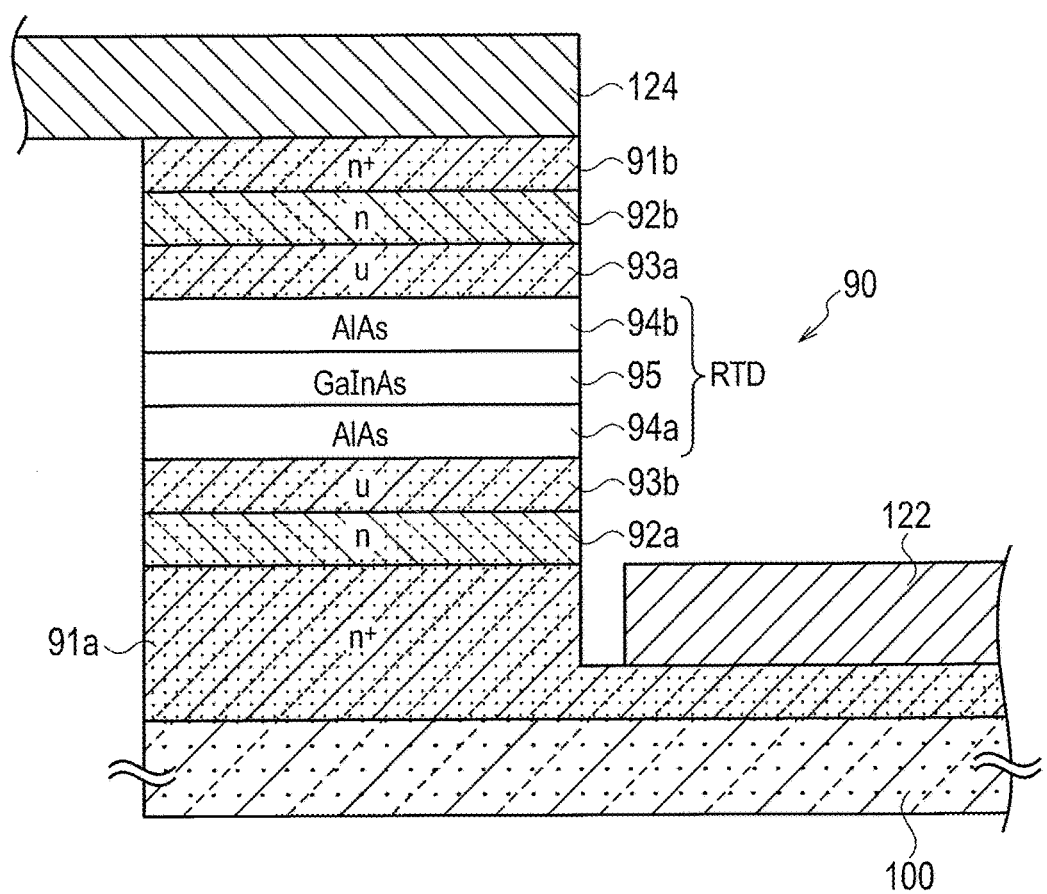
FIG. 4 is a schematic cross-sectional structure diagram showing the RTD applicable to the THz-wave device according to the first embodiment.

FIG. 4 shows a schematic cross-sectional structure of the RTD of RTD device applicable to the THz-wave device according to the first embodiment.

Figure 18A:
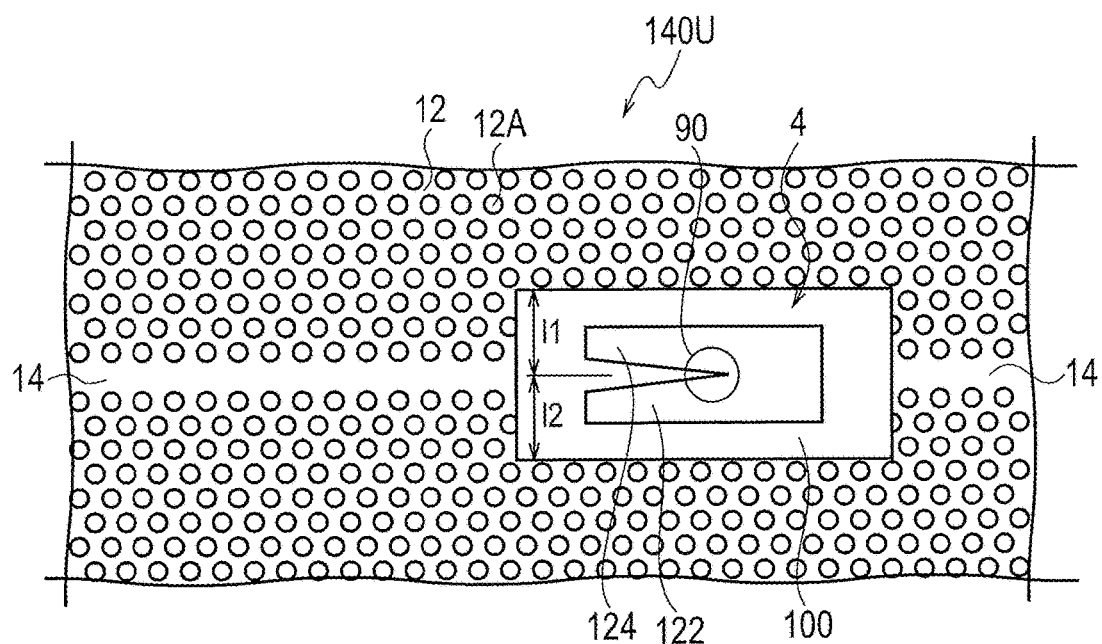
FIG. 18A is a schematic top view diagram for explaining an example that displacement of the RTD device mounted on the 2D-PC waveguide (difference between $l_1$ and $l_2$) is relatively small (i.e., a/8), in the THz-wave device according to the first embodiment.

As shown in FIG. 18A, a constructional example of the RTD applicable to the THz-wave device according to the first embodiment includes: an GaInAs layer 91*a* formed on the semiconductor substrate 100 composed of a semi insulating InP substrate, the n+ GaInAs layer 91*a* highly doped with an n type impurity; a GaInAs layer 92*a* which is disposed on the GaInAs layer 91*a* and is doped with an n type impurity; a undoped GaInAs layer 93*b* disposed on the GaInAs layer 92*a*; an RTD portion composed of AlAs layer 94/GaInAs layer 95/AlAs layer 94*b* disposed on the GaInAs layer 93*b*; an undoped GaInAs layer 93*b* disposed on the AlAs layer 94*b*; a GaInAs layer 92*b* disposed on the GaInAs layer 93*a* and doped with an n type impurity; a GaInAs layer 91*b* disposed on the GaInAs layer 92*b* and highly doped with an n type impurity; a second electrode 124 disposed on the GaInAs layer 91*b*; and a first electrode 122 disposed on the etched surface of the GaInAs layer 91*a*.

As shown in FIG. 4, the RTD is formed so that the GaInAs layer 95 is inserted between the AlAs layers 94*a* and 94*b*. The RTD portion layered in this way is structured to be ohmic-connected to the first electrode 122 positioned at an underside and the second electrode 124 positioned at an upside through the n type GaInAs layers 92*a*, 92*b* and the n⁺ type GaInAs layers 91*a*, 91*b*, inserting the respective undoped n type GaInAs layers 93*a*, 93*b* used as a spacer therebetween.

In this case, the thickness of each layer is, for example, as follows: The thicknesses of the n⁺ type GaInAs layers 91*a* and 91*b* respectively are approximately 400 nm and approximately 30 nm. The thicknesses of the n type GaInAs layers 91*a* and 91*b* respectively are substantially equal to each other, and are approximately 50 nm, for example. The thicknesses of the undoped GaInAs layers 93*a* and 93*b* respectively are substantially equal to each other, and are approximately 5 nm, for example. The thicknesses of the AlAs layers 94*a* and 94*b* are equal to each other, and respectively are approximately 1.5 nm, for example. The thickness of the GaInAs layer 95 is approximately 4.5 nm, for example.

In addition, an $SiO_2$ film, an $Si_3N_4$ film, a SiON film, an $HfO_2$ film, an $Al_2O_3$ film, etc., or the insulating film composed of the aforementioned multilayer films can also be deposited on the sidewall part of the layered structure shown in FIG. 4. The insulating layer can be formed by CVD or a spattering technique.

Although the configuration in which the tapered slot antenna (horn apertural area 80) is used as the RTD device 4 as shown in FIG. 3, a configuration formed by integrating other types of antenna structure, e.g. a dipole antenna or a slot antenna can also be used therefor, instead of the tapered slot antenna.

(Propagation Mode of THz Wave)

Figure 5:
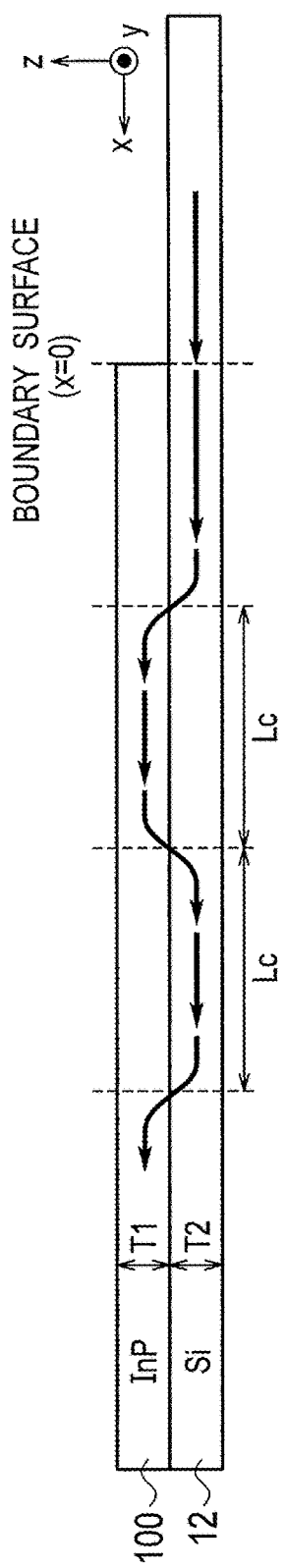
FIG. 5 is a schematic cross-sectional structure diagram for explaining a coupling phenomenon of THz wave between a 2D-PC slab and an InP substrate on which the RTD is mounted, in the THz-wave device according to the first embodiment.

FIG. 5 shows a schematic cross-sectional structure for explaining a propagation mode of THz wave between a 2D-PC slab and an InP substrate on which the RTD is mounted, in the THz-wave device according to the first embodiment. In FIG. 5, the THz wave propagates in the x-axial direction.

If the InP substrate 100 on which the RTD 90 is mounted on the 2D-PC slab 12 formed by Si is disposed, the wave propagated from the 2D-PC waveguide 14 repeats coupling between the InP substrate 100 and the 2D-PC slab 12 on the basis of the principle similar to that of the directional coupler, as shown in FIG. 5. If there is no antenna on the InP substrate 100, the RTD 90 is disposed at a point where a wave energy is fully coupled into the InP substrate 100, the energy can be most efficiently entered into the RTD 90. However, for that purpose, a distance from the end of the InP substrate 100 to the RTD 90 should be cut in accordance with the coupling length $L_C$.

In the RTD device 4 in which the tapered slot antenna is integrated, almost all waves coupled into InP substrate 100 at once are caught by the tapered slot antenna, and then energy is transported to the RTD 90 in that condition. Accordingly, mounting position accuracy of the RTD 90 in a moving direction of the THz wave is relaxed. However, a displacement in a direction vertical to the moving direction of the wave, i.e., a horizontal direction (y-axial direction), severely affects its characteristics. Moreover, such an arrangement that the radiation pattern of the tapered slot antenna (80: FIG. 3) of the RTD device 4 and the propagation direction of the 2D-PC waveguide 14 are matched to each other also contributes to improvement in the efficiency.

(Disposition Method 1 of RTD Device in which Tapered Slot Antenna is Integrated)

Figure 6:
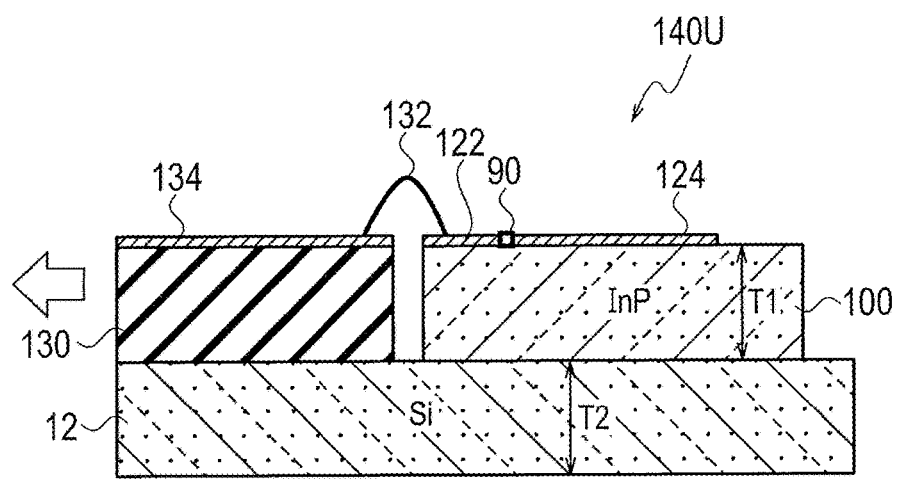
FIG. 6 is a schematic cross-sectional structure diagram showing the THz-wave device according to the first embodiment in which the RTD is disposed on the 2D-PC slab.

FIG. 6 shows a schematic cross-sectional structure of the THz-wave device 140U according to the first embodiment in which the RTD device 4 is disposed on the 2D-PC slab 12.

In this case, the RTD device 4 includes: an InP substrate 100; a first electrode 122 and a second electrode 124 both disposed on the InP substrate 100; and an RTD 90 disposed between the first electrode 122 and the second electrode 124. Although the RTD 90 is schematically illustrates so as to be disposed in a horizontal direction between the first electrode 122 and the second electrode 124 in FIG. 6, the RTD 90 is laminated to be disposed between the first electrode 122 and the second electrode 124 in a detailed structure, as shown in FIGS. 3 and 4.

Furthermore, a coplanar mounting substrate 130 is disposed on the 2D-PC slab 12, and a bonding wire 132 is connected between an electrode 134 formed on the coplanar mounting substrate 130 and the first electrode 122 of the RTD device 4. In addition, a configuration connected with a waveguide may be adopted, instead of such a bonding wire 132. Moreover, the coplanar mounting substrate 130 may further connect an SMA connector etc. to the edge face in an extending direction which is the arrow direction.

Figure 20:
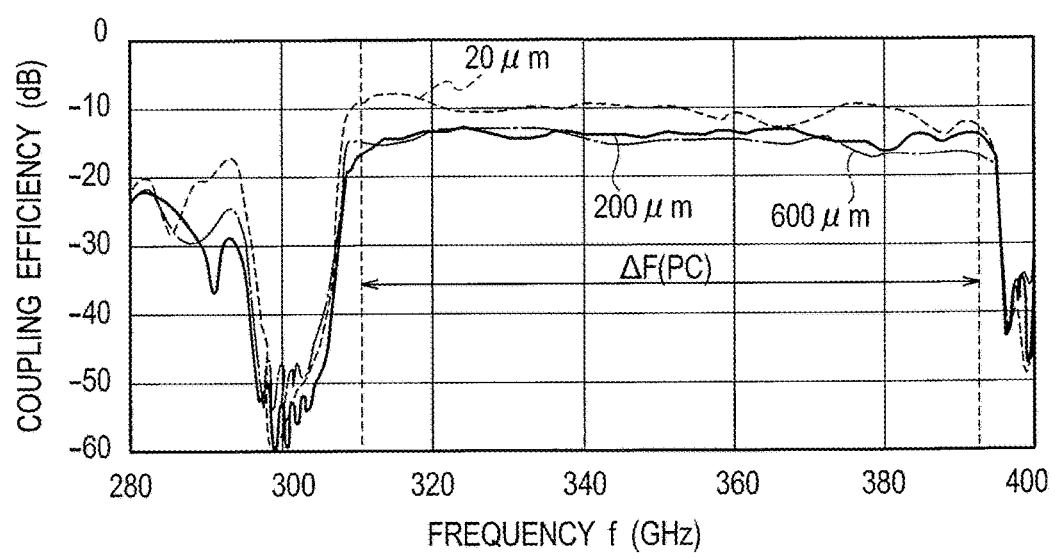
FIG. 20 shows a simulation result of frequency characteristics of coupling efficiency using a substrate thickness of the RTD device as a parameter, in the THz-wave device according to the first embodiment.

The thickness T1 of the InP substrate 100 on which the RTD 90 is mounted is preferred to be formed as thin as possible. As shown in FIG. 20 mentioned below, the thickness T1 of 20 μm was the most effective as a result of a simulation for calculating a variety of thicknesses T1 of the InP substrate 100 (600 μm, 200 μm, 20 μm). In addition, if the SBD is mounted thereon, a GaAs substrate can be applied thereto, instead of the InP substrate. Similarly, the thickness of the GaAs substrate is preferred to be formed as thin as possible.

In the RTD device 4, if the thickness of the InP substrate 100 on which the RTD 90 and the tapered slot antenna is formed as thin as possible, there is produced an effect of controlling an in-substrate mode similar to the explained propagation mode of the THz wave shown in FIG. 5. Moreover, condensing characteristics of the tapered slot antenna can also be utilized more effectively. Moreover, as shown in FIG. 6, extraction and introduction of signals are possible by bonding the bonding wire 132 composed of Au. Although the bonding wire 132 composed of Au was applied for the convenience of the experiment, other coupling means, e.g. a metallic wiring, may be applied thereto.

In the THz-wave device 140U according to the first embodiment, it is possible to efficiently transport the energy to the RTD 90 portion by forming the InP substrate 100 as thin as possible on which the RTD 90 and the tapered slot antenna are mounted.

(Modified Example 1 of The First Embodiment: Disposition Method 2 of RTD Device in Which Tapered Slot Antenna is Integrated)

Figure 7:
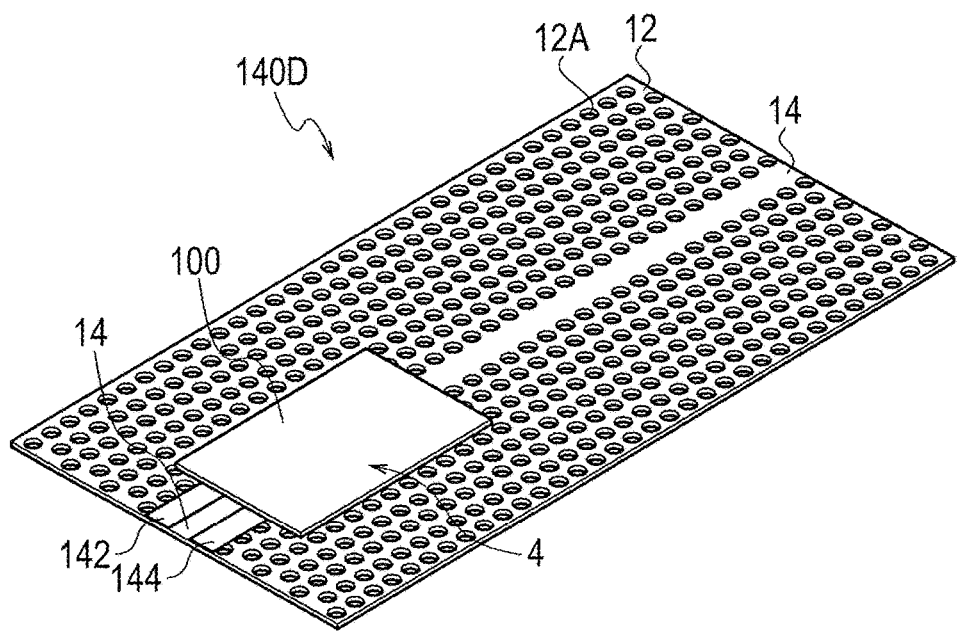
FIG. 7 is a schematic bird's-eye view configuration diagram showing a THz-wave device according to a modified example 1 of the first embodiment in which the RTD is disposed on the 2D-PC slab.

FIG. 7 shows a schematic bird's-eye view configuration of the THz-wave device 140D according to a modified example 1 of the first embodiment on which the RTD device 4 is disposed on the 2D-PC slab 12.

Figure 8:
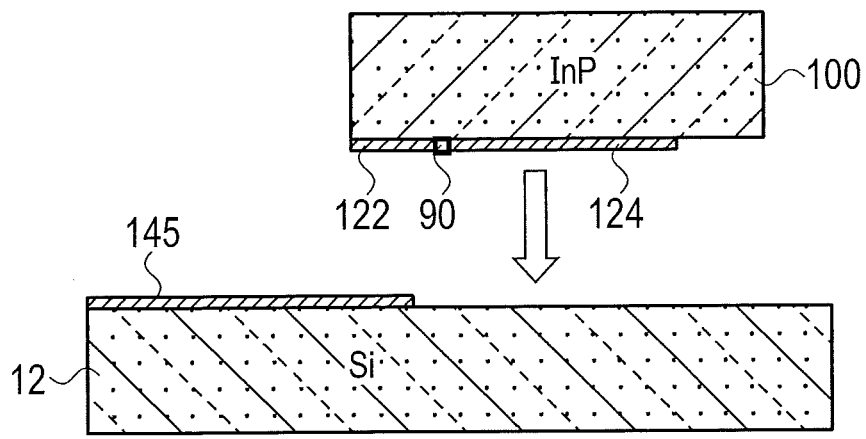
FIG. 8 is a schematic cross-sectional structure diagram for explaining a coupling method of the THz-wave device according to the modified example 1 of the first embodiment.
Figure 9:
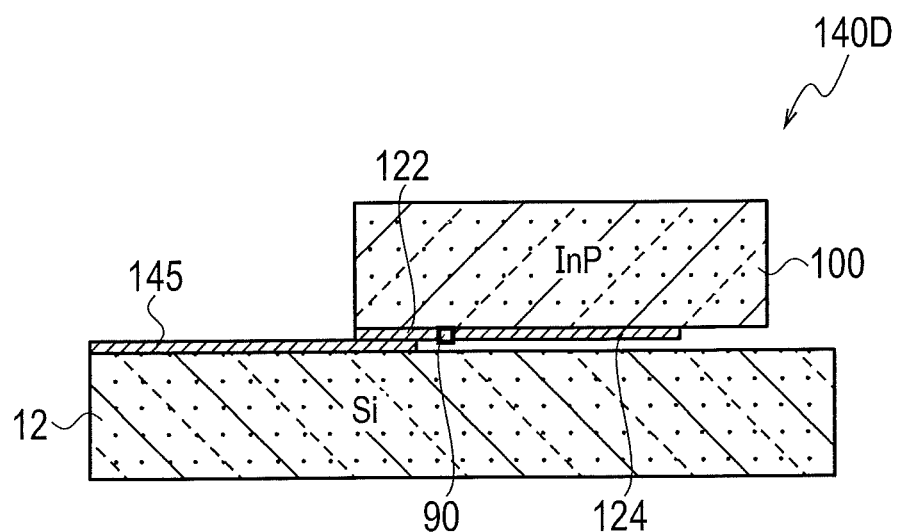
FIG. 9 is a schematic cross-sectional structure diagram of showing the THz-wave device according to the modified example 1 of the first embodiment in which the RTD is disposed on the 2D-PC slab.

In the THz-wave device 140D according to the modified example 1 of the first embodiment, as shown in FIG. 7, the diode device is disposed on the 2D-PC waveguide 14 so that an antenna electrode surface is mounted face-down thereon, in flip chip configuration. More specifically, in the example shown in FIG. 7, the RTD device 4 is applied as a diode device, and the RTD device 4 is disposed in flip chip configuration on the 2D-PC waveguide 14, as shown in FIGS. 8 and 9 mentioned below.

In the case of upper disposition structure, it is preferable to form as thinly as possible the substrate of the RTD device 4 (composed of InP in the case of RTD, and GaAs in the case of SBD), but it is rate-controlled by a polishing process limitation. Accordingly, if the diode chip can be mounted face-down thereon as a flip chip, the diode portion can be brought more close to the surface of the 2D-PC waveguide 14. According to such a flip chip mounting structure, the effect can be expected same as that of the structure of forming the substrate as thin as possible. However, in order to control the substrate mode also in such a flip chip mounting structure, it is similarly preferable to form the substrate as thin as possible.

In order to realize the disposition of flip chip mounting structure, it is necessary to form a signal line on the 2D-PC waveguide 14 itself for the purpose of signal extraction/introduction. FIG. 7 shows an examples that the electrodes 142, 144 are signal lines connected to the electrodes 122, 124 of the RTD device 4 disposed in flip chip configuration.

(Coupling Method of THz-Wave Device)

FIG. 8 shows a schematic cross-sectional structure for explaining a coupling method of the THz-wave device according to the modified example 1 of the first embodiment.

FIG. 9 shows a schematic cross-sectional structure of the THz-wave device 140D according to the modified example 1 of the first embodiment on which the RTD device 4 is disposed on the 2D-PC slab.

In the flip chip mounting, as a method of bonding to be contacted with the first electrode 122 and the signal line 145 formed on the 2D-PC slab 12, for example, there is a method of using conductive paste, or a method of forming an Au bump to connect the signal line 145 via such an Au bump, for example.

Figure 10:
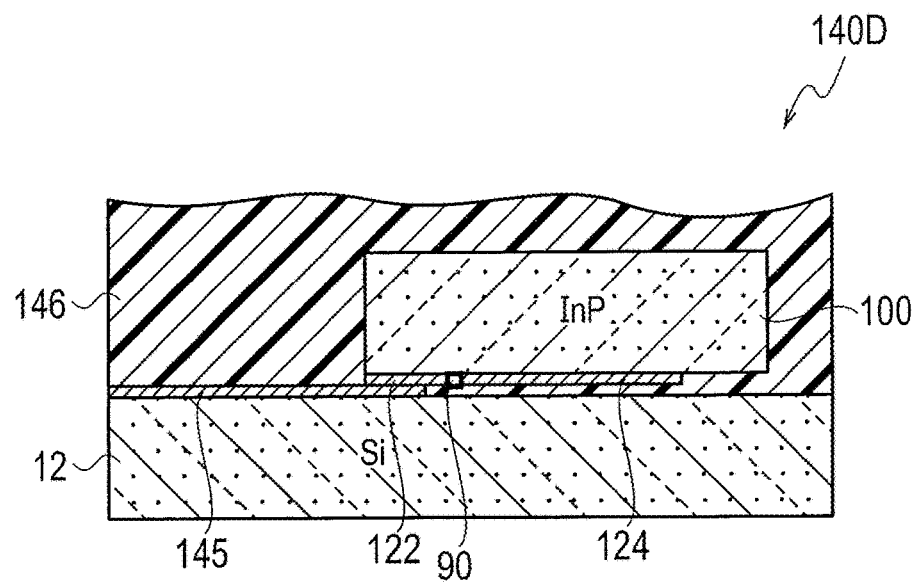
FIG. 10 is a schematic cross-sectional structure diagram showing the THz-wave device according to the modified example 1 of the first embodiment in which the RTD is disposed on the 2D-PC slab, sealed with a resin.

FIG. 10 is a schematic cross-sectional structure of the THz-wave device according to the modified example 1 of the first embodiment in which the RTD is disposed on the 2D-PC slab, sealed with a resin 146. For example, an air gap can be relaxed by filling up a gap occurs at the time of bonding with resin etc.

(Modified Example 2 of First Embodiment)

Figure 11:
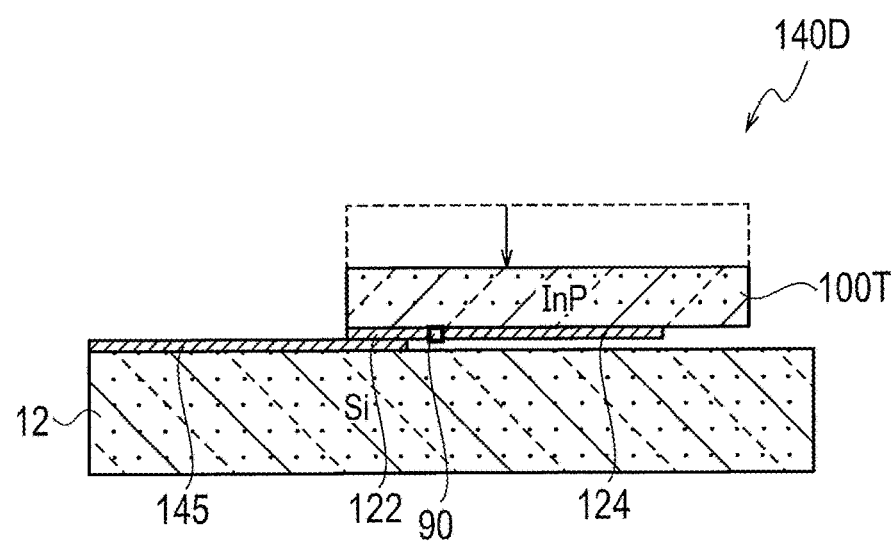
FIG. 11 is a schematic cross-sectional structure diagram of a THz-wave device related to a modified example 2 of a first embodiment in which the InP substrate is thin-layered.

FIG. 11 shows a schematic cross-sectional structure of the THz-wave device 140D according to a modified example 2 of the first embodiment in which the InP substrate 100T is thin-layered.

Figure 12:
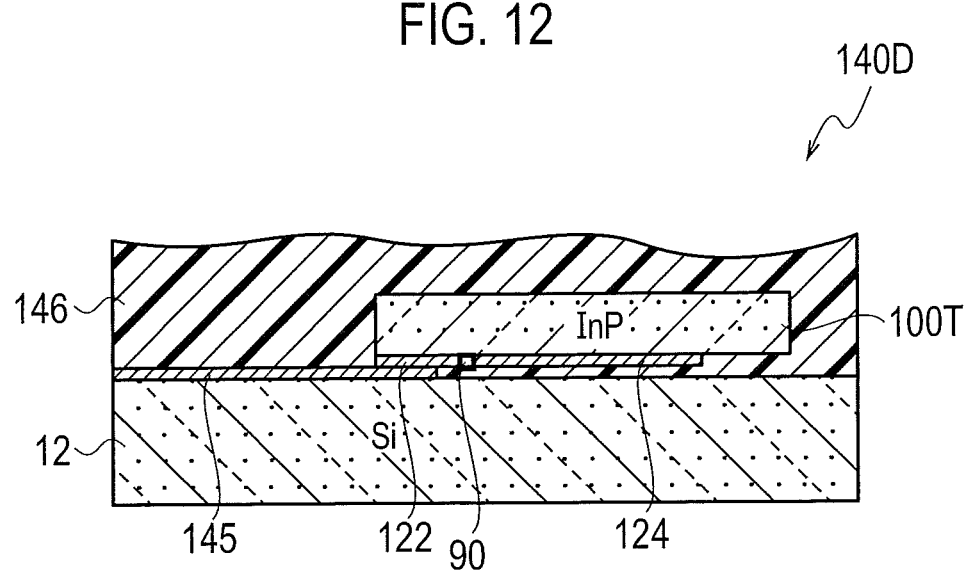
FIG. 12 is a schematic cross-sectional structure diagram showing the THz-wave device according to the modified example 2 of the first embodiment sealed with a resin, in which the InP substrate is thin-layered.

FIG. 12 shows a schematic cross-sectional structure of the THz-wave device 140D according to the modified example 2 of the first embodiment sealed with a resin layer 146, in which the InP substrate 100T is thin-layered.

In the case of the flip chip mounting, the antenna electrode surface is mounted face-down thereon. In this case, a position of the diode becomes the closest to the surface of the 2D-PC waveguide 14, and thereby improving also introductory efficiency of the energy. Even in this case, in order to avoid a mode in the InP substrate, or an energy leakage from the upper part to the outside via InP substrate 100, it is preferable to also form the InP substrate 100 as thin as possible.

(Modified Example 3 of First Embodiment)

Figure 13:
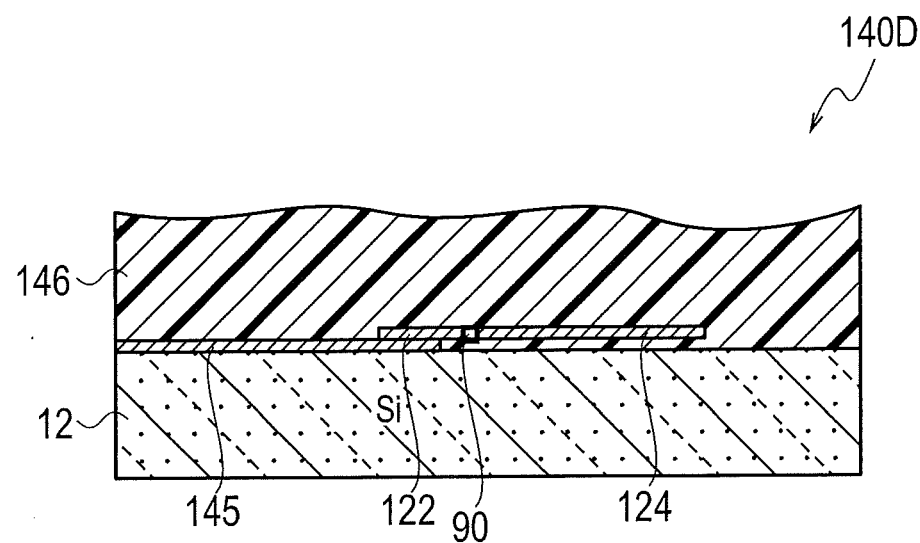
FIG. 13 is a schematic cross-sectional structure diagram showing a THz-wave device according to a modified example 3 of the first embodiment.

FIG. 13 shows a schematic cross-sectional structure of a THz-wave device 140D according to a modified example 3 of the first embodiment.

If the signal line 145 formed on the RTD device 4 (122, 124, 90) and the 2D-PC slab 12 can be fixed as the state of contacting in flip chip configuration, with a resin layer 146, an adhesive agent, etc., it will be in the same state as the state where all the InP substrate 100 is removed with Hydrochloric acid, and then only thin films of the antenna electrodes 122, 124 and the RTD 90 are transferred on the 2D-PC slab 12. In this case, a position of the RTD 90 becomes the closest to the surface of the 2D-PC waveguide 14, and thereby improving also introductory efficiency of the energy more than that of the modified example 2. Moreover, the mode in the InP substrate, or energy leakage from the upper part to the outside via the InP substrate can also be avoided.

(Example of Mounting Structure of Coplanar Mounting Substrate)

Figure 14:
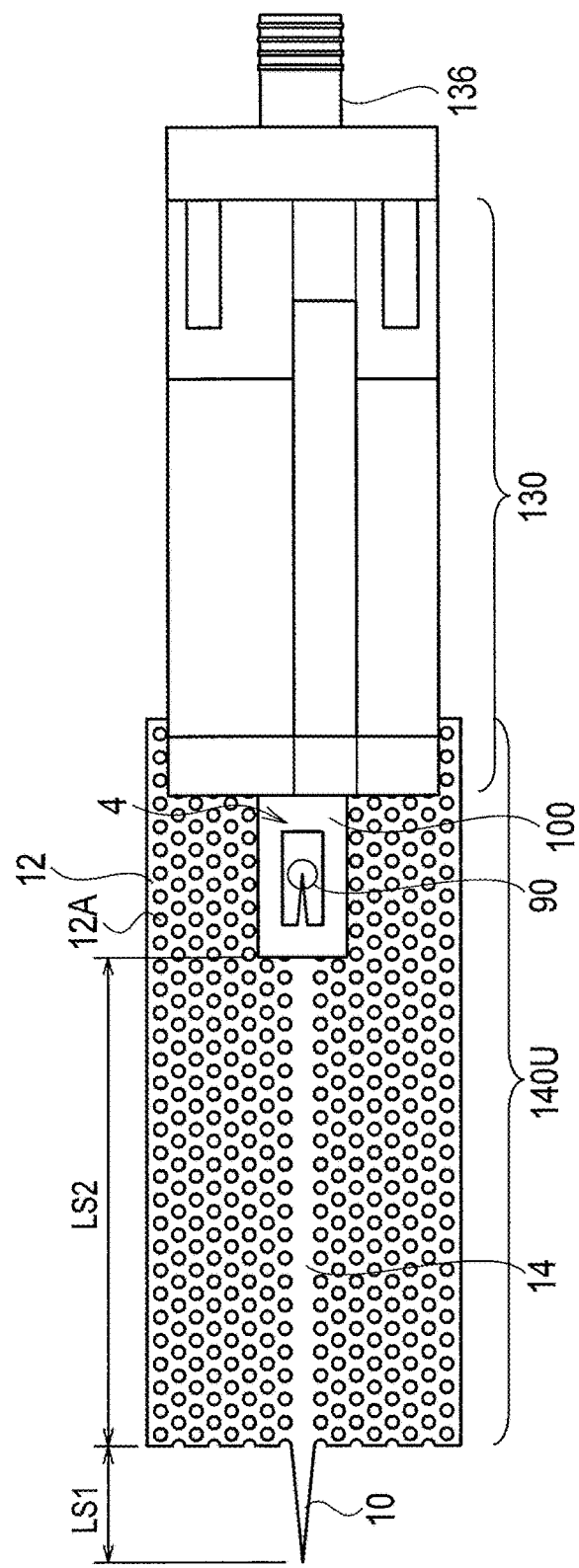
FIG. 14 is a schematic top view diagram showing an example of mounting structure of the THz-wave device according to the first embodiment and a coplanar mounting substrate.
Figure 15:
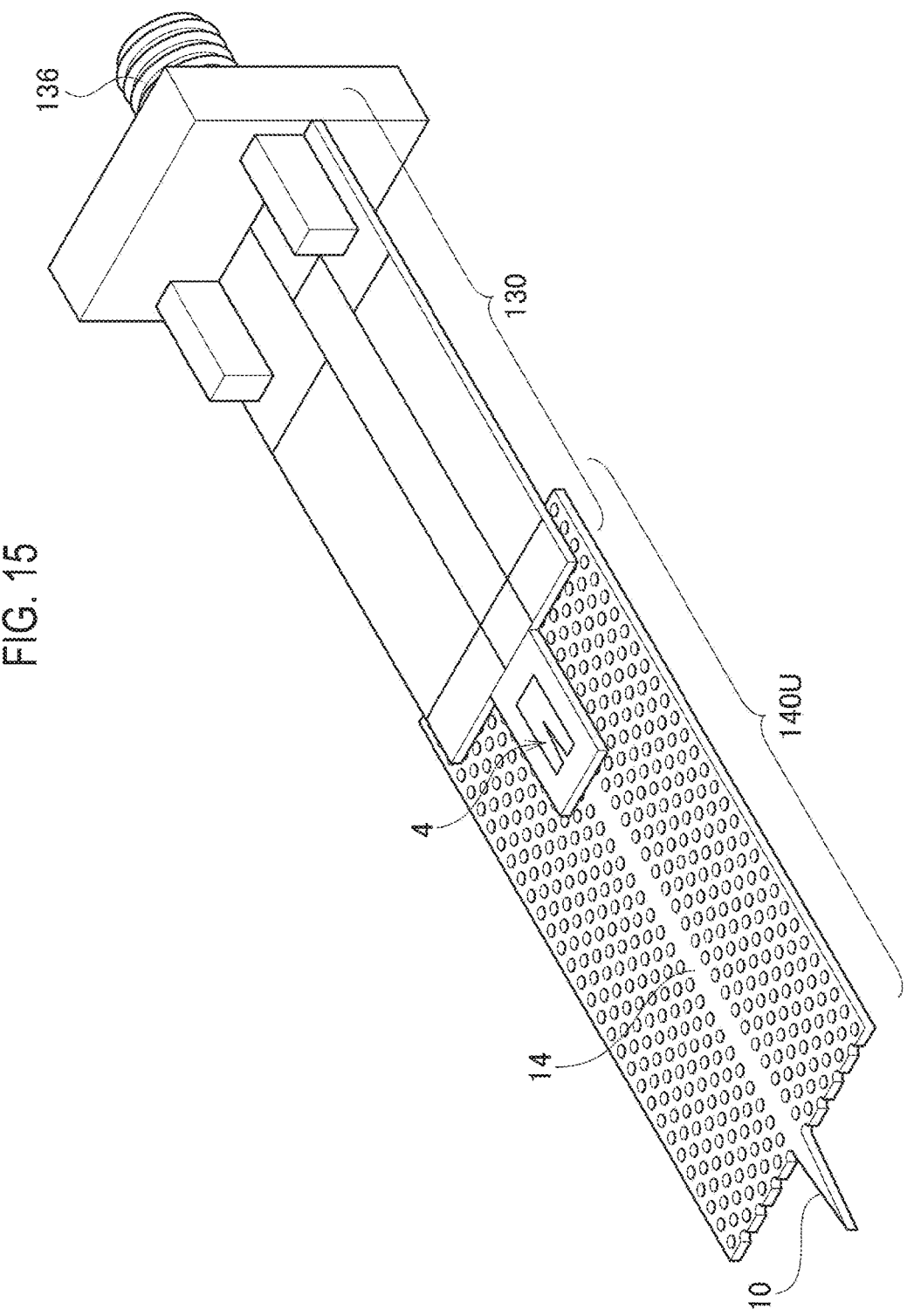
FIG. 15 is a line drawing showing a surface of the example of the mounting structure of the THz-wave device according to the first embodiment and the coplanar mounting substrate.

FIG. 14 shows a schematic plane configuration of an example of mounting structure of the THz-wave device 140U according to the first embodiment and the coplanar mounting substrate 130. FIG. 15 is a line drawing of a surface thereof corresponding to that in FIG. 14. The configuration shown in FIGS. 14 and 15 corresponds to the disposition method 1 (FIG. 6) of the RTD device in which the tapered slot antenna is integrated. That is, the diode is formed on the 2D-PC waveguide 14 so that a center of the diode (including electrode structure) is disposed at a center portion of the 2D-PC waveguide 14. Moreover, the InP substrate 100 may be polished to be formed as thin as possible. In this trial production, the InP substrate 100 was polished so that the thickness thereof became to 200 μm. On the other hand, as the THz-wave device 140U according to the first embodiment, the SBD in which the GaAs substrate is thin-layered can be mounted thereon, instead of the RTD 90, at the time of composing a receiver.

In this case, a period a of the lattice point 12A formed in the 2D-PC slab 12 is approximately 240 µm. Moreover, a resistibility of the silicon substrate for forming the 2D-PC slab 12 is approximately 10000 Ωcm. Moreover, in FIG. 14, the length LS2 of the 2D-PC waveguide 14 is approximately 14 mm.

Moreover, as shown in FIGS. 14 and 15, the edge face of the 2D-PC slab 12 on which the 2D-PC waveguide 14 is extended formed on the 2D-PC slab 12 may include an adiabatic mode converter 10 to which the 2D-PC waveguide is extended, in order to improve bonding characteristics with a WR-3 waveguide etc. The length LS1 of the adiabatic mode converter 10 is approximately 3 mm, for example.

The adiabatic mode converter 10 is provided with a taper shape so that a tip part thereof becomes thinner as being separated from the edge face of the 2D-PC slab 12, in the planar view of the 2D-PC slab 12. The side surface of the taper shape may include an inclined surface. Moreover, the side surface of the taper shape may include a curved surface. Moreover, the side surface of the taper shape may include a stepped surface.

Moreover, the adiabatic mode converter 10 may include a conical shape so that the tip part becomes thinner as being distanced from the edge face of 2D-PC slab 12.

Moreover, the adiabatic mode converter 10 may include a quadrangular pyramid shape so that the tip part becomes thinner as being distanced from the edge face of 2D-PC slab 12.

Moreover, the adiabatic mode converter 10 may include a wedge-like shape so that the tip part becomes thinner as being distanced from the edge face of 2D-PC slab 12.

Moreover, the adiabatic mode converter 10 may include a wedge-like shape so that the thickness of the tip part becomes thinner as being distanced from the edge face of 2D-PC slab 12.

Moreover, the adiabatic mode converter 10 may include a stairs-like shape so that the thickness of the tip part becomes thinner as being distanced from the edge face of 2D-PC slab 12.

Moreover, the adiabatic mode converter 10 may be protected with a resin layer.

The adiabatic mode converter 10 can be inserted into a waveguide line. In this case, a waveguide flange disposed at an edge face of the 2D-PC slab 12 may be in contact with the edge face. The waveguide flange disposed at the edge face of the 2D-PC slab 12 may be separated from the edge face.

Furthermore, the edge face of the 2D-PC slab 12, where the adiabatic mode converter is disposed, includes a gap between the 2D-PC slab 12 and the waveguide flange arranged at the edge face of the 2D-PC slab 12, in the peripheral part of the adiabatic mode converter 10, and may be separated from a waveguide flange. If there is such a gap, since the waveguide flange is disposed so as to be separated from the edge face of the 2D-PC slab 12, a surface mode of the THz input wave can be controlled.

Although the detailed structure is omitted, in an example shown in FIG. 15, the edge face of the 2D-PC slab 12 where the adiabatic mode converter 10 is disposed includes a gap in a peripheral part of the adiabatic mode converter 10 between the 2D-PC slab 12 and the waveguide flange disposed in the edge face of the 2D-PC slab 12.

(Frequency Characteristics of RTD Detection Intensity in Accordance with the Existence or Nonexistence of PC)

Figure 16:
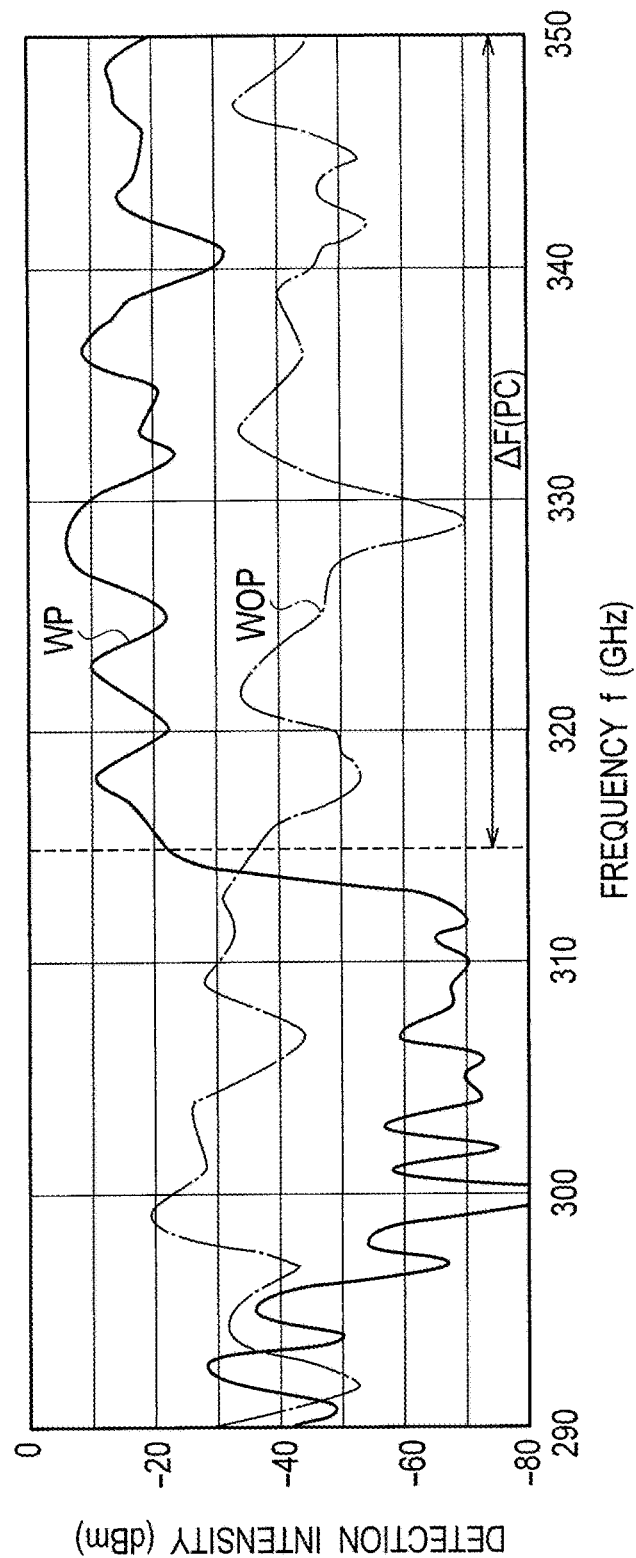
FIG. 16 shows an experimental result of frequency characteristics of RTD detection intensity in accordance with the existence or nonexistence of PC, in the THz-wave device according to the first embodiment.

FIG. 16 shows an experimental result of frequency characteristics of RTD detection intensity in accordance with the existence or nonexistence of PC, in the THz-wave device according to the first embodiment. In FIG. 16, the curved line WP indicates detection intensity (dBm) of the THz-wave device according to the first embodiment in which the 2D-PC slab 12 is applied as shown in FIGS. 14 and 15, and the THz wave propagating along the 2D-PC waveguide 14 is received by the tapered slot antenna. On the other hand, the curved line WOP indicates detection intensity (dBm) in a comparative example of directly receiving the THz wave by the tapered slot antenna without applying the 2D-PC slab 12.

In the THz-wave device according to the first embodiment, as shown in FIG. 16, the detection intensity (dBm) is improved by as much as 34 dB on average, in the PC waveguide band ΔF(PC). In the case of merely a diode on which a metallic electrode/antenna is arranged without the PC waveguide, the directive frequency dependency of the antenna greatly affects and the detection intensity fluctuates in a range of 50 dB. Meanwhile, in accordance with detection through the 2D-PC waveguide 14, fluctuation of the detection intensity can also be reduced to equal to or less than 20 dB. In a simulation result, the fluctuation is equal to or less than 2 dB.

On the other hand, according to a comparison result of the detection intensity with the RTD with lens, the detection intensity is experimentally improved in a range of 3 to 13 dB in the THz-wave device according to the first embodiment, as compared with the RTD with lens by which an antenna gain of 8 dB is improved as compared with the free space incident.

(Eye Pattern)

Figure 17:
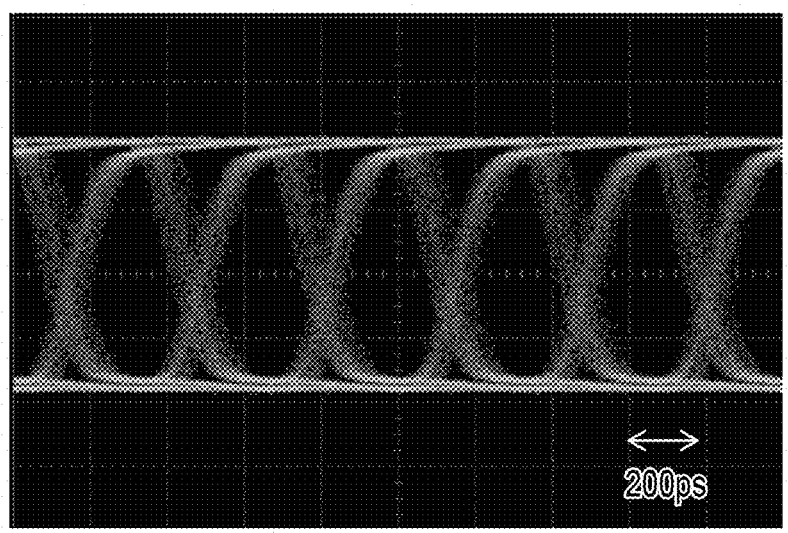
FIG. 17 shows an experimental result of gigabit communications in the THz-wave device according to the first embodiment, which is an eye pattern at the time of 3-Gbps error free communications.

FIG. 17 shows an experimental result of gigabit communications in the THz-wave device according to the first embodiment, which is an eye pattern at the time of 3-Gbps error free communications. In the THz-wave device according to the first embodiment, an error free transmission by 3-Gbps real time communications can be realized. More specifically, in the detecting operation of the fabricated THz wave device module according to the first embodiment, it succeeded also in the 3-Gbps error free communications.

(Displacement of RTD Device)

Figure 18B:
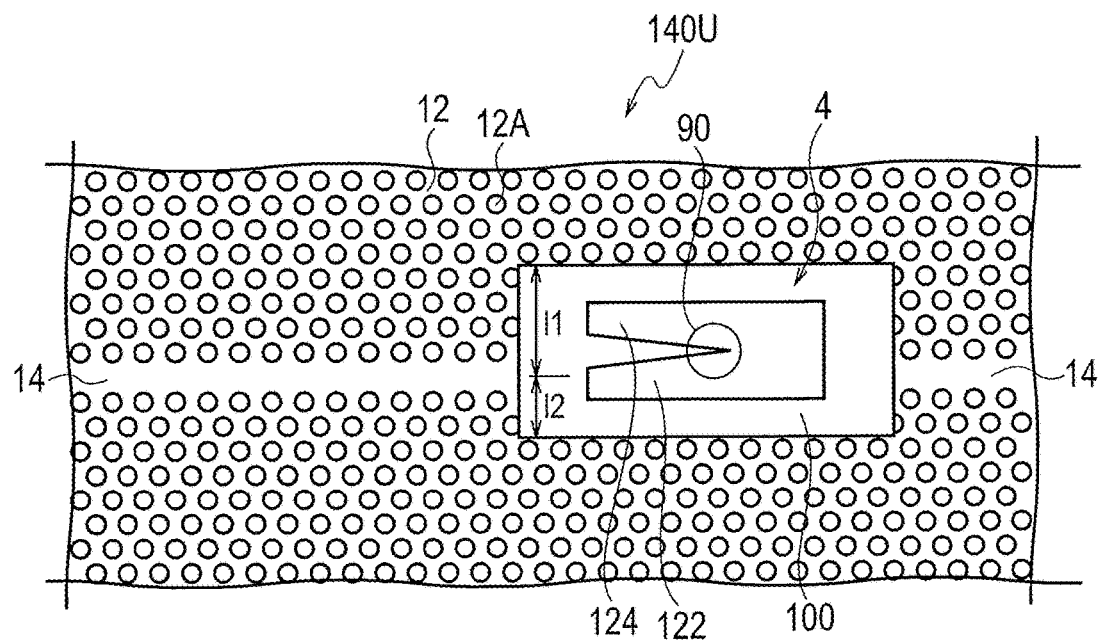
FIG. 18B is a schematic top view diagram for explaining an example that the displacement of the RTD device (difference between $l_1$ and $l_2$) mounted on the 2D-PC waveguide is relatively large (i.e., a).

FIG. 18A shows an example that small displacement of the RTD device 4 mounted on the 2D-PC waveguide 14 (difference between $l_1$ and $l_2$) is relatively small, in the THz-wave device 140U according to the first embodiment. FIG. 18B shows an example that the displacement thereof is relatively large. FIG. 18A corresponds to the case where the displacement of the RTD device 4 mounted on the 2D-PC waveguide 14 (difference between $l_1$ and $l_2$) is as small as periodic a/8 (30 µm). FIG. 18B corresponds to the case where the displacement of the RTD device 4 mounted on the 2D-PC waveguide 14 (difference between $l_1$ and $l_2$) is as large as period a (240 µm).

Figure 19:
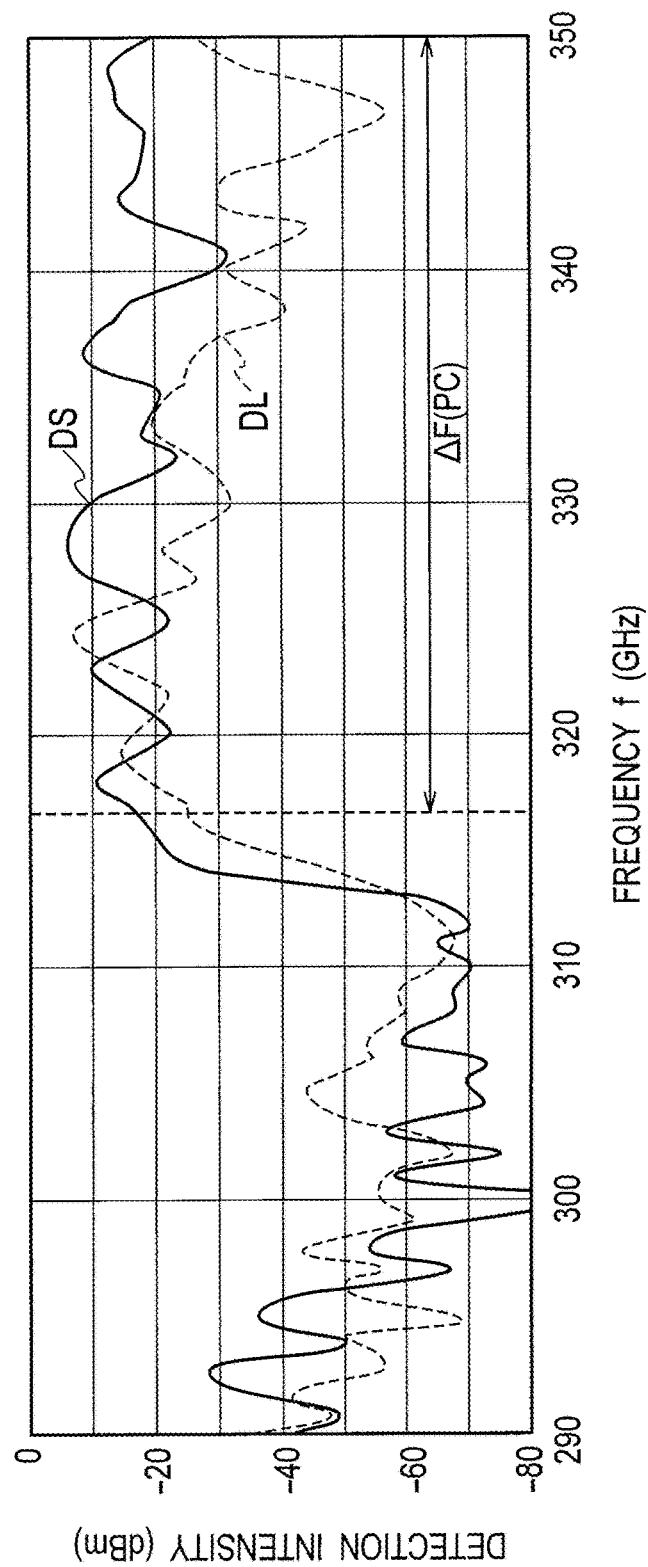
FIG. 19 shows an experimental result of frequency characteristics of RTD detection intensity in accordance with degrees of the displacement, in the THz-wave device according to the first embodiment.

FIG. 19 shows an experimental result of frequency characteristics of RTD detection intensity in accordance with degrees of the displacement, in the THz-wave device according to the first embodiment. In FIG. 19, the curved line DS corresponds to an example (FIG. 18A) where the displacement of the RTD device 4 (difference between $l_1$ and $l_2$) mounted on the 2D-PC waveguide 14 is relatively small, and the curved line DL corresponds to an example (FIG. 18B) where the displacement of the RTD device 4 (difference between $l_1$ and $l_2$) mounted on the 2D-PC waveguide 14 is relatively large. The detection intensity in the PC waveguide band ΔF(PC) is improved by performing alignment thereof by as much as approximately 18 dB on average. More specifically, it is preferable to align the center of the RTD device 4 and the center of the 2D-PC waveguide 14 with an accuracy period of not more than a/4.

(Substrate Thickness Dependency: Simulation Result)

FIG. 20 shows a simulation result of frequency characteristics of coupling efficiency using the thickness the InP substrate 100 of the RTD device 4 as a parameter, in the THz-wave device according to the first embodiment.

If the thickness of the InP substrate 100 of the RTD device 4 is changed from 600 μm, to 200 μm, to 20 μm, the more the thickness of the InP substrate 100 is thin, the more the average coupling efficiency is improved in the PC waveguide band ΔF(PC), as shown in FIG. 20. For example, if the thickness of the InP substrate 100 is changed from 600 μm, to 200 μm, and to 20 μm, the average coupling efficiency is improved from −14 dB, to −13 dB, and to −10 dB.

[Second Embodiment]
(THz-Wave Device)

Figure 21:
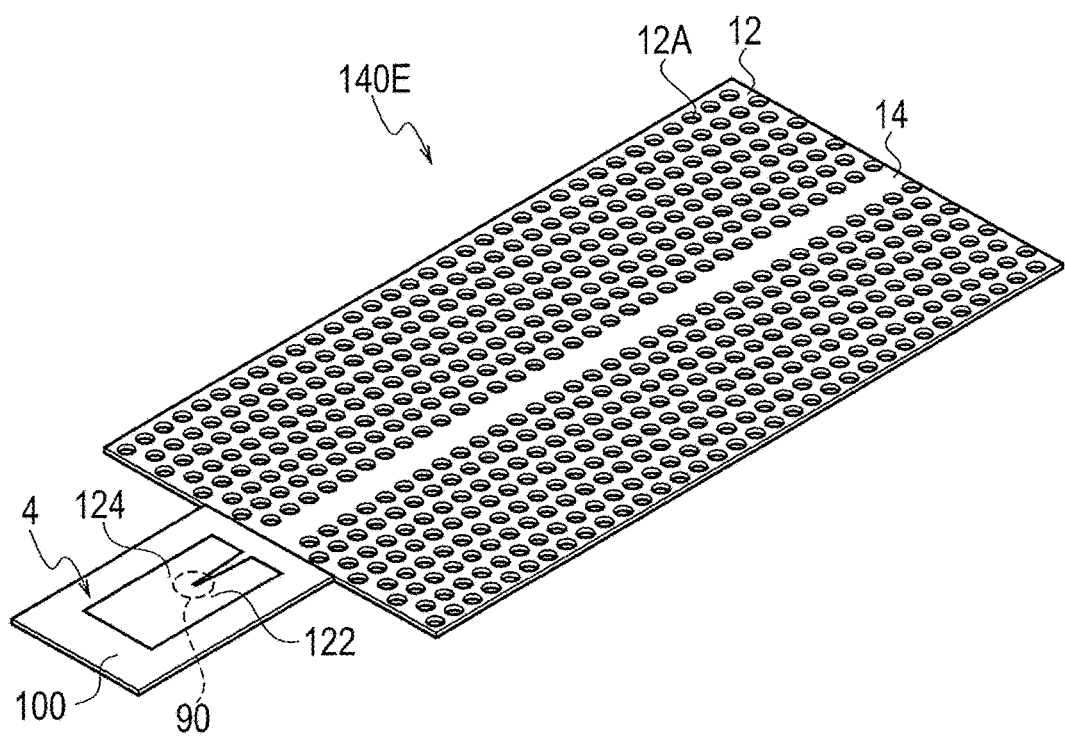
FIG. 21 is a schematic bird's-eye view configuration diagram showing a THz-wave device according to a second embodiment.

FIG. 21 shows a schematic bird's-eye view configuration of a THz-wave device 140E according to a second embodiment.

As shown in FIG. 21, the THz-wave device 140E according to the second embodiment includes: a 2D-PC slab 12; lattice points 12A periodically arranged in the 2D-PC slab 12, the lattice points 12A for diffracting the THz waves in PBG frequencies of photonic band structure of the 2D-PC slab 12 in order to prohibit existence in a plane of the 2D-PC slab 12; a 2D-PC waveguide 14 disposed in the 2D-PC slab 12 and formed with a line defect of the lattice points 12A; and an RTD device 4 disposed at an edge face of the 2D-PC slab 12 to which the 2D-PC waveguide 14 extended.

In this case, if the RTD device 4 is disposed so that the RTD 90 of the RTD device 4 and the center of a near-field pattern of the electromagnetic field distribution in the edge face of the 2D-PC waveguide 14 become close to each other, the coupling efficiency can be more improved.

Figure 22:
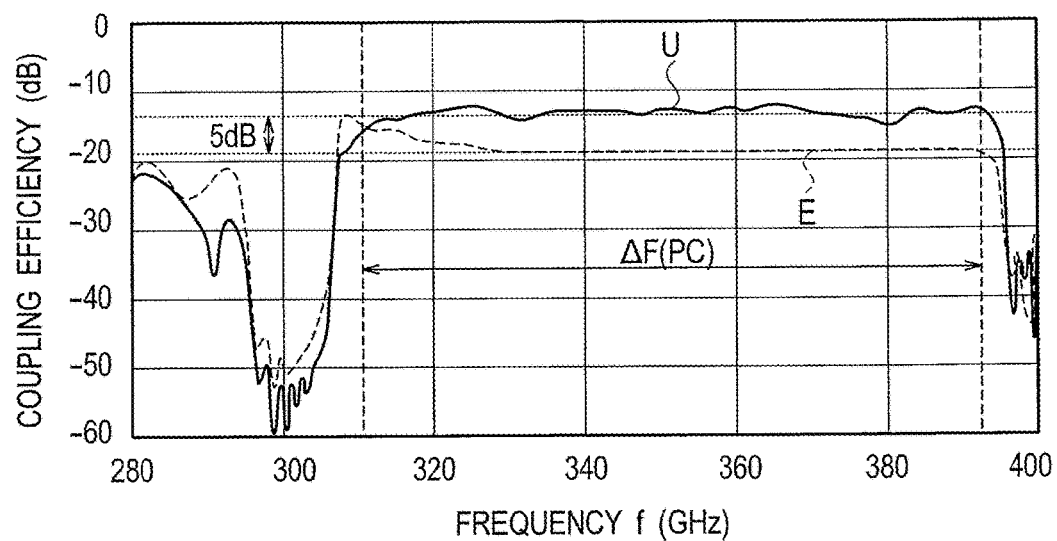
FIG. 22 shows a comparison result (simulation result) of frequency characteristics of coupling efficiency in accordance with installation methods of the RTD device, in the THz-wave device according to the first and second embodiments.

FIG. 22 shows a simulation result in comparison of frequency characteristics of coupling efficiency in accordance with installation methods of the RTD device, in the THz-wave device according to the first and second embodiments. In FIG. 22, the curved line U corresponds to a top surface installation type of the THz-wave device 140U according to the first embodiment, and the curved line E corresponds to an edge face installation type of the THz-wave device 140E according to the second embodiment.

The coupling of the electromagnetic waves can be realized by not only disposing the THz-wave device on the 2D-PC waveguide 14 of the 2D-PC slab 12, but also disposing the THz-wave device on the edge face thereof. As shown in FIG. 22, in the PC waveguide band ΔF(PC), the signal strength is reduced by 5 dB according to the edge face coupling, as a result, but it is usable in dependence on a purpose.

The multiple reflection and the Fabry-Pérot mode in the diode element are reduced, and strong fluctuation is reduced to less than 2 dB since the calculation at this time uses the surroundings of the diode as an absorbing boundary condition.

[Third Embodiment]
(Embedded Type)

Figure 23:
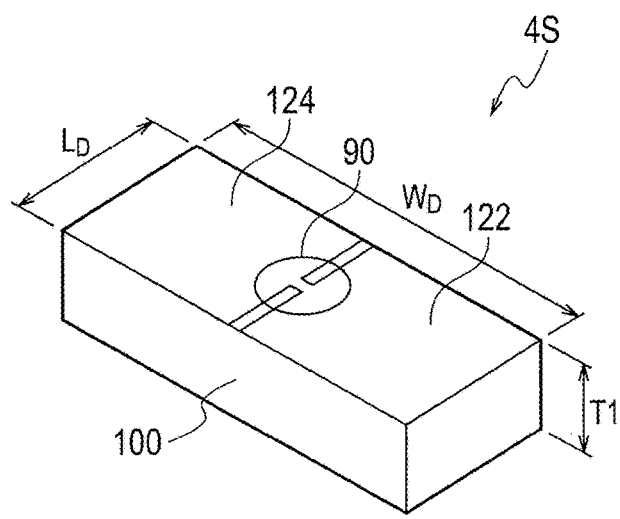
FIG. 23 is a schematic bird's-eye view configuration diagram showing an RTD device applicable to a THz-wave device according to the third embodiment.

FIG. 23 shows a schematic bird's-eye view configuration of an RTD device 4S applicable to a THz-wave device according to a third embodiment. In FIG. 23, the width of the RTD device 4S is substantially equal to $W_D$, the length thereof is substantially equal to $L_D$, and the thickness thereof is substantially equal to the thickness T1 of the InP substrate 100.

As shown in FIG. 23, the RTD device 4S applicable to the THz-wave device according to the third embodiment includes: a semiconductor substrate 100; a first electrode 122 and a second electrode 124 disposed on the semiconductor substrate 100; and an RTD 90 disposed on the semiconductor substrate 100, wherein a main electrode of the RTD 90 is connected to the first electrode 122 and the second electrode 124. More specifically, the RTD device 4S has a shape of cutting off the tapered slot antenna portion shown in FIG. 3, and the diode is merely wired to electrodes 122, 124.

The RTD device 4S applicable to the THz-wave device according to the third embodiment forms a dipole antenna different from the tapered slot antenna type. Other configurations shown therein are the same as those shown in FIG. 3. A butted type, an embedded type, etc. can be adopted for the method of coupling to the 2D-PC waveguide.

In the structure of the RTD device 4S shown in FIG. 23, since there is no portion in which antenna operation is performed, high gain is not theoretically obtained. Accordingly, any additional ingenuity for efficiently introducing the electromagnetic waves from the outside to the diode portion is needed. For example, it may also be mounted on a horn antenna to achieve high gain. More specifically, in the RTD device 4S applicable to the THz-wave device according to the third embodiment, not only the electrodes 122, 124 are attached thereto, but also an antenna for producing an electromagnetic wave in up-and-down directions, e.g. a slot antenna, a patch antenna, a dipole antenna, may be integrated thereinto.

Figure 24:
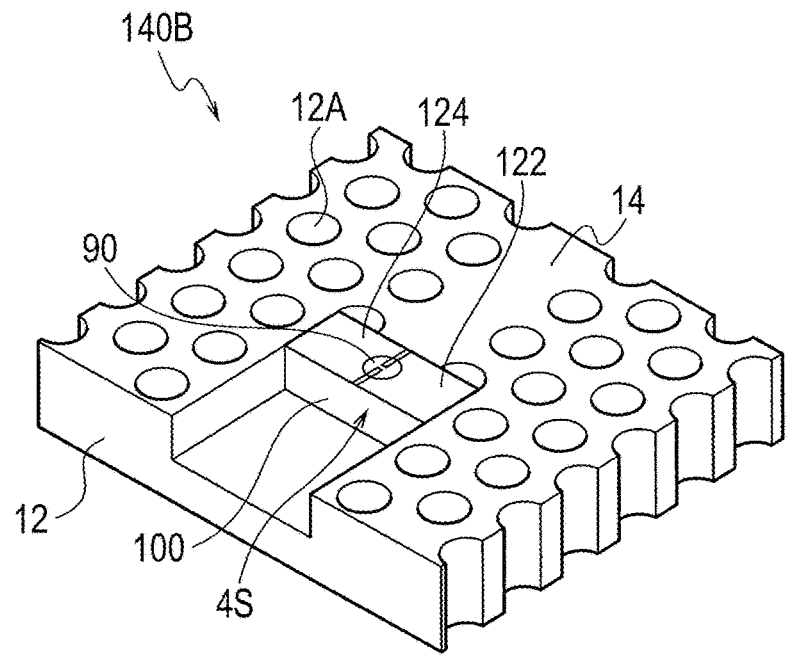
FIG. 24 is a schematic bird's-eye view configuration diagram showing the THz-wave device according to the third embodiment.
Figure 25:
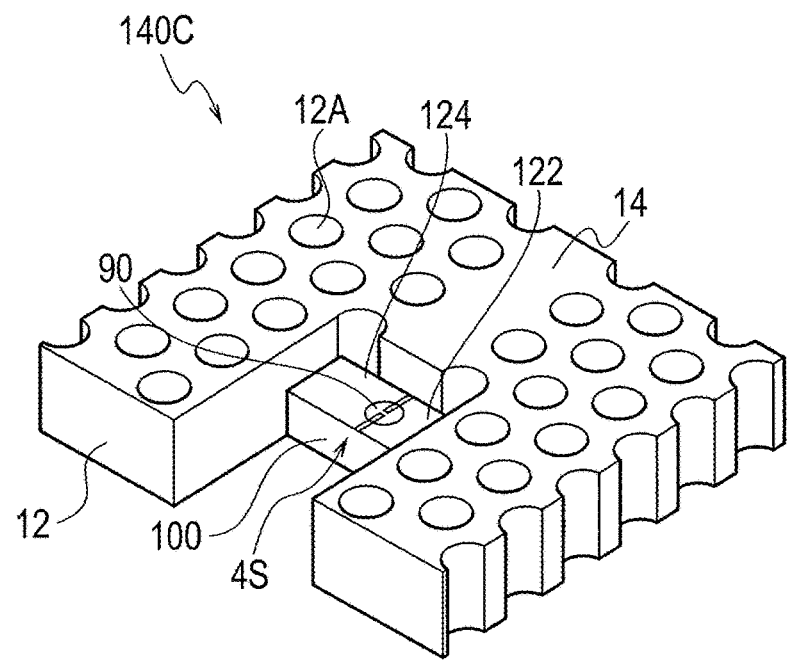
FIG. 25 is a schematic bird's-eye view configuration diagram showing a THz-wave device according to a modified example of the third embodiment.

In the THz-wave device according to the third embodiment, as shown in FIGS. 24 and 25, the introductory structure from the 2D-PC waveguide 14 fulfills such a role of obtaining gain.

FIG. 24 shows a schematic bird's-eye view configuration of the THz-wave device according to the third embodiment.

As shown in FIG. 24, the THz-wave device 140B according to the third embodiment includes: a 2D-PC slab 12; lattice points 12A periodically arranged in the 2D-PC slab 12, the lattice points 12A for diffracting the THz waves in PBG frequencies of photonic band structure of the 2D-PC slab 12 in order to prohibit existence in a plane of the 2D-PC slab 12; a 2D-PC waveguide 14 disposed in the 2D-PC slab 12 and formed with a line defect of the lattice points 12A; and a diode device disposed in a trench formed in the 2D-PC waveguide 14 so that a top surface of the diode device is flush with a surface of the 2D-PC waveguide 14.

In this case, the diode device can be composed of an RTD devices 4S in which tapered slot antenna structure is cut off, as shown in FIG. 23.

The RTD device 4S includes: a semiconductor substrate 100; a first electrode 122 and a second electrode 124 disposed on the semiconductor substrate 100; and an RTD 90 disposed on the semiconductor substrate 100, wherein a main electrode of the RTD 90 is connected to the first electrode 122 and the second electrode 124.

Moreover, the diode device can also be composed of ad SBD, as a receiver.

In the THz-wave device 140B according to the third embodiment, an arrangement accuracy of the RTD device 4S is satisfactorily securable by forming the U-shaped trench in the 2D-PC waveguide 14, as shown in FIG. 24. More specifically, a positional adjustment in a horizontal direction vertical to the propagation of the THz wave can be simplified.

Furthermore, high gain can be achieved by reinforcing confinement of the electromagnetic waves by forming such a U-shaped trench in the 2D-PC waveguide 14.

As mentioned above, since an element which does not have a tapered slot antenna cannot obtain gain, energy cannot be efficiently introduced with structure bonded together to the upper part. Moreover, since a sufficient coupling length $L_C$ is not securable, structure for directly introducing the electromagnetic waves in a diode chip is required. The electromagnetic waves can be efficiently introduced into a terminal of the 2D-PC waveguide 14 by disposing the RTD device 4S, as an edge face arrangement structure similar to that of the second embodiment.

Moreover, as the THz-wave device according to the third embodiment, if a trench is formed near the terminal of the 2D-PC waveguide 14 in accordance with the width $W_D$ of the diode chip, a alignment positional adjustment in a horizontal direction can also be simplified. In addition, energy is more efficiently conveyed to the diode since the propagation mode is maintained due to the PBG effect up to both sides of the diode chip.

Moreover, although the radiation pattern is agreed with the moving direction of the wave in the tapered slot antenna, the above-mentioned disposition can be sufficiently realized even if another type of antenna (e.g., a patch antenna, a slot antenna, a dipole antenna, etc.), in which the electromagnetic waves are radiated in a vertical direction with respect to the substrate face, is integrated. If the chip is disposed in an upright position, efficient coupling is realizable since a moving direction of the electromagnetic waves and a radiation pattern of the antenna are agreed with each other. That is, in the THz-wave device according to the third embodiment, an element in which an antenna which is not a taper slot is integrated can be sufficiently realized.

(Modified Example of Third Embodiment: Butted Type)

FIG. 25 shows a schematic bird's-eye view configuration of a THz-wave device 140C according to a modified example of the third embodiment.

As shown in FIG. 25, the THz-wave device 140C according to the modified example of the third embodiment includes: a 2D-PC slab 12; lattice points 12A periodically arranged in the 2D-PC slab 12, the lattice points 12A for diffracting the THz waves in PBG frequencies of photonic band structure of the 2D-PC slab 12 in order to prohibit existence in a plane of the 2D-PC slab 12; a 2D-PC waveguide 14 disposed in the 2D-PC slab 12 and formed with a line defect of the lattice points 12A; and a diode device disposed in a trench formed in the 2D-PC waveguide 14 so that a surface of the diode device is matched with a cross-sectional center portion vertical to a surface of the 2D-PC slab 12 of the 2D-PC waveguide 14.

The THz wave propagating on the 2D-PC waveguide 14 has the strongest electric field at the center portion of the 2D-PC waveguide 14. Accordingly, if the height of the electrodes 122, 124 of the RTD device 4S is matched with the height of the cross-sectional center portion vertical to the surface of the 2D-PC slab 12 of the 2D-PC waveguide 14, coupling efficiency can be improved more than that of the embedded type shown in FIG. 24.

Figure 26:
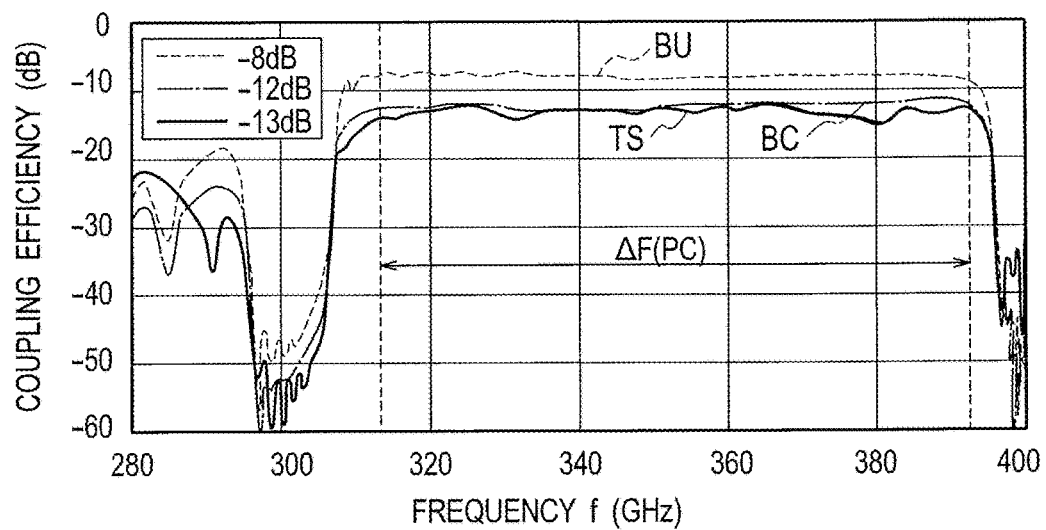
FIG. 26 shows frequency characteristics (simulation result) of coupling efficiency of the THz-wave devices according to the third embodiment and its modified example.

FIG. 26 shows frequency characteristics (simulation result) of coupling efficiency of the THz-wave devices according to the third embodiment and its modified example. In FIG. 26, the curved line BU corresponds to the embedded structure (FIG. 24), and the curved line BC corresponds to the butt structure (FIG. 25). Moreover, the curved line TS corresponds to the structure example in which the tapered slot RTD for the purpose of the comparison is disposed with the top surface installation type (FIG. 2), and the characteristics correspond to the curved line U of FIG. 22.

As shown in FIG. 26, in the THz-wave device according to the THz-wave device in the third embodiment and its modified example, the coupling efficiency in the case of the butt structure (FIG. 25) is improved by as much as approximately 4 dB more than that in the case of the embedded structure (FIG. 24), as a result of the coupling to the electric field distribution in the waveguide mode becoming effective.

Since the center of the waveguide has the strongest electric field, the coupling efficiency to the electric field distribution of the waveguide mode in the case of the butted type becomes satisfactory more than that in the case of the embedded type if the height of the electrode is matched with the center of the waveguide, and thereby the coupling efficiency can be improved by as much as approximately 4 dB.

(Influence of Multiple Reflection in Substrate)

Figure 27:
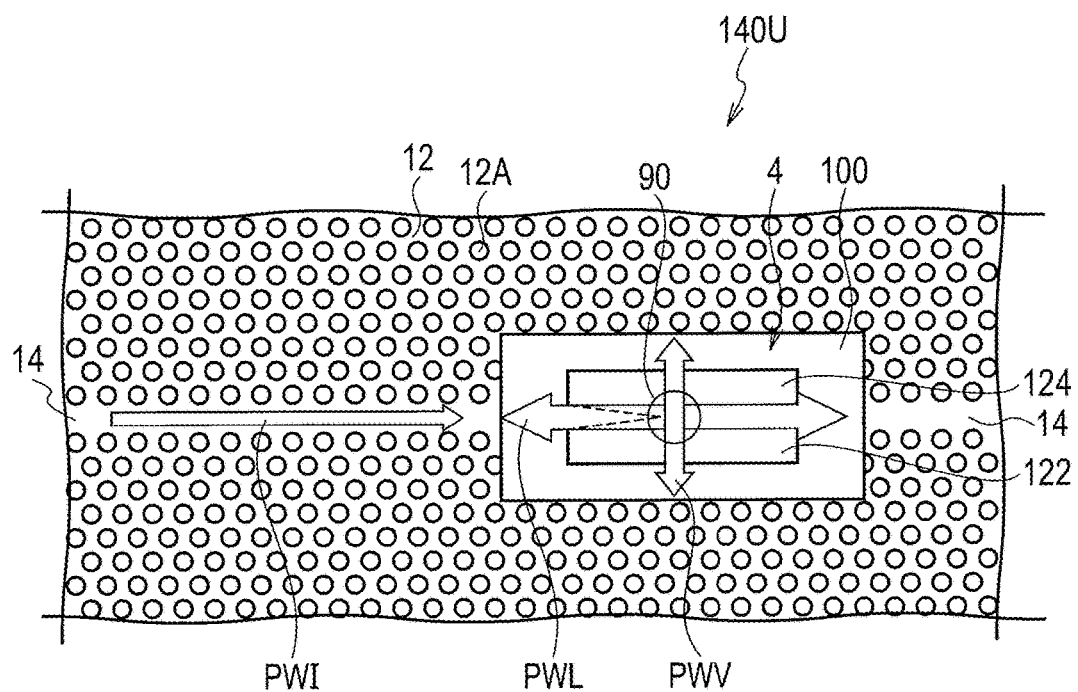
FIG. 27 is a schematic top view diagram for explaining a multiple reflection in the substrate, in the THz-wave device according to the third embodiment.

FIG. 27 shows a schematic plane configuration for explaining a multiple reflection in the InP substrate 100 of the RTD device 4 in the THz-wave device 140U according to the third embodiment. In FIG. 27, the RTD device 4 is disposed on the 2D-PC slab 12. The RTD device 4 is disposed so that a waveguide or wave-receiving direction of the slot antenna portion in the RTD device 4 is matched with the 2D-PC waveguide 14 formed with a line defect of the lattice points 12A of the 2D-PC slab 12. In this state, if the THz wave (arrow PW1) propagating along the 2D-PC waveguide 14 is received, there are generated a multiple reflection wave (arrow PWL) in a direction to which the 2D-PC waveguide 14 is extended and a multiple reflection wave (arrow PWV) in a direction vertical to a direction to which the 2D-PC waveguide 14 is extended, in the InP substrate 100 of the RTD device 4.

Figure 28:
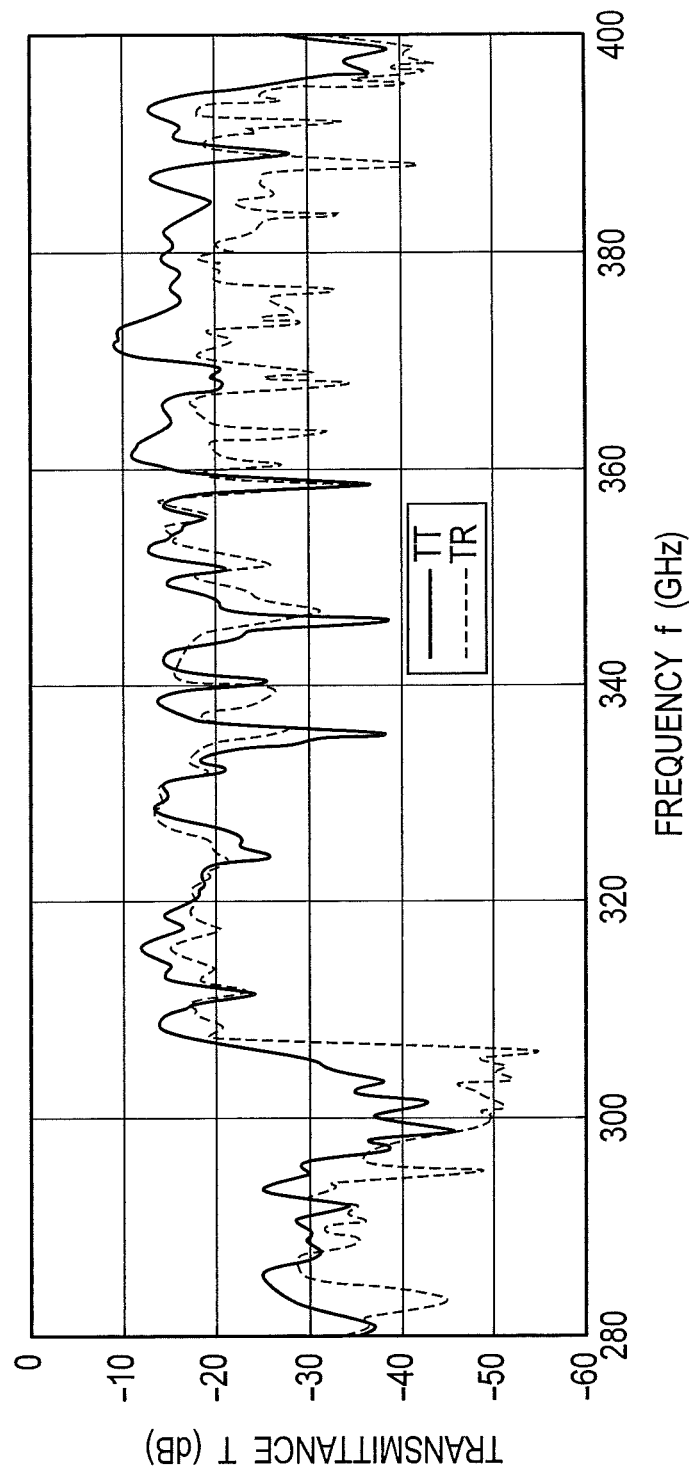
FIG. 28 shows a simulation result with regard to a variation in frequency characteristics of transmittance due to a multiple reflection in the substrate, in the THz-wave device according to the third embodiment.

FIG. 28 shows a simulation result with regard to a variation in the frequency characteristics of transmittance T (dB) due to a multiple reflection in the InP substrate 100 of such RTD device 4, in the THz-wave device 140U according to the third embodiment. In FIG. 28, the curved line TT indicates transmission characteristics at the time of transmission, and the curved line TR indicates transmission characteristics at the time of receiving. In this case, the thickness T1 of the InP substrate 100 of the RTD device 4 used for the simulation is approximately 350 μm.

The bandwidth is narrowed due to the frequency characteristics resulting from the multiple reflection in the InP substrate 100 of the RTD device 4 as the frequency characteristics of the THz-wave device 140U according to the third embodiment, as shown in FIG. 28. As shown in FIG. 28, an intensity variation which is equal to or greater than 25 dB is also obtained with a simulation result as the intensity variation of transmittance T. Moreover, the variation in the frequency dependency is also increased due to the influence of the multiple reflection in the InP substrate 100 of the RTD device 4. Accordingly, structure for relaxing the influence of the multiple reflection in the InP substrate 100 is required in order to improve the frequency characteristics, etc.

In the case of the RTD device 4 having the tapered slot antenna, gain will be improved if the wave propagation direction and the radiation pattern of the antenna are adjusted in the same direction, but it is easy to be affected since the wave propagation direction is also matched with the direction of the multiple reflection.

[Fourth Embodiment: Edge Face Installation Type]

Figure 29A:
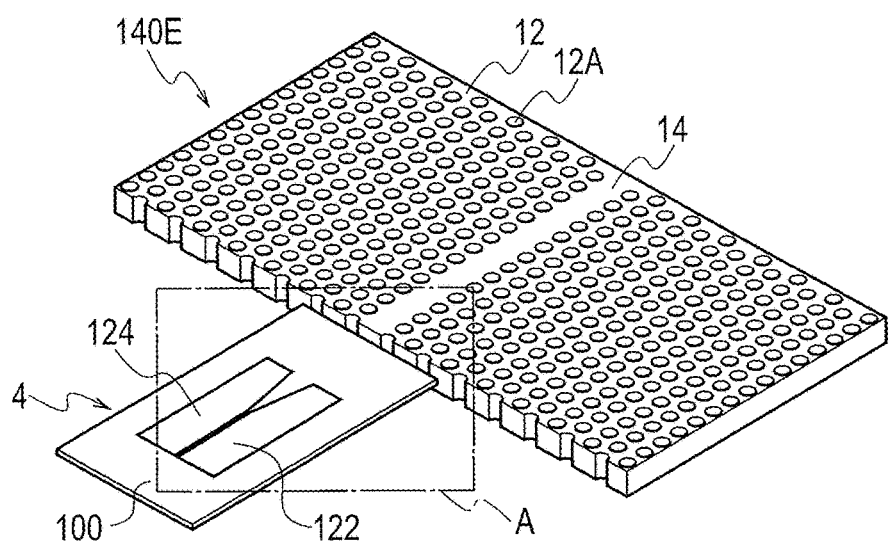
FIG. 29A is a schematic bird's-eye view configuration diagram of a THz-wave device according to a fourth embodiment improves a variation in frequency characteristics of transmittance due to a multiple reflection in a substrate.
Figure 29B:
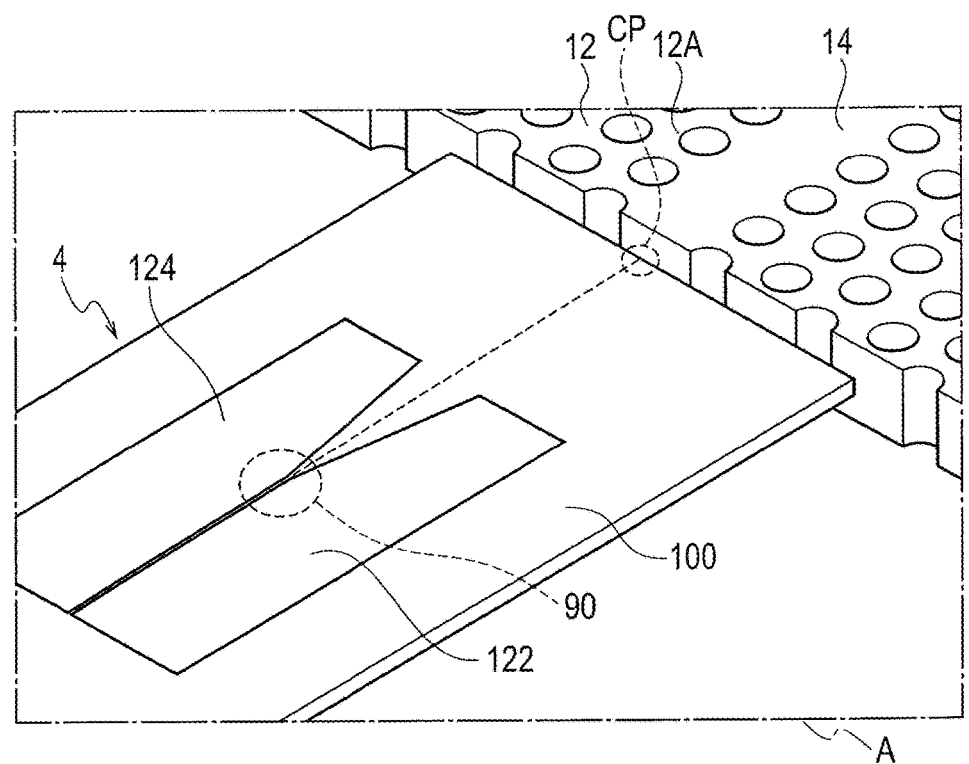
FIG. 29B is an enlarged view of a coupling part between the RTD device and the 2D-PC shown in FIG. 29A.

FIG. 29A shows a schematic bird's-eye view configuration of a THz-wave device 140E according to a fourth embodiment for improving a variation in frequency characteristics of transmittance due to a multiple reflection in the InP substrate 100 of the RTD device 4. FIG. 29B shows an enlarged view of a coupling part A between RTD device 4 and the 2D-PC slab 12 in FIG. 29A.

The THz-wave device 140E according to the fourth embodiment has a configuration in which the height of the tapered slot antenna is matched with the center portion of which the intensity of the guided THz wave is highest to make the THz wave incident on the edge face, in the 2D-PC waveguide 14. In this case, the thickness of the applied PC slab 12 is approximately 200 µm, and the thickness of the InP substrate 100 of the RTD device 4 is approximately 100 µm.

In the THz-wave device 140E according to the fourth embodiment, the tapered slot antenna integrated-type RTD device 4 is disposed at the edge face of the 2D-PC slab 12 to which the 2D-PC waveguide 14 is extended, and the height of the tapered slot antenna is matched with the center portion CP of which the electromagnetic field distribution is strong, in the 2D-PC waveguide 14, as shown with the dashed. The frequency variation can be reduced by adopting such a disposition, in the edge face installation type of the THz-wave device 140E according to the fourth embodiment.

Figure 30:
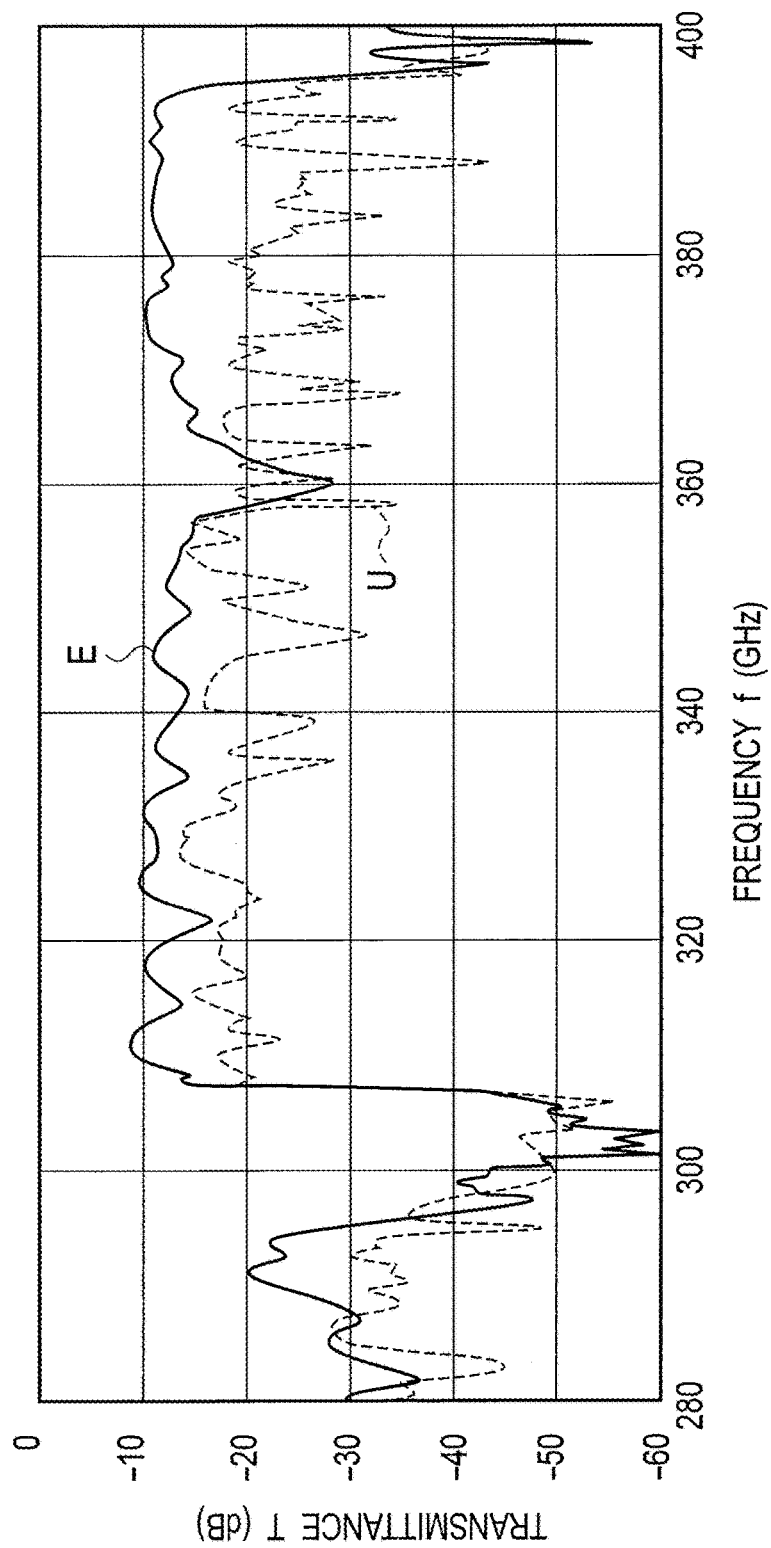
FIG. 30 shows a simulation result with regard to frequency characteristics of transmittance in the THz-wave device according to the fourth embodiment.

FIG. 30 shows a simulation result with regard to the frequency characteristics of transmittance T (dB), in the THz-wave device 140E according to the fourth embodiment. In FIG. 30, the curved line E corresponds to the edge face installation type structure shown in the THz-wave device 140E according to the fourth embodiment (FIG. 29A), and the curved line U corresponds to the top surface installation type structure shown in the THz-wave device 140U according to the first embodiment (FIG. 2).

In the edge face installation type of the THz-wave device 140E according to the fourth embodiment the influence of multiple reflection is reduced to the variations of 3-5 dB at intervals of 5-7 GHz, as proved from a simulation result with regard to the frequency characteristics of transmittance T (dB), as shown in FIG. 30.

[Fifth Embodiment: Installation of THz-Wave Absorber]

Figure 31:
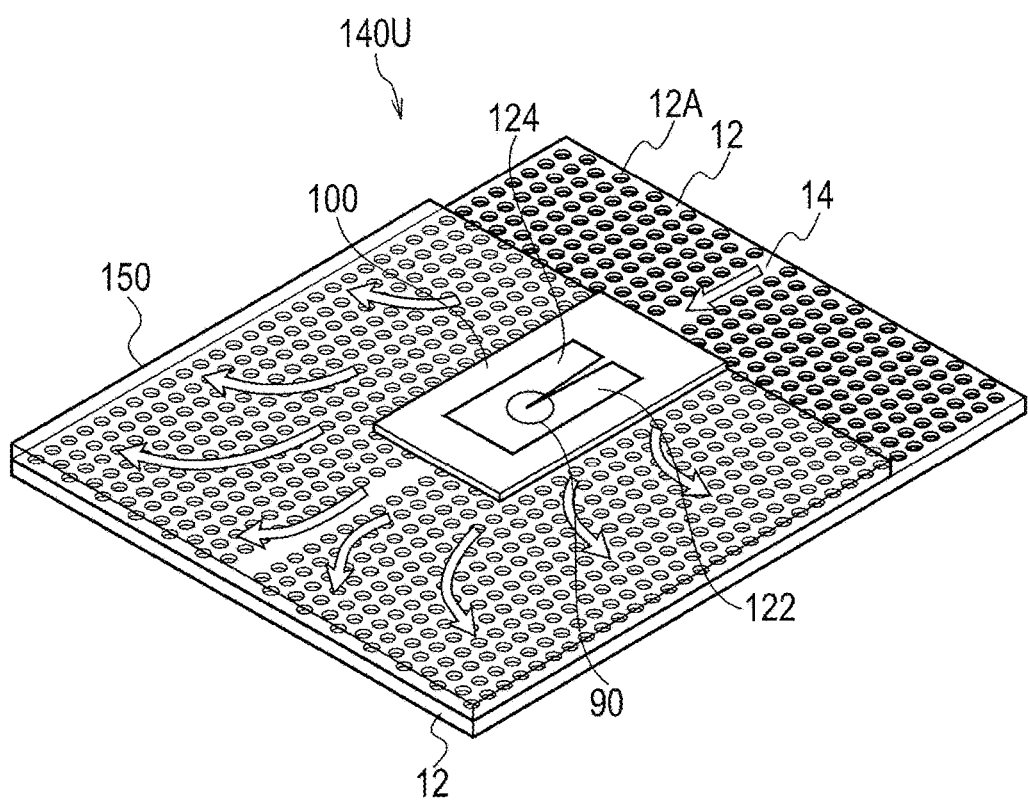
FIG. 31 is a schematic bird's-eye view configuration diagram of a THz-wave device according to a fifth embodiment improves a variation in frequency characteristics of transmittance due to a multiple reflection in a substrate.

FIG. 31 shows a schematic bird's-eye view configuration of a THz-wave device 140U according to a fifth embodiment for improving a variation in frequency characteristics of transmittance due to a multiple reflection in the InP substrate 100 of the RTD device 4.

The THz-wave device 140U according to the fifth embodiment includes a THz-wave absorber 150 disposed around the RTD device 4 on the 2D-PC slab 12, as shown in FIG. 31.

In this case, the THz-wave absorber 150 can be formed of a carrier doped semiconductor layer, a polymer PC layer, a metamaterial layer having metallic minute structure, etc.

In the THz-wave device 140U according to the fifth embodiment, as shown in FIG. 31, a difference of a relative dielectric constant between the InP substrate 100 composing the RTD device 4 and THz-wave absorber 150 is more reduced by disposing such a THz-wave absorber 150 around the RTD device 4, compared with a relative dielectric constant difference between the InP substrate 100 and the air. Accordingly, the reflection at the edge of the InP substrate 100 of RTD device 4 can be reduced.

In the THz-wave device 140U according to the fifth embodiment, the THz wave which has propagated through the 2D-PC waveguide 14 absorbed by the THz-wave absorber 150, as shown with the arrow in FIG. 31.

Since an absorption loss in the silicon substrate can be increased by performing the carrier dope in the case of applying the silicon substrate as the THz-wave absorber 150, it is also possible to reduce the multiple reflection in the silicon substrate. In this case, a resistibility of the silicon substrate composing the THz-wave absorber 150 is approximately 100 Ωcm, for example, and the thickness thereof is approximately 200 µm, for example. The thickness of the InP substrate 100 composing the RTD device 4 is also approximately 200 µm.

Figure 32:
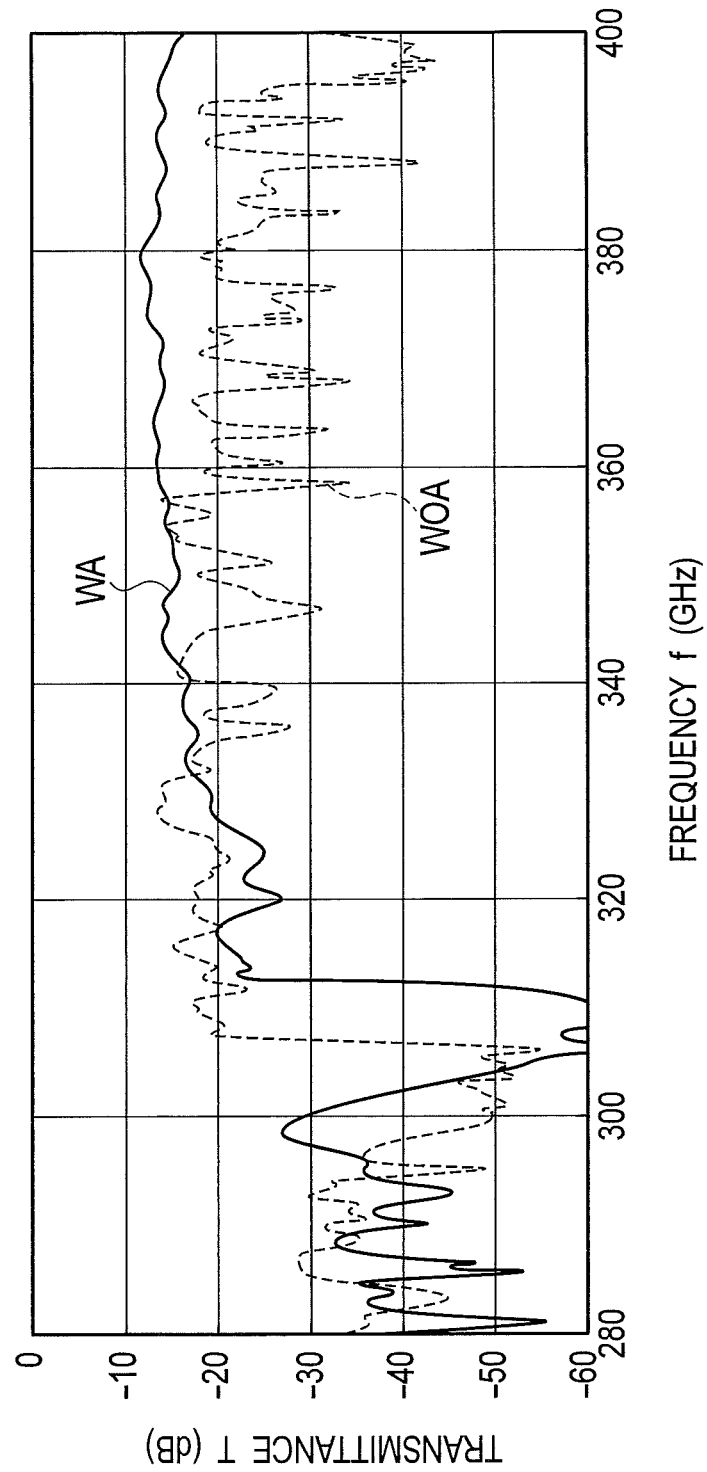
FIG. 32 shows a simulation result with regard to the frequency characteristics of transmittance in the THz-wave device according to the fifth embodiment.

FIG. 32 shows a simulation result with regard to the frequency characteristics of transmittance T (dB), in the THz-wave device 140U according to the fifth embodiment. In FIG. 32, the curved line WA corresponds to the case of including the THz-wave absorber 150, and the curved line WOA corresponds to the case of including no THz-wave absorber 150.

In the THz-wave device 140U according to the fifth embodiment, the influence of the multiple reflection can be reduced by disposing the THz-wave absorber 150 around the RTD device 4.

In the THz-wave device 140U according to the fifth embodiment, as shown in FIG. 32, the local variation of the transmittance T (dB) is reduced up to equal to or less than 1 dB at the frequency f which is equal to or greater than 340 GHz, and equal to or greater than 20 GHz can be secured also in 3 dB band.

[Sixth Embodiment: THz-Wave Device Having Embedded Structure]

Figure 33:
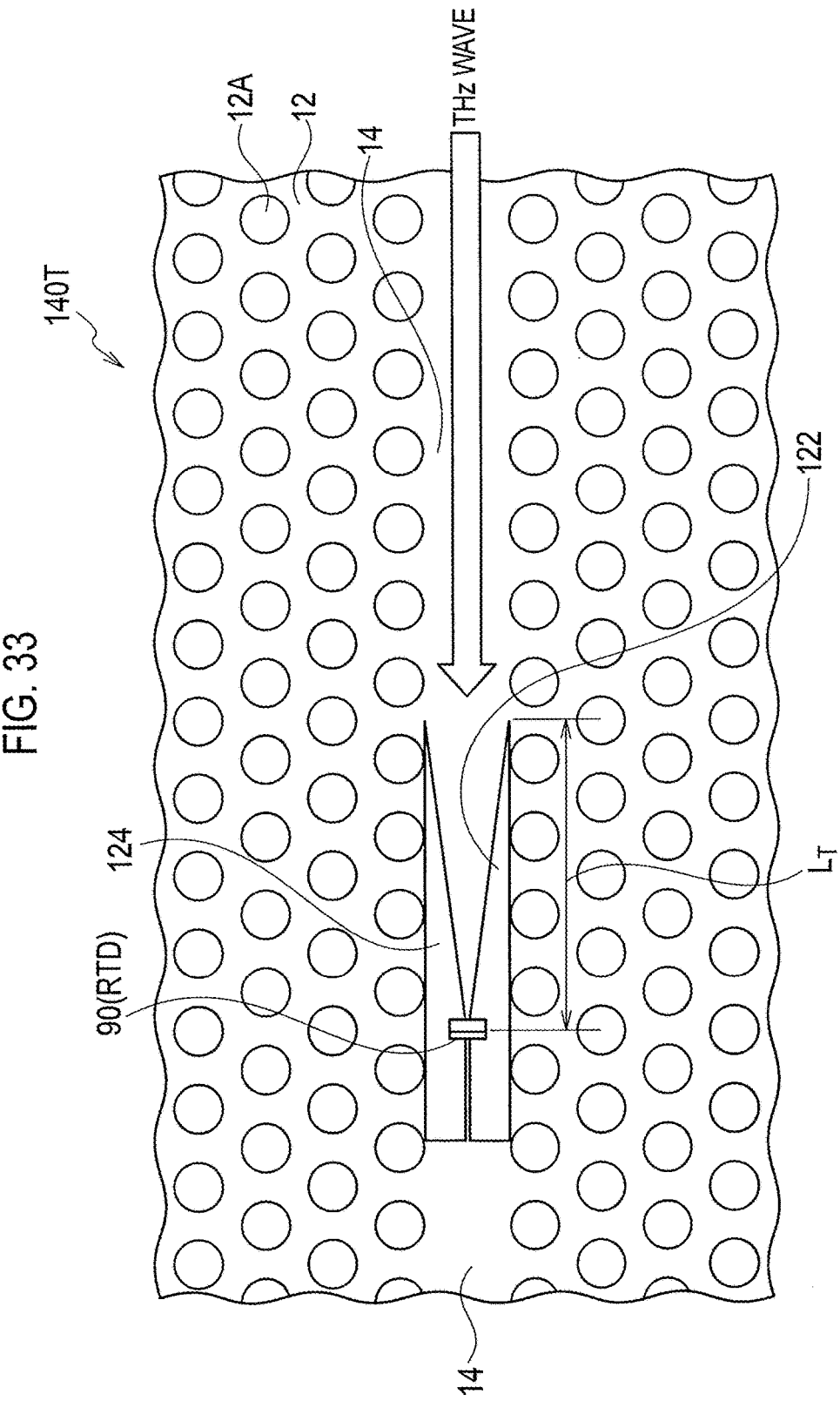
FIG. 33 is a schematic planar pattern configuration diagram showing a THz-wave device according to a sixth embodiment.

FIG. 33 shows a schematic planar pattern configuration of a THz-wave device 140T according to a sixth embodiment.

As shown in FIG. 33, the THz-wave device 140T according to the sixth embodiment includes: a 2D-PC slab 12; lattice points 12A periodically arranged in the 2D-PC slab 12, the lattice points 12A for diffracting the THz waves in PBG frequencies of photonic band structure of the 2D-PC slab 12 in order to prohibit existence in a plane of the 2D-PC slab 12; a 2D-PC waveguide 14 disposed in the 2D-PC slab 12 and formed with a line defect of the lattice points 12A; a tapered slot antennas (122, 124) as a metallic pattern disposed on the 2D-PC waveguide 14; and an RTD 90 disposed on the tapered slot antennas (122, 124).

In the THz-wave device 140T according to the sixth embodiment, as shown in FIG. 33, the tapered slot antennas (122, 124) pattern is formed on the 2D-PC waveguide 14, and then the RTD 90 is formed with die bonding on the tapered slot antennas (122, 124) pattern.

The taper length $L_T$ of the tapered slot antennas (122, 124) is expressed with a length from a position where the RTD 90 is disposed to a tip position of the tapered slot antennas (122, 124), as shown in FIG. 33. The taper length $L_T$ is expressed with N times of the lattice constant a of the PC, i.e., $L_T$=Na, where N is a natural number.

The tapered slot antennas (122, 124) are formed on the 2D-PC waveguide 14, in the THz-wave device 140T according to the sixth embodiment, unlike the structure in the first embodiment (FIG. 2).

The THz-wave device 140T according to the sixth embodiment is monolithically formed by forming the metallic antenna pattern on the surface of the 2D-PC waveguide 14 and by embedding the THz wave active elements (e.g., a diode, RTD etc.) in the transmission line, while no RTD chip is integrated into hybrid. In this case, an RTD etc. can be applied as the THz wave active element. The RID 90 can be integrated between the first electrode 122 and the second electrode 124 composing the tapered slot antennas (122, 124). Moreover, the RTD or SBD is applicable as a detection device of the THz wave. If the THz-wave device 140T is formed into hybrid, the 2D-PC waveguide 14 portion may be hollowed, and then the metallic antenna pattern and the THz wave active elements (diodes, e.g. RTD etc.) may be formed so as to be embedded thereinto, for example.

Although FIG. 33 shows an example of the tapered slot antenna, a monopole antenna, a dipole antenna, a slot antenna, a ring slot antenna, a bow tie antenna, etc. may be applied to the antenna structure.

Figure 34:
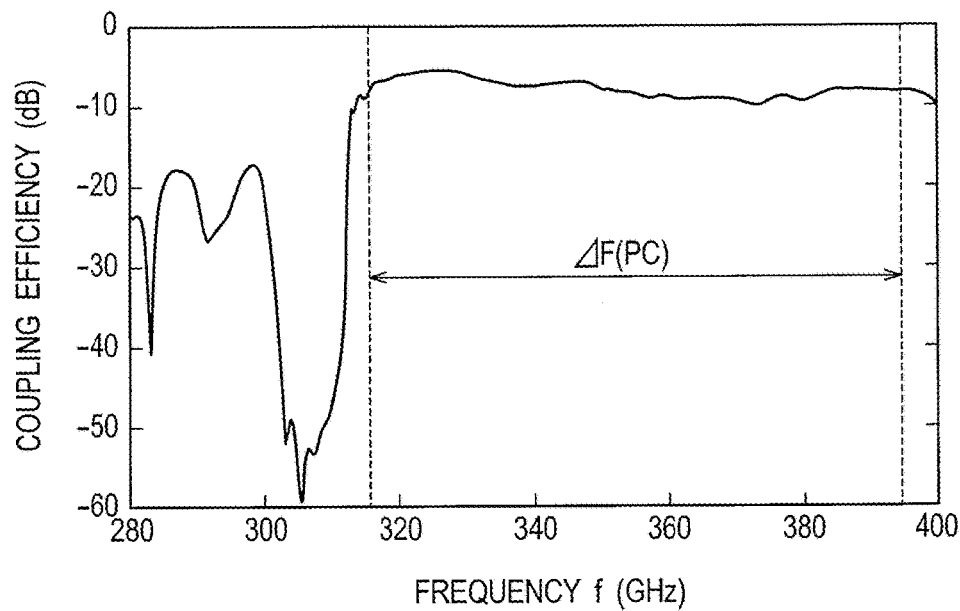
FIG. 34 shows frequency characteristics (simulation) of coupling efficiency in the THz-wave device according to the sixth embodiment.

FIG. 34 shows a simulation result of calculating the frequency characteristics of coupling efficiency of the THz-wave device by introducing the THz wave to the 2D-PC waveguide 14, as shown in an arrow in FIG. 33, in the THz-wave device 140T according to the sixth embodiment. In this case, the taper length $L_T$ is 6.5a.

In the THz-wave device 140T according to the sixth embodiment, since the tapered slot antennas (122, 124) are formed on the 2D-PC waveguide 14, there is no influence of the semiconductor substrate (InP substrate) 100. Accordingly, high coupling efficiency can be obtained. The average coupling efficiency in the propagation band $\Delta F(PC)$ of the PC transmission line is approximately −7.8 dB. The coupling efficiency is improved by as much as approximately 2.2 dB, as compared with the frequency characteristics of the coupling efficiency in the case where the substrate thickness of the RTD device is 20 μm in the THz-wave device according to the first embodiment shown in FIG. 20.

In the THz-wave device 140T according to the sixth embodiment, the 3 dB band of coupling efficiency can also be secured by 40 GHz, and therefore broader-band characteristics can be obtained as a simulation result.

Figure 35:
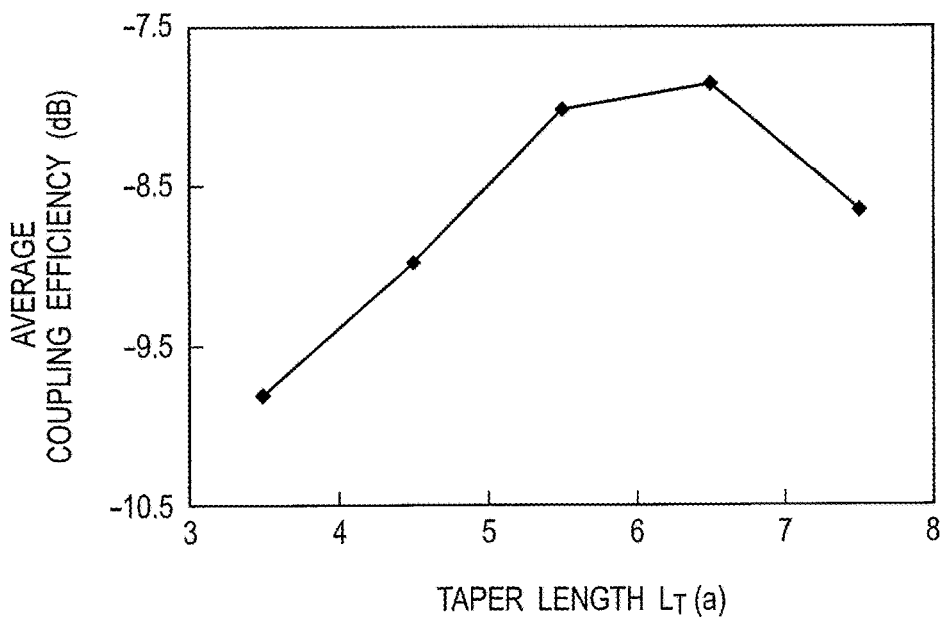
FIG. 35 shows taper length dependency (simulation) of average coupling efficiency in the THz-wave device according to the sixth embodiment.

FIG. 35 shows the taper length $L_T$ dependency of the average coupling efficiency (simulation result), in the THz-wave device according to the sixth embodiment. As shown in FIG. 35, an optimum value of the taper length $L_T$ is included in the average coupling efficiency. However, the efficiency is higher than the hybrid integration, in the all range of $L_T$ from 4.5a to 7.5a.

In the THz-wave device 140T according to the sixth embodiment, there can be provided a structure having highly efficient and broader bandwidths as the coupling configuration between the RTD 90 and the 2D-PC waveguide 14 of the THz wave band. The electromagnetic waves in the 2D-PC waveguide 14 can be more efficiently coupled thereto by forming the metallic antenna on the surface of the PC, compared with the configuration in the first embodiment.

According to the sixth embodiment, high degree of efficiency and broader bandwidth can be realized by using the antenna pattern integrated into monolithic integration which is not merely hybrid integration.

According to the sixth embodiment, there can be provided the THz-wave device for improving the coupling efficiency with the dielectric waveguide and realizing the broader bandwidth, and the THz-wave IC capable of mounting such a THz-wave device.

[Seventh Embodiment: Loading on PC Surface of Metallic Transmission Line]

FIG. 36 shows a schematic planar pattern configuration of a THz-wave device 140ST according to a seventh embodiment.

As shown in FIG. 36, the THz-wave device 140ST according to the seventh embodiment includes: a 2D-PC slab 12; lattice points 12A periodically arranged in the 2D-PC slab 12, the lattice points 12A for diffracting the THz waves in PBG frequencies of photonic band structure of the 2D-PC slab 12 in order to prohibit existence in a plane of the 2D-PC slab 12; a 2D-PC waveguide 14 disposed in the 2D-PC slab 12 and formed with a line defect of the lattice points 12A; and metallic slot transmission lines 152, 154 as a metallic pattern disposed on the 2D-PC waveguide 14.

In the THz-wave device 140ST according to the seventh embodiment, as shown in an arrow in FIG. 36, the THz wave introduced to the 2D-PC waveguide 14 and propagating through the PC can be extracted to the metallic slot transmission lines 152, 154 at a surface thereof.

(Modified Example of the Seventh Embodiment)

As shown in FIG. 37, a THz-wave device 140S according to a modified example of the seventh embodiment includes a metallic strip transmission line 156 as a metallic pattern disposed on the 2D-PC waveguide 14 instead of the metallic slot transmission lines 152, 154. Other configurations are the same as that of the THz-wave device 140ST according to the seventh embodiment.

Also in the THz-wave device 140ST according to the modified example of the seventh embodiment, as shown in an arrow in FIG. 37, the THz wave introduced to the 2D-PC waveguide 14 and propagating through the PC can be extracted to the metallic strip transmission line 156 at a surface thereof.

Figure 38A:
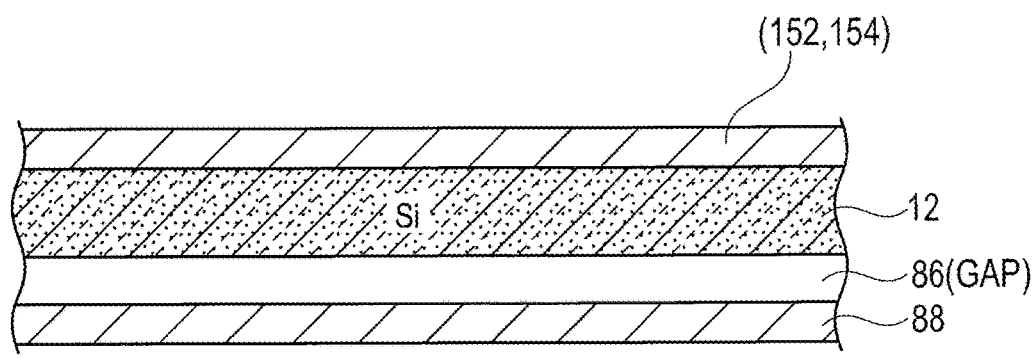
FIG. 38A shows a schematic cross-sectional structure example 1 along a direction to which a 2D-PC waveguide is extended, in the THz-wave device according to the seventh embodiment.
Figure 38B:
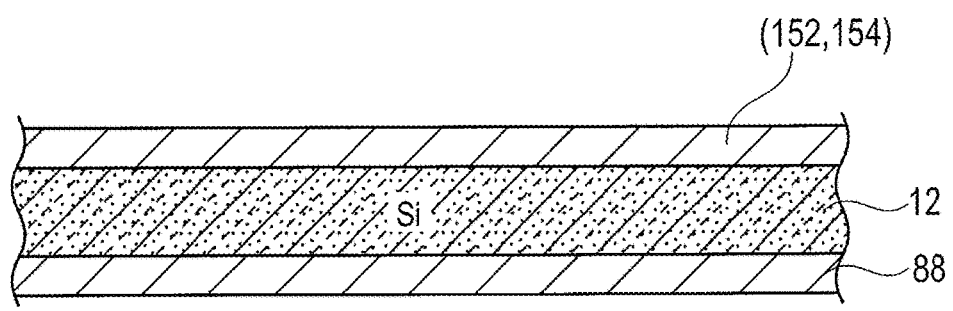
FIG. 38B shows a schematic cross-sectional structure example 2 along the direction to which the 2D-PC waveguide is extended, in FIG. 38A.

FIG. 38A shows a schematic cross-sectional structure example 1 along a direction to which the 2D-PC waveguide is extended, in the THz-wave device according to the seventh embodiment. FIG. 38B shows a schematic cross-sectional structure example 2 along the direction to which the 2D-PC waveguide 14 is extended.

The THz-wave device 140ST according to the seventh embodiment may comprise a back surface electrode layer 88 formed on a back surface side of the 2D-PC slab 12, as shown in FIG. 38A or 38B. Since the back surface electrode layer 88 is disposed thereon, there is obtained an effect that the electromagnetic field distribution of THz wave propagating along the metallic slot transmission lines 152, 154 and the metallic strip transmission line 156 disposed on the 2D-PC waveguide 14 can be stabilized, and the variation of characteristic impedance can be reduced and stabilized.

The back surface electrode layer 88 may be disposed via a gap 86 on the back surface side of the 2D-PC slab 12, as shown in FIG. 38A. Alternatively, the back surface electrode layer 88 may be directly disposed on the back side surface of the 2D-PC slab 12, as shown in FIG. 38B. Moreover, the back surface electrode layer 88 may be disposed on the whole back side surface of the 2D-PC slab 12. Alternatively, the back surface electrode layer 88 may be disposed on the back surface side of the 2D-PC slab 12 within a region width corresponding to the 2D-PC waveguide 14 of the surface thereof. Such a back surface electrode layer 88 can be disposed thereon similarly to the THz-wave device 140S according to the modified example of the seventh embodiment.

Moreover, according to the seventh embodiment, not only the electrode pattern but also the functional circuit can be integrated thereon. The waveguide technology according to the seventh embodiment is applicable as fundamental technology, e.g. a construction of smart systems and THz-wave ICs, at the time of applicability of the THz wave.

Moreover, according to the seventh embodiment, the electromagnetic field energy inside RTD can be coupled into the 2D-PC waveguide 14 with high degree of efficiency, and the electromagnetic field energy inside the 2D-PC waveguide 14 can be conversely coupled into the RTD 90 with high degree of efficiency.

Moreover, according to the seventh embodiment, the structure itself of forming the electrode pattern of the metallic line on the waveguide can be applied to various applicabilities, in addition to the improvement of efficiency.

Moreover, according to the seventh embodiment, it is effective also in simplification of the implementation process, and improvement in reliability, and applicabilities to integration as a functional circuit can also be realized if using as a signal line.

According to the seventh embodiment and the modified example thereof, there can be provided the THz-wave device for improving the coupling efficiency with the dielectric waveguide and realizing the broader bandwidth, and the THz-wave IC capable of mounting such a THz-wave device.

[Eighth Embodiment: Applicability to Sensing, Switch, Etc.]

FIG. 39A shows a schematic planar pattern configuration of a THz-wave device 140ST according to an eighth embodiment, and FIG. 39B shows a schematic cross-sectional structure along a direction x to which the 2D-PC waveguide 14 is extended, in FIG. 39A.

As shown in FIG. 39A, the THz-wave device 140ST according to the eighth embodiment includes: a 2D-PC slab 12; lattice points 12A periodically arranged in the 2D-PC slab 12, the lattice points 12A for diffracting the THz waves in PBG frequencies of photonic band structure of the 2D-PC slab 12 in order to prohibit existence in a plane of the 2D-PC slab 12; a 2D-PC waveguide 14 disposed in the 2D-PC slab 12 and formed with a line defect of the lattice points 12A; and metallic slot transmission lines 152, 154 having a predetermined length as a metallic pattern disposed on the 2D-PC waveguide 14.

An extracting operation of the THz wave on a surface of the device is illustrated, as shown with the arrow in FIG. 39B, in the THz-wave device 140ST according to an eighth embodiment. More specifically, an electric field of the THz wave propagating through the PC of the 2D-PC waveguide 14 is introduced into the metal of the metallic slot transmission lines 152, 154. Accordingly, the THz wave is extracted to the surface of the metallic slot transmission lines 152, 154 and the surface of the 2D-PC waveguide 14 between the metallic slot transmission lines 152, 154.

In FIG. 39B, the rectangle shown with the dashed line schematically expresses a wave packet of the THz wave. One rectangle shown with the dashed line schematically expresses the continuous wave packet in a positive direction and a negative direction. Since the electric field is introduced into the metal of the metallic slot transmission line 152, 154, the wave packet of the THz wave propagating through the PC in the direction x is extracted and propagated to the surface of the metallic slot transmission lines 152, 154 and the surface of the 2D-PC waveguide 14 between the metallic slot transmission lines 152, 154. In FIG. 39A, the ellipse shown with the dashed line schematically expresses the wave packet of the THz wave propagating on the surface of the 2D-PC waveguide 14 between the metallic slot transmission lines 152, 154.

In the THz-wave device 140ST according to an eighth embodiment, the THz wave can be returned into the PC, as shown with the arrow in FIG. 39B, by designing the length of the metallic slot transmission line 152, 154 in the direction x to a suitable predetermined length. For example, the THz wave can be returned into the PC by designing the length of the metallic slot transmission line 152, 154 in the direction x to even number times as long as the coupling length $L_C$.

(Applicability of Extraction of THz Wave to Surface: Interaction)

In the THz-wave device 140ST according to an eighth embodiment, FIG. 40A shows a schematic planar pattern configuration in which a detection unit 158, e.g. a diode, a free carrier, and a sensing sample (sensing analyte), between the metallic slot transmission lines 152, 154. FIG. 40A is used for explanation of extracting applicability (interaction) of the THz wave on the surface of the device. FIG. 40B shows a schematic cross-sectional structure along the direction x to which the 2D-PC waveguide 14 is extended, in FIG. 40A.

High coupling efficiency can be realized, if diodes, e.g. RTD or SBD, as a detection unit 158 is embedded in the propagation portion of the THz wave on the surface of the 2D-PC waveguide 14. It is also the same as in the case of hybrid integration of diode chips, e.g. RTD or SBD, as the detection unit 158, on the surface of the 2D-PC waveguide 14.

The detection unit 158 may be disposed on the metallic slot transmission lines 152, 154. However, it is preferable to dispose the detection unit 158 between the metallic slot transmission lines 152, 154 in order to improve the efficient interaction with the THz wave.

Moreover, the detection unit 158 may be formed by generating a free carrier into the PC between the metallic slot transmission lines 152, 154 using an electric field applied to between the metallic slot transmission lines 152, 154, or a photoirradiation and electron beam irradiation to between the metallic slot transmission lines 152, 154. If a plurality of the detection units 158 formed by generating of such a free carrier are generated, the detection units 158 can also act as a metallic reflecting mirror of the THz wave, and thereby the THz wave can be confined between the plurality of detection units 158.

A resonator and a filter can also be formed by generating two free carriers as the detection unit 158 and by confining the THz wave between the two free carriers due to a reflecting mirror effect of the free carrier.

Moreover, a sensing sample etc. may be disposed between the metallic slot transmission lines 152, 154 as the detection unit 158. Protein, medicine, etc. or an antigen or antibody for the purpose of an antigen-antibody reaction, etc. can be applied as an example of the sensing sample.

Accordingly, in the THz-wave device 140ST according to an eighth embodiment, the THz wave resonator and a THz-wave filter can also be composed by absorbing/reflecting the THz wave, and it is also still more possible to reveal the THz wave switch/THz wave modulation function.

Moreover, high sensitive THz wave sensing can also be realized by disposing the detection unit 158 used for a sensing sample on a portion having a strong electric field.

In the THz-wave device 140ST according to the eighth embodiment, there can be provided the THz-wave device for improving the coupling efficiency with the dielectric waveguide and realizing the broader bandwidth, and the THz-wave IC capable of mounting such a THz-wave device. Moreover, a THz wave switch, a THz wave modulation, and a highly sensitive THz wave sensing function can be revealed by disposing the detection unit 158, e.g. a diode, a free carrier, and a sensing sample, between the metallic slot transmission lines 152, 154, and by absorbing/reflecting the THz wave.

(Surface Electric Field Intensity: Simulation Result)

Figure 41:
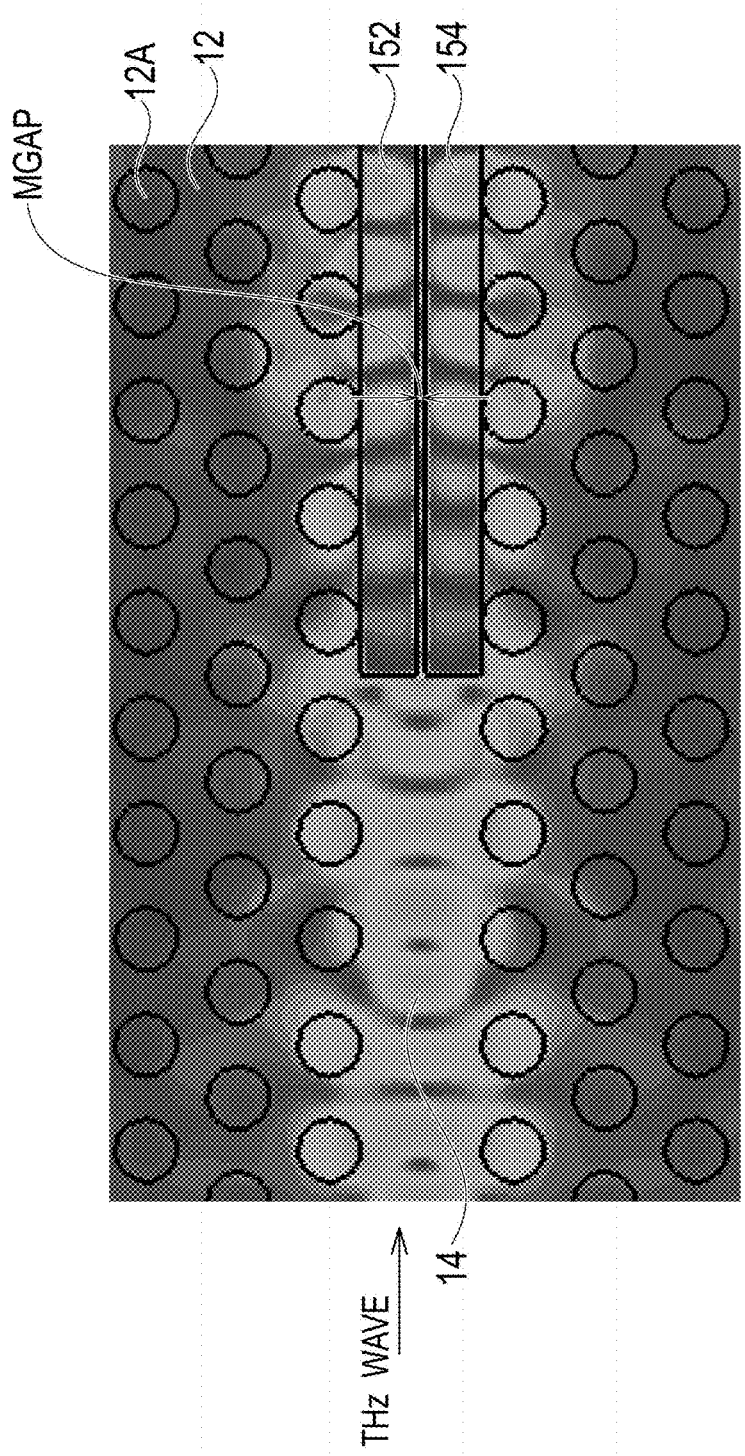
FIG. 41 shows a simulation result of surface electric field intensity in the THz-wave device according to the eighth embodiment.

FIG. 41 shows a simulation result of surface electric field intensity in the THz-wave device 140ST according to an eighth embodiment. The simulation result of the surface electric field intensity of FIG. 41 corresponds the case where the metallic slot transmission lines 152, 154 having gap spacing MGAP=10 µm are formed on the surface of the 2D-PC waveguide 14. In the simulation, the length of the metallic slot transmission lines 152, 154 in the propagation direction is set as semi-infinity. As shown in FIG. 41, the electric field intensity in the fine gap of the metallic slot transmission lines 152, 154 is enhanced.

(Cross-Sectional Electric Field Intensity: Simulation Result)

Figure 42:
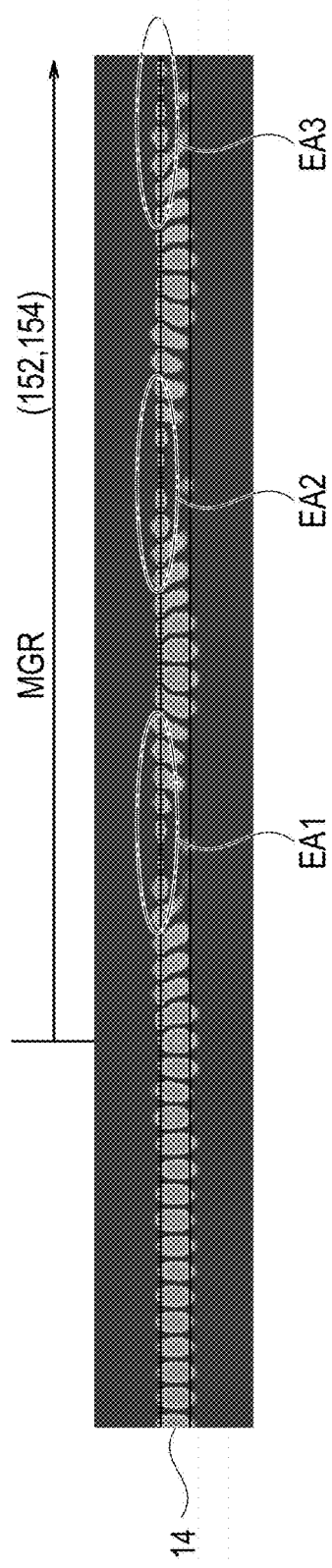
FIG. 42 shows a simulation result of cross-sectional electric field intensity in the THz-wave device according to the eighth embodiment.

FIG. 42 shows a simulation result of cross-sectional electric field intensity in the THz-wave device 140ST according to an eighth embodiment. When the THz wave propagates in the 2D-PC waveguide 14 and enters into the metallic transmission line loaded region MGR of the metallic slot transmission lines 152, 154, a directional coupling phenomenon will occur with the coupling length $L_C$, as shown in FIG. 42. More specifically, as shown in FIG. 42, positions where the electric fields of the surface of the 2D-PC waveguide 14 are strong are shown as ellipses EA1, EA2m EA3 with the dashed line. Conversely, the electric field in the transmission line of the 2D-PC waveguide 14 is enhanced in a position where the electric field of the surface of the 2D-PC waveguide 14 is not strong.

If the metallic slot transmission lines 152, 154 are loaded on the surface of the 2D-PC waveguide 14 in the THz-wave device 140ST according to an eighth embodiment, a position of which the electric field is strong and a position of which the electric field is weak on the surface of the 2D-PC waveguide 14 are repeatedly formed between the metallic slot transmission lines 152, 154, as the THz wave propagates, and thereby a directional coupling phenomenon occurs with the coupling length $L_C$, as shown in FIG. 42.

(Surface Electric Field Intensity Profile in Propagation Direction)

Figure 43:
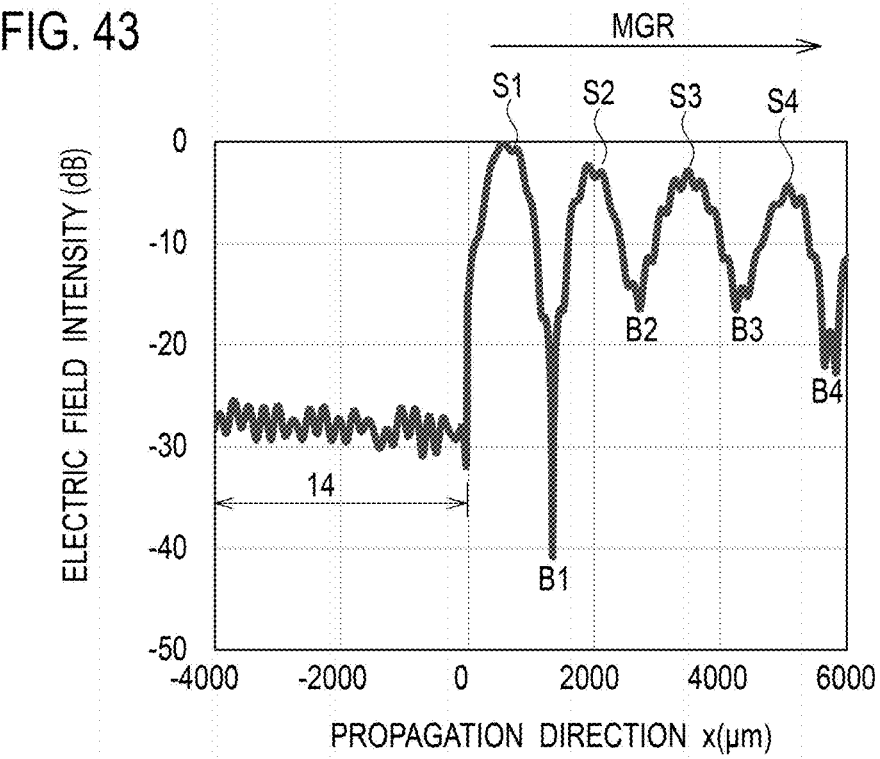
FIG. 43 shows a surface electric field intensity profile in a propagation direction, in the THz-wave device according to the eighth embodiment.

FIG. 43 shows a surface electric field intensity profile in a propagation direction, in the THz-wave device 140ST according to an eighth embodiment. The horizontal axis indicates a direction to which the metallic transmission line loaded region MGR is extended as a distance x (µm) in a positive direction, using an edge face of the metallic transmission line loaded region MGR of the metallic slot transmission lines 152, 154 disposed on the 2D-PC waveguide 14 as a zero point of the propagation direction x.

As shown in FIG. 43, there are portions S1, S2, S3, S4 . . . of which the electric field intensity is strong on the "surface." The positions of such portions S1, S2, S3, S4 . . . of which the surface electric field intensity is strong correspond to a coordinate system x at a distance of odd number times as long as the coupling length $L_C$.

Moreover, as shown in FIG. 43, there are portions B1, B2, B3, B4 . . . of which the electric field intensity is strong on the "inside." The positions of such portions B1, B2, B3, B4 . . . of which the inside electric field intensity is strong correspond to a coordinate system x at a distance of even number times as long as the coupling length $L_C$.

For example, above-mentioned various kinds of the interactions can be efficiently made by disposing the detection unit 158, e.g. a diode, a free carrier, and a sensing sample, at the positions of the portions S1, S2, S3, S4 . . . of which the surface electric field intensity is strong.

Moreover, for example, internal field intensity the THz wave can be efficiently returned into the 2D-PC waveguide 14 again by terminating the metallic slot transmission lines 152, 154 at the positions of the portions B1, B2, B3, B4 . . . of which the inside electric field intensity is strong.

(Metallic Slot Transmission Line Twice the Length of Coupling Length $L_C$)

Figure 44A:
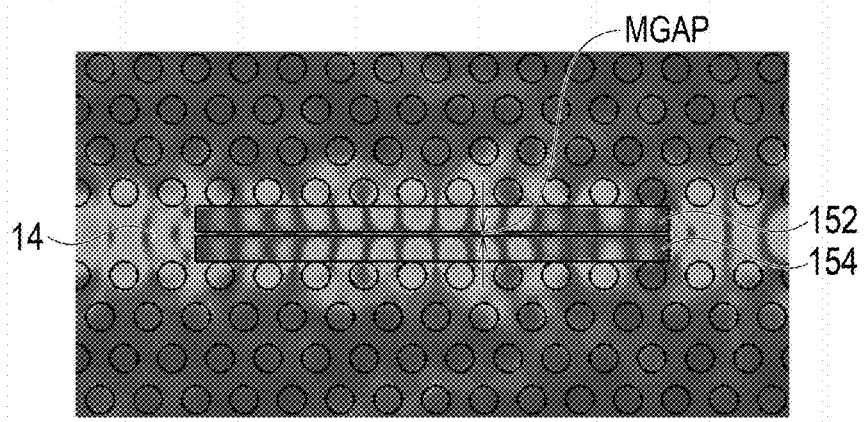
FIG. 44A shows a surface electric field intensity profile of the 2D-PC waveguide having a metallic slot transmission line of which the length is twice the coupling length, in the THz-wave device according to the eighth embodiment.
Figure 44B:
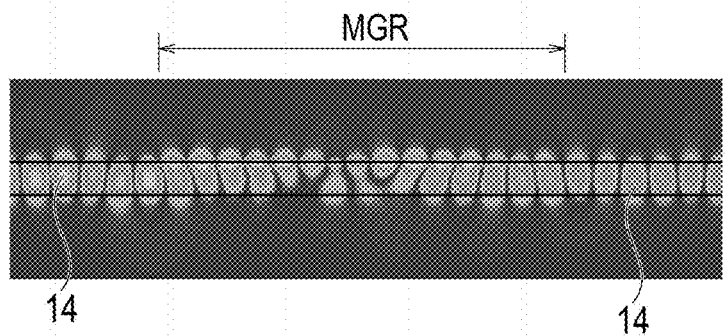
FIG. 44B shows a cross-sectional electric field intensity profile in the propagation direction shown in FIG. 44A.

In the THz-wave device 140ST according to the eighth embodiment,

FIG. 44A shows a surface electric field intensity profile of the 2D-PC waveguide 14 having the metallic transmission line loaded region MGR of the metallic slot transmission lines 152, 154 of which the length is twice the coupling length $L_C$, and FIG. 44B shows a cross-sectional electric field intensity profile in the propagation direction in FIG. 44A. Gap spacing MGAP is formed between the metallic slot transmission lines 152, 154. Moreover, in FIG. 44B, a portion shown with the metallic transmission line loaded region MGR of the metallic slot transmission lines 152, 154 corresponds to a portion at which the metallic slot transmission lines 152, 154 are disposed on the 2D-PC waveguide 14.

As shown in FIGS. 44A and 44B, the surface electric field intensity at the approximately center portion along the propagation direction of the metallic slot transmission lines 152, 154 becomes strong by forming the length along the propagation direction of the metallic slot transmission lines 152,154 so as to be twice the coupling length $L_C$. Moreover, the THz wave propagates through the 2D-PC waveguide 14 again at near the approximately edge face along the propagation direction of the metallic slot transmission lines 152, 154, on the basis of the directional coupling phenomenon.

Figure 45:
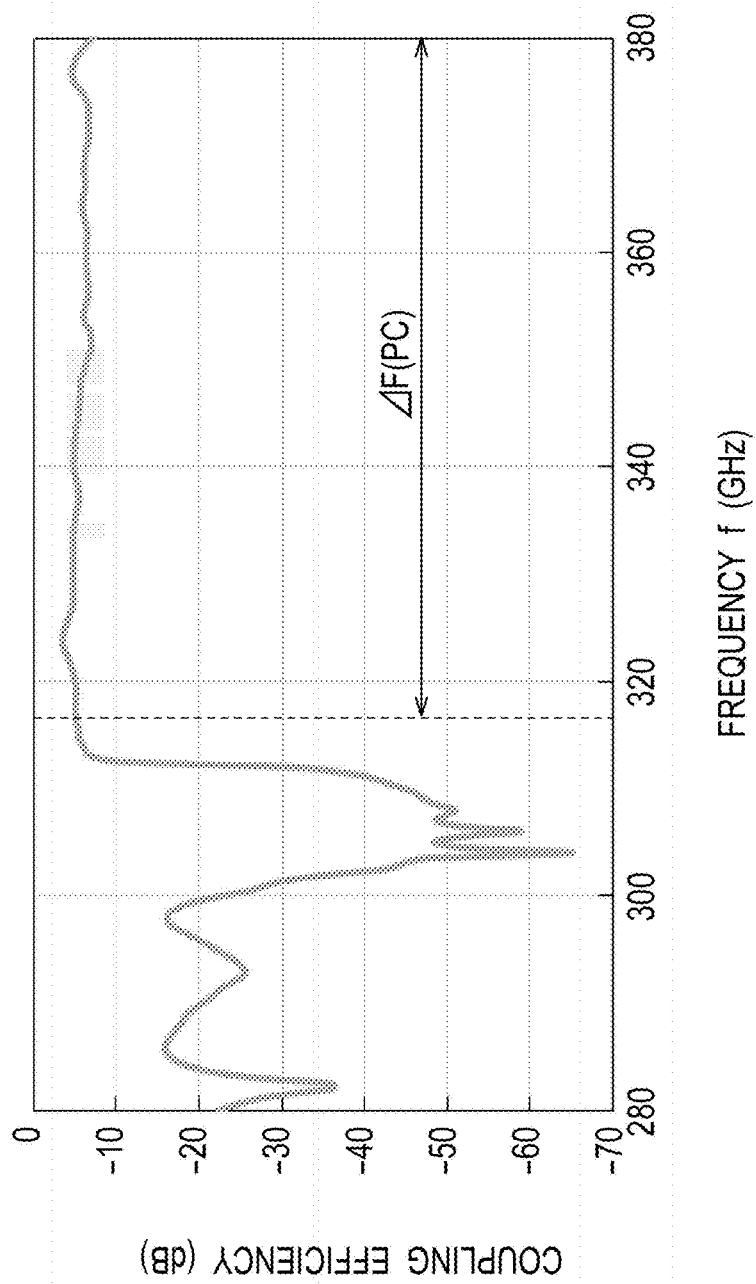
FIG. 45 shows frequency characteristics (simulation) of coupling efficiency at the time of embedding a diode between surface metallic slot transmission lines, in the THz-wave device according to the eighth embodiment.

FIG. 45 shows a simulation result of the frequency characteristics of coupling efficiency at the time of embedding a diode between the metallic slot transmission lines 152, 154 on the surface of the 2D-PC waveguide 14, in the THz-wave device 140ST according to an eighth embodiment. In this case, RTD or SBD is applicable as such a diode.

As shown in FIG. 45, as a result of the electric field being attracted to between the metallic slot transmission lines 152m 154 on the surface of the 2D-PC waveguide 14, there is obtained a coupling efficiency having a high value of approximately −5.5 dB (28%) in the propagation band ΔF(PC) of the PC transmission line. This value is a value which is improved by as much as approximately 30%, compared with the value which is approximately −7.8 dB in the sixth embodiment.

(Relationship Between Coupling Efficiency and Gap Spacing MGAP: Simulation)

Figure 46B:
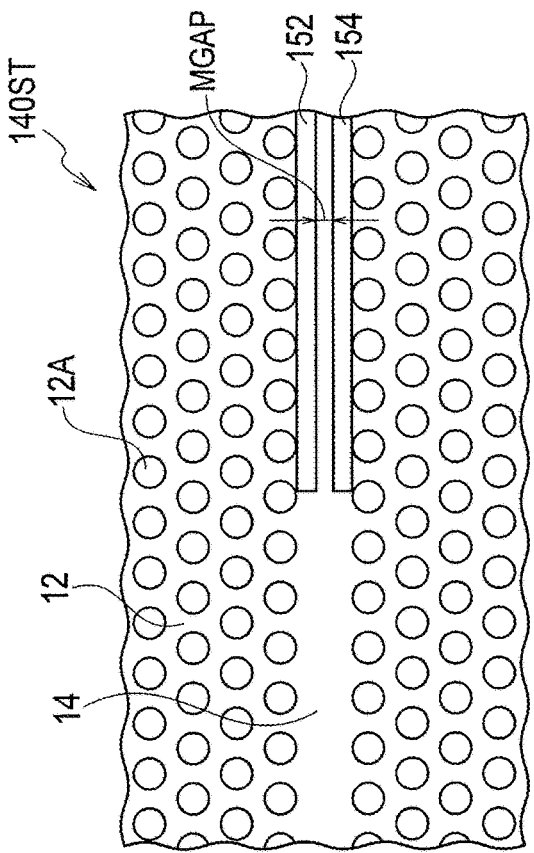
FIG. 46B is a schematic planar pattern configuration diagram near the coupling part between the 2D-PC waveguide and the metallic slot transmission line, in the THz-wave device according to the eighth embodiment.
Figure 46A:
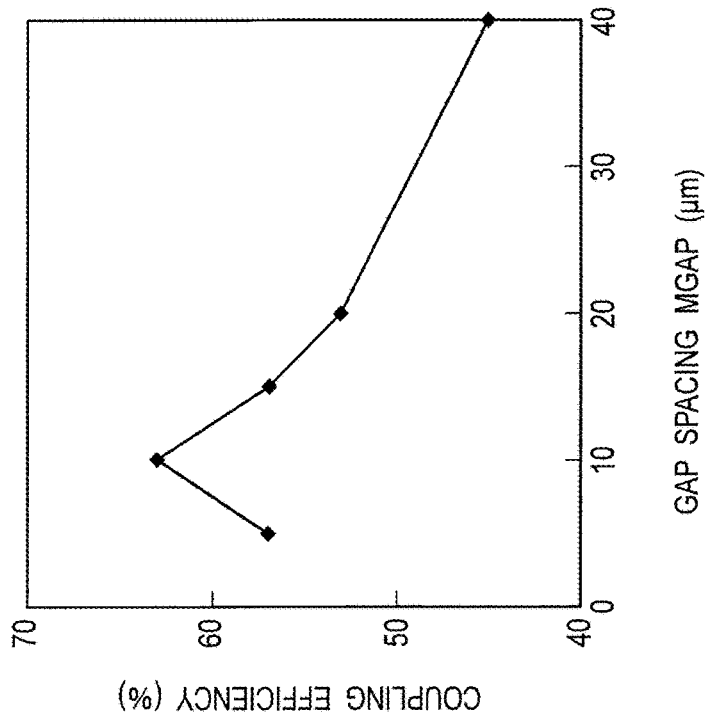
FIG. 46A shows a relationship (simulation) between the coupling efficiency from the 2D-PC waveguide to the metallic slot transmission line and gap spacing, in the THz-wave device according to the eighth embodiment.

FIG. 46A shows a simulation result of a relationship between the coupling efficiency from the 2D-PC waveguide 14 to the metallic slot transmission lines 152, 154 and the gap spacing MGAP, in the THz-wave device 140ST according to an eighth embodiment. Moreover, FIG. 46B shows a schematic planar pattern configuration near the coupling part between the 2D-PC waveguide 14 and the metallic slot transmission lines 152, 154.

In the THz-wave device 140ST according to an eighth embodiment, the electric field intensity near the surface of the 2D-PC waveguide 14 becomes strong, as the gap spacing MGAP is narrow, and thereby the coupling efficiency is increased, as shown in FIG. 46A.

On the other hand, due to a spatial size, if the gap spacing MGAP is too small, the coupling efficiency is reduced, as shown in FIG. 46A. The gap spacing MGAP is preferable within a range from approximately 100 nm to approximately lattice constant a of the PC, and it is more preferable within a range from 5 µm to 20 µm, as shown in FIG. 46A.

(Example of Coupling to Diode Chip)

In the THz-wave device 140ST according to the eighth embodiment, FIG. 47A shows a schematic planar pattern configuration in a state where a diode chip is coupled to the metallic slot transmission line 152, 154 in flip chip configuration, FIG. 47B shows a schematic cross-sectional structure along the direction to which the 2D-PC waveguide is extended, in FIG. 47A, and FIG. 47C shows an enlarged view of the portion FC shown in FIG. 47B.

As shown in FIGS. 47A, 47B, and 47C, the metallic slot transmission lines 152, 154 having the gap spacing MGAP are formed on the 2D-PC waveguide 14, and the RTD 90 is die-bonded via an adhesive layer 160 in flip chip configuration on the metallic slot transmission line 152, 154. Coupling efficiency increases with decreasing the thickness of the adhesive layer 160. A polyethylene terephthalate (PET) tape of approximately 5 μm thick etc. may be applied to the adhesive layer 160, for example. RTD, SBD, or the like is applicable to the diode chip.

In the THz-wave device 140ST according to an eighth embodiment, the electromagnetic wave can be efficiently coupled thereto and thereby improvement in efficiency of approximately 2.2 dB as compared with conventional THz-wave devices and broadband coupling characteristics covering approximately 40 GHz can be obtained.

Moreover, there are various wide applicabilities due to the configuration of forming the transmission line pattern of the metallic slot transmission lines 152, 154 on the 2D-PC waveguide, as well as or more than the improvement of efficiency.

The THz-wave device according to the eighth embodiment is effective also in simplification of implementation processes, and improvement in reliability, and therefore can be applied to integration as a functional circuit if the metallic slot transmission line is used as a signal line.

According to the eighth embodiment, there can be provided the THz-wave device for improving the coupling efficiency with the dielectric waveguide and realizing the broader bandwidth, and the THz-wave IC capable of mounting such a THz-wave device.

[Ninth Embodiment: Coupling Structure to Waveguide]

FIG. 48A shows a schematic planar pattern configuration of coupling structure to the waveguide 26 having a broader bandwidth, in the THz-wave device according to the ninth embodiment. FIG. 48B shows an electromagnetic field simulation result in a coupling part in FIG. 48A.

On the other hand, FIG. 49A shows a schematic planar pattern configuration of coupling structure to the waveguide 26 having a broader bandwidth, in a THz-wave device according to a comparative example. FIG. 49B shows an electromagnetic field simulation result in a coupling part in FIG. 49A.

In the THz-wave device according to the ninth embodiment, as shown in FIGS. 48A and 49A, the edge face of the 2D-PC slab 12 to which the 2D-PC waveguide 14 is extended formed on the 2D-PC slab 12 includes an adiabatic mode converter 10 to which the 2D-PC waveguide 14 is extended, in order to improve bonding characteristics with a WR-3 waveguide 26, etc.

The adiabatic mode converter 10 is provided with a taper shape so that a tip part thereof becomes thinner as being separated from the edge face of the 2D-PC slab 12, in the planar view of the 2D-PC slab 12.

The adiabatic mode converter 10 can be inserted into a waveguide line 26. In this case, the waveguide flange 40 disposed at an edge face of the 2D-PC slab 12 may be in contact with the edge face. Alternatively, the waveguide flange 40 disposed at the edge face of the 2D-PC slab 12 may be separated from the edge face.

Furthermore, the edge face of the 2D-PC slab 12, where the adiabatic mode converter is disposed, includes a gap region SCG (FIG. 48A) between the 2D-PC slab 12 and the waveguide flange 40 arranged at the edge face of the 2D-PC slab 12, in the peripheral part of the adiabatic mode converter 10, and may be separated from a waveguide flange 40. If there is such a gap region SCG, since the waveguide flange 40 is disposed so as to be separated from the edge face of the 2D-PC slab 12, a surface mode of the THz input wave can be controlled.

In the THz-wave device according to the ninth embodiment, as shown in FIGS. 48A and 48B, the gap region SCG between the 2D-PC slab 12 and the waveguide flange 40 disposed at the edge face of the 2D-PC slab 12 is a relatively small region which is approximately 1-1.5 times of the lattice constant a.

On the other hand, in the THz-wave device according to the comparative example, as shown in FIGS. 49A and 49B, the gap region SCG between the 2D-PC slab 12 and the waveguide flange 40 disposed at the edge face of the 2D-PC slab 12 is a relatively large region which is approximately 2a×5a of the lattice constant a. In FIG. 49A, the gap $W_G$ is approximately 2a.

In the THz-wave device according to the ninth embodiment, as shown in FIGS. 48B and 49B, spread of the electromagnetic field at a coupling part decreases.

Figure 50:
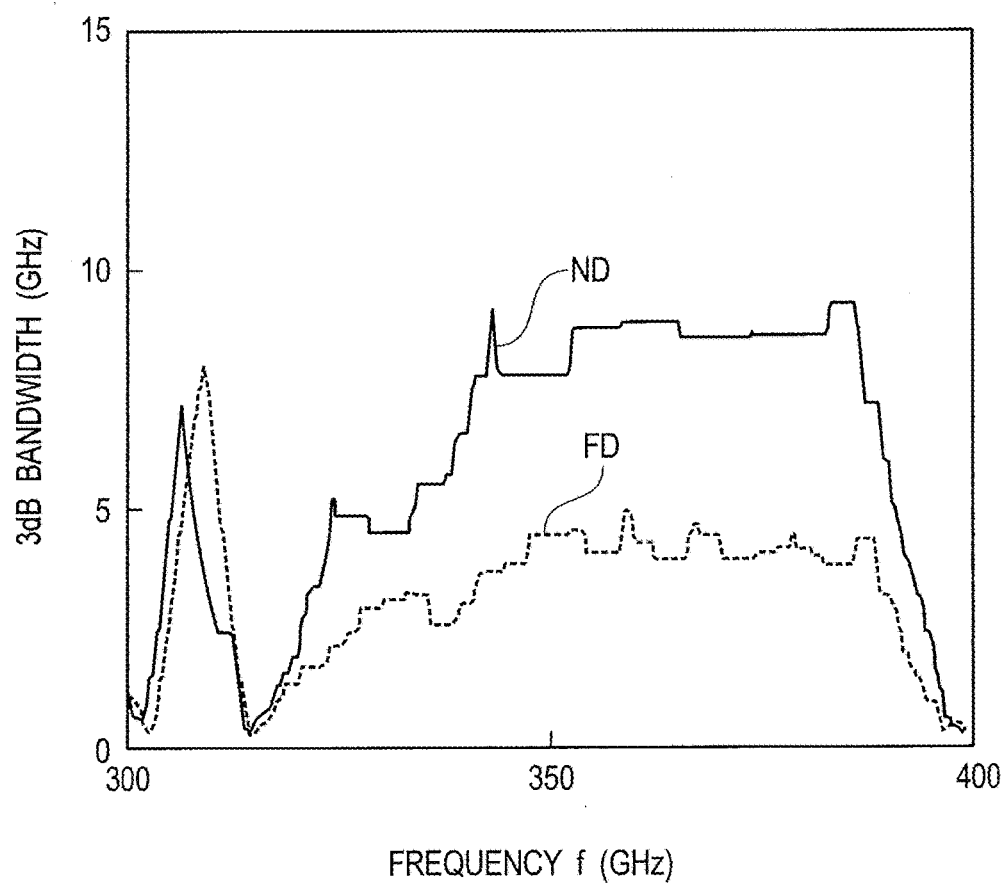
FIG. 50 shows a simulation result of frequency characteristics at 3 dB bandwidth, in the THz-wave device according to the ninth embodiment.
Figure 51A:
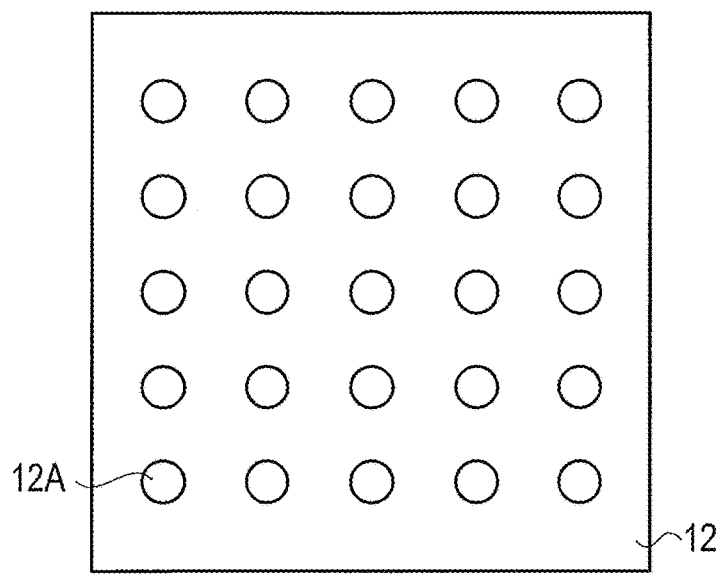
FIG. 51A shows a periodic structure of lattice points which is an example of arrangement in a square-lattice shape, in a 2D-PC slab applicable to the THz-wave device according to the embodiments.
Figure 51B:
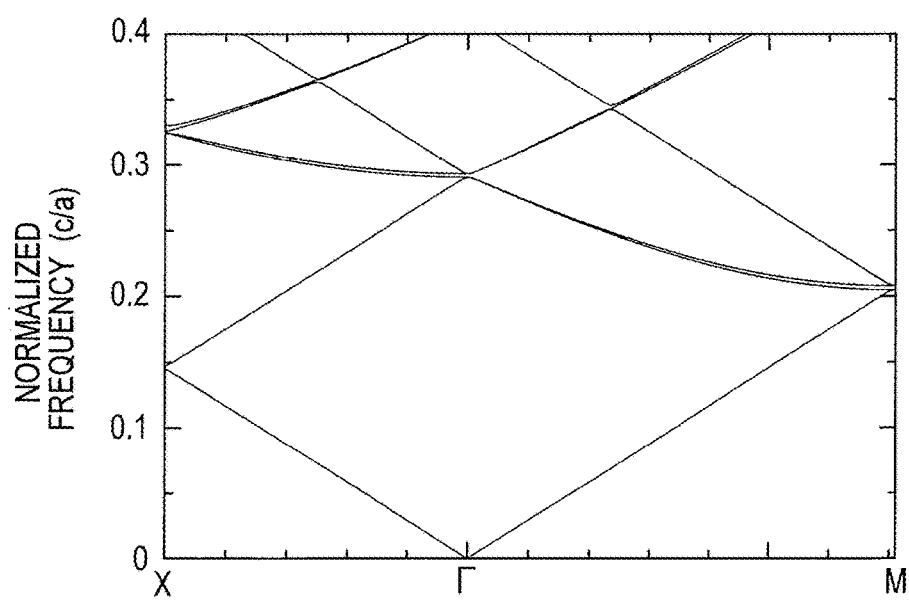
FIG. 51B is a band structure diagram of the 2D-PC slab corresponding to the arrangement shown in FIG. 51A.
Figure 52A:
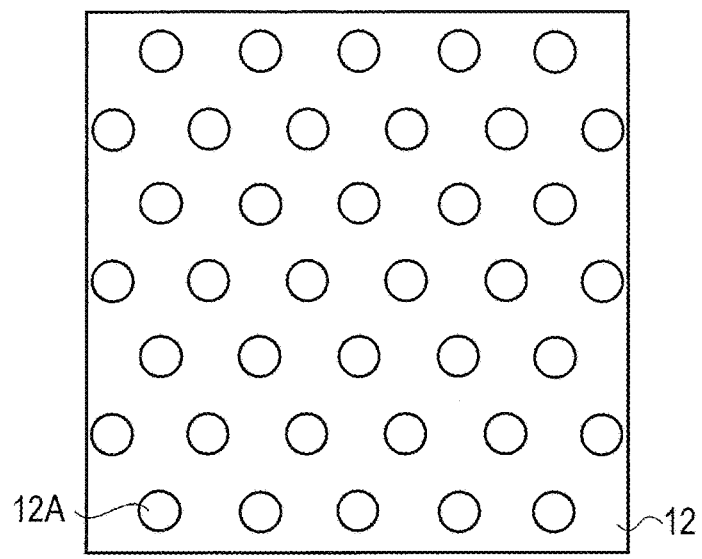
FIG. 52A shows a periodic structure of lattice points which is an example of arrangement in a triangular lattice shape, in a 2D-PC slab applicable to the THz-wave device according to the embodiments.
Figure 52B:
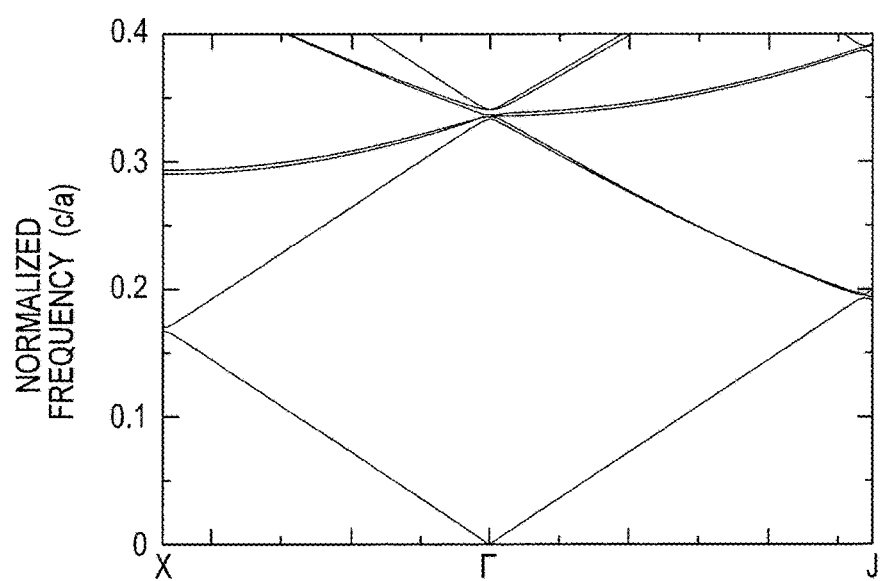
FIG. 52B is a band structure diagram of the 2D-PC slab corresponding to the arrangement shown in FIG. 52A.
Figure 53A:
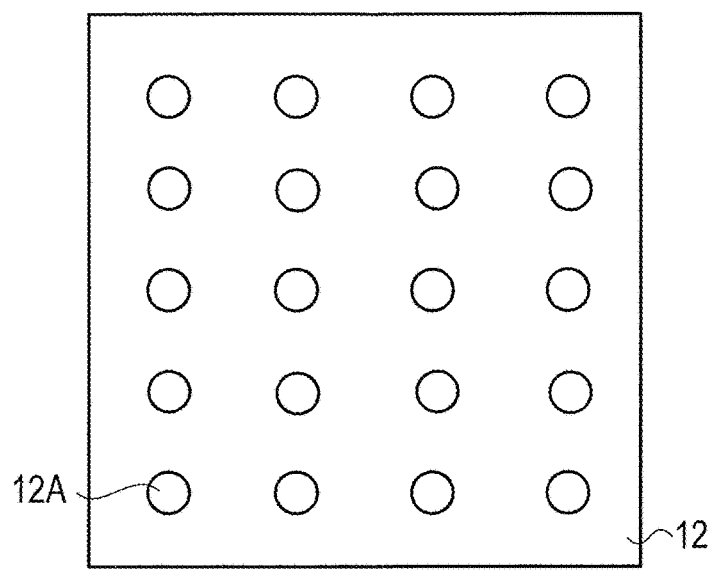
FIG. 53A shows a periodic structure of lattice points which is an example of arrangement in a rectangular lattice shape, in a 2D-PC slab applicable to the THz-wave device according to the embodiments.
Figure 53B:
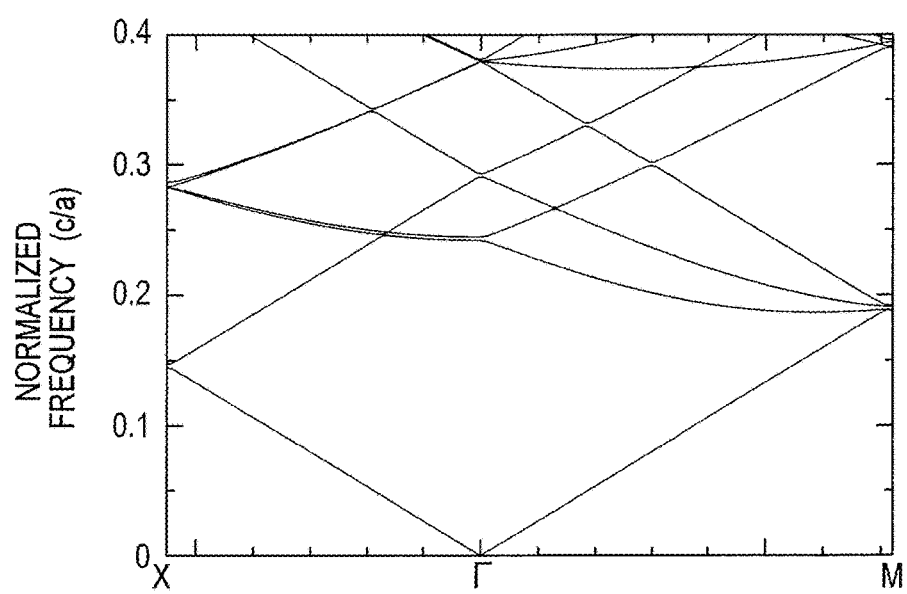
FIG. 53B is a band structure diagram of the 2D-PC slab corresponding to the arrangement shown in FIG. 53A.
Figure 54A:
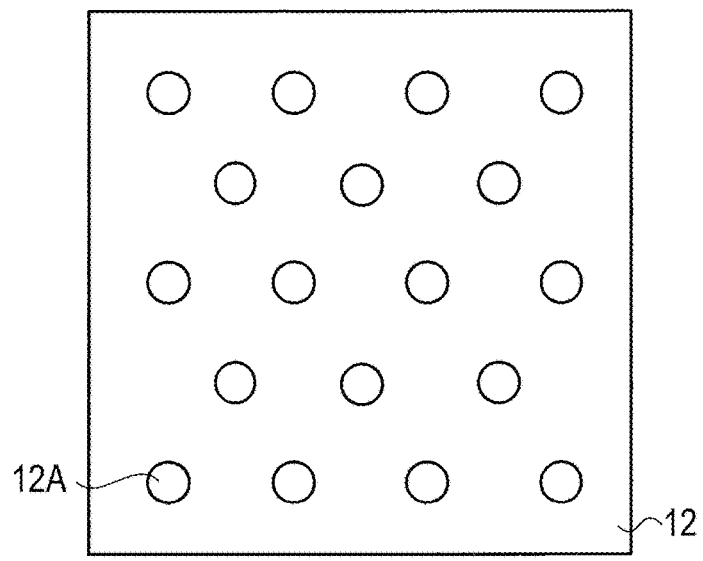
FIG. 54A shows a periodic structure of lattice points which is an example of arrangement in a rhombic lattice shape, in a 2D-PC slab applicable to the THz-wave device according to the embodiments.
Figure 54B:
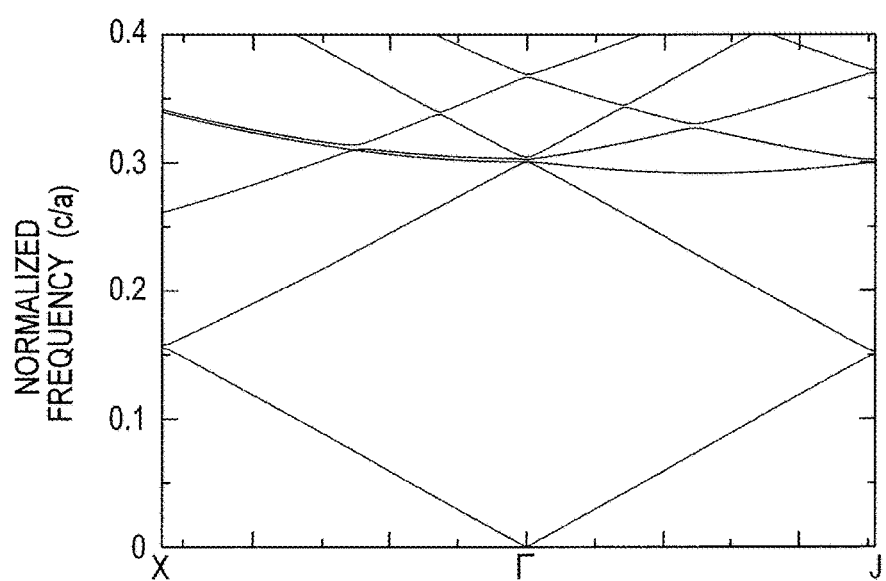
FIG. 54B is a band structure diagram of the 2D-PC slab corresponding to the arrangement shown in FIG. 54A.

FIG. 50 shows a simulation result of frequency characteristics at 3 dB bandwidth, in the THz-wave device according to the ninth embodiment. The length of the 2D-PC waveguide 14 is 2 cm in the simulation. In FIG. 50, the solid line ND corresponds to the THz-wave device according to the ninth embodiment shown in FIG. 48A, and the dashed line FD corresponds to the THz-wave device according to the comparative example shown in FIG. 48B.

As shown in FIG. 50, the 3 dB bandwidth is improved twice as much, in the THz-wave device according to the ninth embodiment. As a result, high-speed communications can be realized, in the THz-wave device according to the ninth embodiment.

(Periodic Structure and Band Structure of Lattice Points)

As mentioned above, the THz-wave device according to the embodiments can be coupled to the low-loss dielectric waveguide (line defect waveguide using the PC) suitable for the waveguide of the THz wave, with high degree of efficiency.

FIGS. 51A, 52A, 53A, and 54A show respectively examples of arrangement of the square lattice, triangular lattice, rectangular lattice, and rhombic lattice (face-centered rectangle lattice) which are periodic structure of lattice points 12A of the 2D-PC slab 12 applicable to the THz-wave device according to the embodiments. FIGS. 51B, 52B, 53B, and 54B show respectively corresponding band structures of 2D-PC slab 12.

The lattice point for forming resonant-state may be arranged in any one selected from the group consisting of a square lattice, a rectangular lattice, a face-centered rectangle lattice, and a triangular lattice.

Moreover, the lattice point 12A is arranged in a square lattice or a rectangular lattice, and can diffract the light wave the electromagnetic wave in a Γ point (gamma point), an X point, or an M point in the photonic band structure of the 2D-PC slab 12, in the PC slab 12 plane.

Moreover, the lattice point 12A is arranged in a face-centered rectangle lattice or a triangular lattice, and can diffract the light wave the electromagnetic wave in a Γ point (gamma point), an X point, or a J point in the photonic band structure of the 2D-PC slab 12, in the PC slab 12 plane.

More specifically, the lattice points 12A are periodically arranged in the 2D-PC slab 12, and can diffract the THz wave in the PBG frequencies of the photonic band structure of the 2D-PC slab 12 in order to prohibit the existence in the plane of the 2D-PC slab 12.

Moreover, the lattice points 12A may be provided with any one of the polygonal shape, circular shape, oval shape, or ellipse shape.

As mentioned above, according to the present invention, there can be provided the THz-wave device for improving the coupling efficiency with the dielectric waveguide and realizing the broader bandwidth, and the THz-wave IC capable of mounting such a THz-wave device.

[Other Embodiments]

As explained above, the embodiments have been described, as a disclosure including associated description and drawings to be construed as illustrative, not restrictive. This disclosure makes clear a variety of alternative embodiments, working examples, and operational techniques for those skilled in the art.

Such being the case, the embodiments cover a variety of embodiments, whether described or not.

What is claimed is:

1. A terahertz-wave device comprising:
   a two dimensional photonic crystal slab;
   lattice points periodically arranged in the two dimensional photonic crystal slab, the lattice points configured to diffract terahertz waves in photonic bandgap frequencies in photonic band structure of the two dimensional photonic crystal slab in order to prevent the terahertz waves from existing in a plane of the two dimensional photonic crystal slab;
   a two dimensional photonic crystal waveguide disposed in the two dimensional photonic crystal slab, the two dimensional photonic crystal waveguide formed of a line defect of the lattice points; and
   a diode device disposed in a trench formed in the two dimensional photonic crystal waveguide so that a top surface of the diode device is formed at a height equal to or lower than a height of a surface of the two dimensional photonic crystal waveguide.

2. The terahertz-wave device according to claim 1, wherein
   the diode device is disposed in the trench formed in the two dimensional photonic crystal waveguide so that a surface of the diode device is matched with a cross-sectional center portion vertical to the surface of the two dimensional photonic crystal slab of the two dimensional photonic crystal waveguide.

3. The terahertz-wave device according to claim 1, wherein
   the diode device comprises a resonance tunnel diode device.

4. The terahertz-wave device according to claim 3, wherein
   the resonance tunnel diode device comprises: a semiconductor substrate;
   a first electrode and second electrode disposed on the semiconductor substrate; and
   a resonant tunneling diode disposed on the semiconductor substrate, and a main electrode of the resonant tunneling diode connected to the first electrode and the second electrode.

5. The terahertz-wave device according to claim 4, wherein
   the resonance tunnel diode device comprises an antenna selected from the group consisting of a dipole antenna, a patch antenna, and a slot antenna, and the selected antenna is integrated into the resonant tunneling diode.

6. The terahertz-wave device according to claim 4, wherein
   a height of a center portion of the two dimensional photonic crystal waveguide is matched with a height of the first electrode or the second electrode.

7. The terahertz-wave device according to claim 1, wherein
   the diode device is disposed in a trench formed in the two dimensional photonic crystal waveguide so that the top surface of the diode device is flush with the surface of the two dimensional photonic crystal waveguide.

* * * * *